(12) United States Patent
Alonso Ruiz et al.

(10) Patent No.: US 11,726,634 B2
(45) Date of Patent: Aug. 15, 2023

(54) DEVICES, METHODS, AND GRAPHICAL USER INTERFACES FOR DYNAMICALLY ADJUSTING PRESENTATION OF AUDIO OUTPUTS

(71) Applicant: Apple Inc., Cupertino, CA (US)

(72) Inventors: Marcos Alonso Ruiz, Oakland, CA (US); Nathan de Vries, San Francisco, CA (US); David C. Graham, Columbus, OH (US); Freddy A. Anzures, San Francisco, CA (US); Hugo D. Verweij, San Francisco, CA (US); Afrooz Family, Emerald Hills, CA (US); Matthew I. Brown, New York, NY (US)

(73) Assignee: APPLE INC., Cupertino, CA (US)

( * ) Notice: Subject to any disclaimer, the term of this patent is extended or adjusted under 35 U.S.C. 154(b) by 365 days.

(21) Appl. No.: 16/985,128

(22) Filed: Aug. 4, 2020

(65) Prior Publication Data
US 2020/0363915 A1 Nov. 19, 2020

Related U.S. Application Data

(63) Continuation of application No. 15/620,698, filed on Jun. 12, 2017, now Pat. No. 11,537,263.
(Continued)

(51) Int. Cl.
*G06F 3/0482* (2013.01)
*G06F 3/0488* (2022.01)
(Continued)

(52) U.S. Cl.
CPC .......... *G06F 3/0482* (2013.01); *G06F 3/0488* (2013.01); *G06F 3/04883* (2013.01); *G06F 3/04886* (2013.01); *G06F 3/165* (2013.01)

(58) Field of Classification Search
CPC .. G06F 3/0482; G06F 3/0488; G06F 3/04883; G06F 3/04886; G06F 3/165
See application file for complete search history.

(56) References Cited

U.S. PATENT DOCUMENTS 9,798,512 B1 * 10/2017 Faaborg .................. G06F 3/167
2006/0256131 A1   11/2006 Trepess
(Continued)

FOREIGN PATENT DOCUMENTS

AU   2016100246 A4   4/2016
AU   2016100293 A4   4/2016
(Continued)

OTHER PUBLICATIONS

McGookin et al., "Pressure Player: Combined Pressure and Audio Interaction", https://davidmcgookin.files.wordpress.com/2013/03/pressure_player_final.pdf, Aug. 18, 2008, 2 pages.
(Continued)

*Primary Examiner* — Jennifer N Welch
*Assistant Examiner* — Parmanand D Patel
(74) *Attorney, Agent, or Firm* — Morgan, Lewis & Bockius LLP

(57) ABSTRACT

An electronic device with one or more processors and memory, and in communication with a display and an audio system presents, under control of the electronic device, via the audio system, a first audio output, the first audio output having a volume and an audio property other than volume (e.g., a reverberation time, a low-pass filter cutoff, or a stereo balance). While the audio system presents a first audio output, the device receives an input that corresponds to a request to present a second audio output, and in response, the device concurrently presents, via the audio system, an adjusted version of the first audio output in which the audio (Continued)

property other than volume of the first audio output has been adjusted and the second audio output.

45 Claims, 52 Drawing Sheets

Related U.S. Application Data

(60) Provisional application No. 62/349,056, filed on Jun. 12, 2016.

(51) Int. Cl.
*G06F 3/04886* (2022.01)
*G06F 3/04883* (2022.01)
*G06F 3/16* (2006.01)

(56) References Cited

U.S. PATENT DOCUMENTS

| | | |
|---|---|---|
| 2007/0097151 A1 | 5/2007 | Rosenberg |
| 2007/0294297 A1 | 12/2007 | Kesteloot et al. |
| 2008/0297475 A1 | 12/2008 | Woolf et al. |
| 2009/0013059 A1 | 1/2009 | Partaker et al. |
| 2009/0061824 A1 | 3/2009 | Neelakantan et al. |
| 2010/0053348 A1 | 3/2010 | Yoshomoto et al. |
| 2010/0302179 A1 | 12/2010 | Ahn et al. |
| 2011/0050653 A1 | 5/2011 | Miyazawa et al. |
| 2011/0239155 A1 | 9/2011 | Christie |
| 2012/0038580 A1 | 2/2012 | Sasaki |
| 2012/0105367 A1 | 5/2012 | Son et al. |
| 2012/0139844 A1 | 6/2012 | Ramstein et al. |
| 2012/0274662 A1 | 11/2012 | Kim et al. |
| 2013/0022218 A1* | 1/2013 | Miyazawa ........ H04M 1/72442 381/104 |
| 2013/0044061 A1 | 2/2013 | Ashbrook |
| 2013/0077804 A1 | 3/2013 | Glebe et al. |
| 2013/0141396 A1 | 6/2013 | Lynn et al. |
| 2014/0185834 A1 | 7/2014 | Fromel et al. |
| 2014/0214927 A1 | 7/2014 | Garmark et al. |
| 2015/0062052 A1* | 3/2015 | Bernstein ............ G06F 3/0416 345/173 |
| 2015/0143248 A1 | 5/2015 | Beechuk et al. |
| 2015/0200641 A1 | 7/2015 | Cho et al. |
| 2015/0234493 A1 | 8/2015 | Parivar et al. |
| 2015/0348168 A1 | 12/2015 | Quinn |
| 2016/0188181 A1 | 6/2016 | Smith |
| 2016/0342200 A1 | 11/2016 | Dziuk et al. |
| 2016/0345116 A1* | 11/2016 | Yen ..................... H04S 7/30 |
| 2017/0068511 A1* | 3/2017 | Brown ................. G06F 3/04845 |
| 2017/0177135 A1 | 6/2017 | Sarin |
| 2023/0080470 A1 | 3/2023 | Alonso Ruiz et al. |

FOREIGN PATENT DOCUMENTS

| | | |
|---|---|---|
| AU | 2016102063 A4 | 1/2017 |
| CN | 101159437 A | 4/2008 |
| CN | 102098606 A | 6/2011 |
| CN | 102843640 A | 12/2012 |
| CN | 103928037 A | 7/2014 |
| CN | 104169848 A | 11/2014 |
| CN | 104903834 A | 9/2015 |
| CN | 105117131 A | 12/2015 |
| CN | 105163186 A | 12/2015 |
| CN | 105185401 A | 12/2015 |
| CN | 105389078 A | 3/2016 |
| EP | 2463861 A1 | 6/2012 |
| EP | 2680121 A1 | 1/2014 |
| GB | 2 324 642 A | 10/1998 |
| WO | WO 2014/065846 A1 | 5/2014 |
| WO | WO 2014/105274 A1 | 7/2014 |

OTHER PUBLICATIONS

Office Action, dated Nov. 21, 2017, received in U.S. Appl. No. 15/620,698, 13 pages.
Final Office Action, dated Jul. 27, 2018, received in U.S. Appl. No. 15/620,698, 13 pages.
Office Action, dated May 3, 3019, received in U.S. Appl. No. 15/620,698, 13 pages.
Final Office Action, dated Jul. 25, 2019, received in U.S. Appl. No. 15/620,698, 14 pages.
Office Action, dated Jun. 22, 2020, received in U.S. Appl. No. 15/620,698, 29 pages.
Office Action, dated May 27, 2019, received in Australian Patent Application No. 2017286013, which corresponds with U.S. Appl. No. 15/620,698, 4 pages.
Notice of Acceptance, dated Aug. 15, 2019, received in Australian Patent Application No. 2017286013, which corresponds with U.S. Appl. No. 15/620,698, 3 pages.
Certificate of Grant, dated Dec. 19, 2019, received in Australian Patent Application No. 2017286013, which corresponds with U.S. Appl. No. 15/620,698, 4 pages.
Office Action, dated Sep. 19, 2018, received in Chinese Patent Application No. 201710364610.3, which corresponds with U.S. Appl. No. 15/620,698, 6 pages.
Office Action, dated Apr. 15, 2019, received in Chinese Patent Application No. 201710364610.3, which corresponds with U.S. Appl. No. 15/620,698, 3 pages.
Office Action, dated Sep. 4, 2019, received in Chinese Patent Application No. 201710364610.3, which corresponds with U.S. Appl. No. 15/620,698, 3 pages.
Notice of Allowance, dated Jan. 2, 2020, received in Chinese Patent Application No. 201710364610.3, which corresponds with U.S. Appl. No. 15/620,698, 5 pages.
Patent, dated Mar. 27, 2020, received in Chinese Patent Application No. 201710364610.3, which corresponds with U.S. Appl. No. 15/620,698, 6 pages.
Office Action, dated Jul. 2, 2018, received in Chinese Patent Application No. 201810369048.8, which corresponds with U.S. Appl. No. 15/620,698, 2 pages.
Office Action, dated May 15, 2019, received in Chinese Patent Application No. 201810369048.8, which corresponds with U.S. Appl. No. 15/620,698, 6 pages.
Office Action, dated Nov. 21, 2019, received in Chinese Patent Application No. 201810369048.8, which corresponds with U.S. Appl. No. 15/620,698, 6 pages.
Office Action, dated Jun. 9, 2020, received in Chinese Patent Application No. 201810369048.8, which corresponds with U.S. Appl. No. 15/620,698, 7 pages.
Office Action, dated Oct. 21, 2016, received in Danish Patent Application No. 201670597, which corresponds with U.S. Appl. No. 15/620,698, 7 pages.
Notice of Allowance, dated May 5, 2017, received in Danish Patent Application No. 201670597, which corresponds with U.S. Appl. No. 15/620,698, 2 pages.
Office Action, dated Sep. 29, 2016, received in Danish Patent Application No. 201670599, which corresponds with U.S. Appl. No. 15/620,698, 8 pages.
Office Action, dated Jul. 25, 2018, received in European Patent Application No. 17163558.4, which corresponds with U.S. Appl. No. 15/620,698, 8 pages.
Summons, dated Jan. 28, 2019, received in European Patent Application No. 17163558.4, which corresponds with U.S. Appl. No. 15/620,698, 12 pages.
Intention to Grant, dated Jul. 9, 2019, received in European Patent Application No. 17163558.4, which corresponds with U.S. Appl. No. 15/620,698, 5 pages.
Summons, dated Sep. 27, 2019, received in European Patent Application No. 17163558.4, which corresponds with U.S. Appl. No. 15/620,698, 4 pages.
Intention to Grant, dated Mar. 2, 2020, received in European Patent Application No. 17163558.4, which corresponds with U.S. Appl. No. 15/620,698, 5 pages.

(56) References Cited

OTHER PUBLICATIONS

Decision to Grant, dated Jul. 23, 2020, received in European Patent Application No. 17163558.4, which corresponds with U.S. Appl. No. 15/620,698, 2 pages.
Patent, dated Aug. 19, 2020, received in European Patent Application No. 17163558.4, which corresponds with U.S. Appl. No. 15/620,698, 3 pages.
Office Action, dated Jul. 28, 2020, received in Australian Patent Application No. 2019257439, 4 pages.
Extended European Search Report, dated Sep. 29, 2017, received in European Patent Application No. 17163558.4, which corresponds with U.S. Appl. No. 15/620,698, 9 pages.
International Search Report and Written Opinion, dated Sep. 22, 2017, received in International Patent Application No. PCT/US2017/027451, which corresponds with U.S. Appl. No. 15/620,698, 14 pages.
International Preliminary Report on Patentability, dated Dec. 18, 2018, received in International Patent Application No. PCT/US2017/027451, which corresponds with U.S. Appl. No. 15/620,698, 9 pages.
Notice of Allowance, dated Nov. 18, 2020, received in Chinese Patent Application No. 201810369048.8, which corresponds with U.S. Appl. No. 15/620,698, 5 pages.
Extended European Search Report, dated Oct. 19, 2020, received in European Patent Application No. 20185278.7, which corresponds with U.S. Appl. No. 16/985,128, 8 pages.
Final Office Action, dated Apr. 6, 2021, received in U.S. Appl. No. 15/620,698, 30 pages.
Patent, dated Jan. 8, 2021, received in Chinese Patent Application No. 201810369048.8, which corresponds with U.S. Appl. No. 15/620,698, 6 pages.
Patent, dated Feb. 25, 2021, received in Australian Patent Application No. 2019257439, 3 pages.
Office Action, dated Jan. 12, 2023, received in Chinese Patent Application No. 202010072444.1, which corresponds from U.S. Appl. No. 16/985,128, 4 pages.

* cited by examiner

800

802 Provide, to an audio system that is in communication with an electronic device, first sound information to present a first audio output that includes:
  a volume, and
  an audio property other than volume (a "non-volume audio property")

> 804 The non-volume audio property is a reverberation time for the first audio output, a low-pass filter cutoff for the first audio output, or a stereo balance for the first audio output

806 While the audio system is presenting the first audio output, receive an input that corresponds to a request to present a second audio output > 808 The input is received while a focus selector is over a graphical object, on a display that is in communication with the electronic device, that corresponds to the second audio output

810 In response to receiving the input that corresponds to the request to present the second audio output, provide, to the audio system, information to dynamically adjust presentation of the first audio output in accordance with a magnitude of the input > 812 The magnitude of the input is a characteristic intensity of a contact in the input, a length of time of a contact in the input, or a distance travelled by a contact in the input

814 Dynamically adjust the non-volume audio property as the magnitude of the input changes > 816 Shift a stereo balance for the first audio output in conjunction with shifting a stereo balance for the second audio output > 818 Adjust the volume of the first audio output as the magnitude of the input changes

820 Dynamically adjust the non-volume audio property as the magnitude of the input changes, prior to presentation of the second audio output, until the magnitude of the input satisfies a first predetermined threshold (A)

842 Provide, to a display, data to present a user interface that includes a media object, the media object representing at least one media content item 844 Provide, to an audio system, first sound information to present a first audio output that does not correspond to the media object 846 While providing the first sound information to the audio system, detect a first portion of an input directed to the media object 848 In response to detecting the first portion of the input directed to the media object: (i) initiate providing, to the audio system, second sound information to present a second audio output that corresponds to the media object; and (ii) continue providing, to the audio system, first sound information to present the first audio output that does not correspond to the media object 850 While providing the first sound information and the second sound information to the audio system: detect a second portion of the input directed to the media object, wherein detecting the second portion of the input includes detecting a change in a parameter of the input 852 In response to detecting the change in the parameter of the input:
    (i) provide, to the display, data to dynamically alter the presented user interface in accordance with the change in the parameter of the input;
    (ii) provide, to the audio system, information to dynamically alter the first audio output that does not correspond to the media object in accordance with the change in the parameter of the input; and
    (iii) provide, to the audio system, information to dynamically alter the second audio output that corresponds to the media object in accordance with the change in the parameter of the input

| 855 Display, on a display, a user interface that includes a representation of a media item. |

| 856 While displaying the user interface, detect an input by a contact at a location on a touch-sensitive surface that corresponds to the representation of the media item. |

857 In response to detecting the input by the contact:

in accordance with a determination that the input meets media hint criteria, wherein the media hint criteria include a criterion that is met when the contact has a characteristic intensity above a first intensity threshold:
        start to play a respective portion of the media item; and
        while the media item is playing, dynamically change a set of one or more audio properties of the media item as the characteristic intensity of the contact changes;

in accordance with a determination that the input does not meet the media hint criteria, forgo starting to play the respective portion of the media item and forgo dynamically changing the set of one or more audio properties of the media item as the characteristic intensity of the contact changes.

| 858 The audio properties of the media item include volume, a cutoff frequency for a low pass filter, and/or an equalizer setting. |

| 859 Dynamically change a visual appearance of the user interface as the set of one or more audio properties of the media item are dynamically changed.

| 860 Dynamically changing the visual appearance of the user interface includes increasing a size of a representation of the media item as the characteristic intensity of the contact increases. |

| 861 Dynamically changing the visual appearance of the user interface includes dynamically changing an amount of obscuring of a portion of the user interface that is proximate to the representation of the media item as the characteristic intensity of the contact changes. |
|

Figure 8D

862 After starting to play the respective portion of the media item:

detect an increase in the characteristic intensity of the contact followed by detecting a decrease in the characteristic intensity of the contact; and, in accordance with a determination that the characteristic intensity of the contact meets media preview criteria, including a criterion that is met when the characteristic intensity of the contact increased above a second intensity threshold that is higher than the first intensity threshold before detecting the decrease in the characteristic intensity of the contact, while the media item is playing, change the audio properties of the media item in a first manner as the characteristic intensity of the contact increases and maintain the audio properties at a first state as the characteristic intensity of the contact decreases; and, in accordance with a determination that the characteristic intensity of the contact does not meet the media preview criteria, while the media item is playing, change the audio properties of the media item in the first manner as the characteristic intensity of the contact increases and change the audio properties of the media item in a second manner as the characteristic intensity of the contact decreases.

863 In response to detecting that the input meets the media preview criteria, display, on the display, an indication that an increase in the characteristic intensity of the contact will cause the device to perform a selection operation with respect to the media item.

864 After starting to play the respective portion of the media item, detect an increase in the characteristic intensity of the contact while the contact is maintained on the touch-sensitive surface; and in response to detecting the increase in the characteristic intensity of the contact:
    in accordance with a determination that the characteristic intensity of the contact meets media selection criteria, including a criterion that is met when the characteristic intensity of the contact is greater than a selection intensity threshold that is higher than the first intensity threshold, cease playing the respective portion of the media item and perform a selection operation for the media item; and
    in accordance with a determination that the characteristic intensity of the contact does not meet the media selection criteria, continue to play the respective portion of the media item without performing the selection operation.

Figure 8E

865 While the media item is playing, detect an end of the input.

In response to detecting the end of the input, cease playing the media item.

866 Ceasing to play the media item in response to detecting the end of the input includes reversing visual obscuring of content proximate to the representation of the media item and changing the set of one or more properties of the audio item gradually so as to gradually fade out the playing media item.

867 After ceasing to play the media item in response to detecting the end of the input, detect a selection input by a second contact on the touch-sensitive surface at a location that corresponds to the representation of the media item, wherein the second contact does not have a characteristic intensity that reaches the first intensity threshold.

In response to detecting the selection input, perform a selection operation for the media item.

868 The input is detected while background media is playing at the device.

869 In accordance with a determination that the input meets the media hint criteria:
while the media item is playing, dynamically change a set of one or more audio properties of the background media item as the characteristic intensity of the contact changes; and, in accordance with a determination that the input does not meet the media hint criteria, continue to play the background media without changing the set of one or more audio properties of the background media.

870 While the media item is playing, detect an end of the input.

In response to detecting the end of the input, resume playing the background media item with the set of one or more audio properties returning back to their values before the input was detected.

876 Display, on a display, a user interface that includes a first interactive region of an application and a second interactive region of the application > 877 The second interactive region is a user interface for a primary application.
>
> The first interactive region is configured to display content from different mini-applications that are configured to operate within the primary application, and the mini-application that is displayed in the first interactive region is selected based on user input at the device.

> 878 The second interactive region is a conversation region that includes a plurality of messages in a conversation between conversation participants.
>
> The first interactive region is a media selection region for selecting media to share in the conversation between the conversation participants.

879 While displaying the user interface, detect a first input by a contact on a touch-sensitive surface at a location that corresponds to a first user interface element in the first interactive region on the display.

880 In response to detecting the first input by the contact:
  in accordance with a determination that the first input meets intensity-based activation criteria, wherein the intensity-based activation criteria require that the contact have a characteristic intensity that is above a first intensity threshold in order for the intensity-based activation criteria to be met, obscure the first interactive region of the application with the exception of the first user interface element without obscuring the second interactive region of the application; and,
  in accordance with a determination that the first input meets first selection criteria, wherein the first selection criteria do not require that the contact have a characteristic intensity that is above the first intensity threshold in order for the selection criteria to be met, perform a first selection operation that corresponds to the first user interface element without obscuring the first interactive region of the application.

> 881 The first selection criteria are met when the first input is a tap gesture > 882 Obscuring the first interactive region of the application includes dynamically obscuring the first interactive region of the application as the characteristic intensity of the contact changes (A)

Figure 8G

---

883 While displaying the user interface, detect a second input by a second contact on the touch-sensitive surface at a location that corresponds to a second user interface element in the second interactive region on the display.

In response to detecting the second input by the second contact:
    in accordance with a determination that the second input meets second intensity-based activation criteria, wherein the second intensity-based activation criteria require that the second contact have a characteristic intensity that is above a second intensity threshold in order for the second intensity-based activation criteria to be met, obscure the first interactive region of the application and the second interactive region of the application with the exception of the second user interface element; and
    in accordance with a determination that the second input meets second selection criteria, wherein the second selection criteria do not require that the second contact have a characteristic intensity that is above the second intensity threshold in order for the second selection criteria to be met, perform a second selection operation that corresponds to the second user interface element without obscuring the second interactive region of the application and without obscuring the first interactive region of the application.

---

884 The second user interface element corresponds to the first user interface element after the first user interface element was added to the second interactive region based on input in the first interactive region.

---

885 While obscuring the first interactive region of the application with the exception of the first user interface element without obscuring the second interactive region of the application, detect an increase in the characteristic intensity of the contact.

In response to detecting the increase in the characteristic intensity of the contact:
    in accordance with a determination that the characteristic intensity of the contact meets third selection criteria, including a criterion that is met when the characteristic intensity of the contact is greater than a selection intensity threshold that is higher than the first intensity threshold, perform a third selection operation on the first user interface element and ceases obscuring the first interactive region of the application; and
    in accordance with a determination that the characteristic intensity of the input does not meet the third selection criteria, continue to obscure the first interactive region of the application with the exception of the first user interface element without obscuring the second interactive region of the application.

902 A method that is performed at an electronic device in communication with a display and an audio system, while a user interface that includes a set of one or more affordances is displayed on the display of the electronic device

904 Detect, at a first point in time, a first input directed to a first affordance in the set of the one or more affordances

906 In response to detecting the first input directed to the first affordance, initiate providing, to the audio system, first sound information to present a first audio output that corresponds to the first affordance, and the first audio output has a first audio profile

908 While the audio system is presenting the first audio output, cause the display to present a visual effect that corresponds to the first audio output (e.g., one or more graphics that extend outward, away from the first affordance)

910 Detect, at a second point in time that is after the first point in time, a second input directed to a second affordance in the set of one or more affordances

912 The second affordance and the first affordance are the same affordance (e.g., a same key on a displayed keypad within the displayed user interface)

914 The first affordance is different from the second affordance (e.g., different keys on the displayed keypad within the displayed user interface)

916 In response to detecting the second input directed to the second affordance and in accordance with a determination that audio alteration criteria are satisfied:

(i) cause the audio system to present altered first audio output that corresponds to the first affordance, instead of continuing to present the first audio output with the first audio profile, wherein the altered first audio output has an altered audio profile that is distinct from the first audio profile; and (ii) provide, to the audio system, second sound information to present a second audio output that corresponds to the second affordance, wherein the second audio output has a second audio profile > 918 In response to detecting the second input directed to the second affordance, determine whether the first audio output presented via the audio system by the second point in time satisfies the audio alteration criteria > 920 The audio alteration criteria include a criterion that is satisfied when an amount of time elapsed between the first point in time and the second point in time is less than a predetermined amount of time > 922 The audio alteration criteria include a criterion that is satisfied when a time elapsed since the first audio output was initiated is less than a predetermined amount of time > 924 The audio alteration criteria include a criterion that is satisfied when an amplitude of the first audio output has dropped below a predetermined amplitude at the second point in time

926 In response to detecting the second input directed to the second affordance and in accordance with a determination that audio alteration criteria are not satisfied:

(i) cause the audio system to continue presenting the first audio output that corresponds to the first affordance and that has the first audio profile; and (ii) provide, to the audio system, third sound information to present a third audio output that corresponds to the second affordance, wherein the third audio output has a third audio profile.

Figure 9C

DEVICES, METHODS, AND GRAPHICAL USER INTERFACES FOR DYNAMICALLY ADJUSTING PRESENTATION OF AUDIO OUTPUTS

RELATED APPLICATIONS

This application is a continuation of U.S. patent application Ser. No. 15/620,698, filed Jun. 12, 2017, which claims priority to U.S. Provisional Application Ser. No. 62/349,056, filed Jun. 12, 2016, entitled "Devices, Methods, and Graphical User Interfaces for Dynamically Adjusting Presentation of Audio Outputs," each of which is incorporated by reference herein in its entirety.

TECHNICAL FIELD

This relates generally to electronic devices that provide audio output, and more particularly, devices, methods, and graphical user interfaces that dynamically adjust presentation of audio outputs.

BACKGROUND

Some electronic devices utilize audiovisual interfaces as a way of providing feedback about user's interactions with the devices.

SUMMARY

Some electronic devices, however, provide audiovisual feedback in limited, inefficient, and frustrating ways. For example, some methods interrupt and stop providing audio that a user is currently listening to (e.g., a lecture) and switch abruptly to some other audio (e.g., audio associated with a short video message). These abrupt transitions distract users (thus causing users to lose focus and have to re-play portions of the audio they were listening to), force users to perform additional inputs to revert back the audio that they were listening to, force users to disable certain audio-based effects, and create additional frustrations. By requiring users to perform additional inputs and/or forcing users to re-play portions, conventional electronic devices waste energy.

Some electronic devices utilize audiovisual interfaces as a way of providing feedback about user's interactions with the devices. Some electronic devices, however, provide audiovisual feedback in limited, inefficient, and frustrating ways. For example, some methods provide predetermined audio feedback in response to a user's interactions with graphical user interface elements (e.g., providing audible tones in response to a user typing numbers at a keypad for a phone application). This predetermined audio feedback does not change based on the user interactions, thus forcing users to listen to the same predetermined and un-changing audio feedback over and over again. As a result, many users disable certain audio-based effects and/or delete certain applications that have become too annoying.

Accordingly, there is a need for electronic devices with more effective methods and interfaces for providing audiovisual feedback. Such methods and interfaces optionally complement or replace conventional methods for providing audiovisual feedback. Such methods and interfaces reduce the number, extent, and/or nature of the inputs from a user and produce a more efficient human-machine interface (e.g., by dynamically blurring audio outputs together, the embodiments disclosed herein allow users to efficiently preview a new audio output without having to abruptly stop listening to a current audio output). Further, such methods reduce the processing power consumed to process touch inputs, conserve power (thereby increasing the time between battery charges), reduce unnecessary/extraneous/repetitive inputs, and potentially reduce memory usage.

In accordance with some embodiments, a method is performed at an electronic device that is in communication with a display and an audio system. The method includes: providing, to the audio system, first sound information to present a first audio output that includes: a volume and an audio property other than volume. The method further includes, while the audio system is presenting the first audio output, receiving an input that corresponds to a request to present a second audio output. The method further includes, in response to receiving the input that corresponds to the request to present the second audio output: providing, to the audio system, information to dynamically adjust presentation of the first audio output in accordance with a magnitude of the input, wherein dynamically adjusting presentation of the first audio output includes dynamically adjusting the non-volume audio property as the magnitude of the input changes; and providing, to the audio system, second sound information to present the second audio output concurrently with the first audio output.

In accordance with some embodiments, a method is performed at an electronic device that is in communication with a display and an audio system. The method includes: while a user interface that includes a set of one or more affordances is displayed on the display: detecting, at a first point in time, a first input directed to a first affordance in the set of the one or more affordances. The method further includes, in response to detecting the first input directed to the first affordance, initiating providing, to the audio system, first sound information to present a first audio output that corresponds to the first affordance, wherein the first audio output has a first audio profile. The method further includes, detecting, at a second point in time that is after the first point in time, a second input directed to a second affordance in the set of one or more affordances. The method further includes, in response to detecting the second input directed to the second affordance: in accordance with a determination that audio alteration criteria are satisfied: causing the audio system to present altered first audio output that corresponds to the first affordance, instead of continuing to present the first audio output with the first audio profile, wherein the altered first audio output has an altered audio profile that is distinct from the first audio profile; and providing, to the audio system, second sound information to present a second audio output that corresponds to the second affordance, wherein the second audio output has a second audio profile. The method further includes, in accordance with a determination that the audio alteration criteria are not satisfied: causing the audio system to continue presenting the first audio output that corresponds to the first affordance and that has the first audio profile; and providing, to the audio system, third sound information to present a third audio output that corresponds to the second affordance, wherein the third audio output has a third audio profile.

In accordance with some embodiments, a method is performed at an electronic device with a display, a touch-sensitive surface, and one or more sensors to detect intensity of contacts with the touch-sensitive surface. The method includes: displaying, on the display, a user interface that includes a representation of a media item. The method further includes, while displaying the user interface, detecting an input by a contact at a location on the touch-sensitive surface that corresponds to the representation of the media item. The method further includes, in response to detecting the input by the contact: in accordance with a determination that the input meets media hint criteria, wherein the media hint criteria include a criterion that is met when the contact has a characteristic intensity above a first intensity threshold: starting to play a respective portion of the media item; and while the media item is playing, dynamically changing a set of one or more audio properties of the media item as the characteristic intensity of the contact changes. The method further includes, in accordance with a determination that the input does not meet the media hint criteria, forgoing starting to play the respective portion of the media item and forgoing dynamically changing the set of one or more audio properties of the media item as the characteristic intensity of the contact changes.

In accordance with some embodiments, a method is performed at an electronic device with a display, a touch-sensitive surface, and one or more sensors to detect intensity of contacts with the touch-sensitive surface. The method includes: displaying, on the display, a user interface that includes a first interactive region of an application and a second interactive region of the application. The method further includes, while displaying the user interface, detecting a first input by a contact on the touch-sensitive surface at a location that corresponds to a first user interface element in the first interactive region on the display. The method further includes, in response to detecting the first input by the contact: in accordance with a determination that the first input meets intensity-based activation criteria, wherein the intensity-based activation criteria require that the contact have a characteristic intensity that is above a first intensity threshold in order for the intensity-based activation criteria to be met, obscuring the first interactive region of the application with the exception of the first user interface element without obscuring the second interactive region of the application. The method further includes, in accordance with a determination that the first input meets first selection criteria, wherein the first selection criteria do not require that the contact have a characteristic intensity that is above the first intensity threshold in order for the selection criteria to be met, performing a first selection operation that corresponds to the first user interface element without obscuring the first interactive region of the application.

In accordance with some embodiments, an electronic device that is in communication with a display and an audio system includes one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device that is in communication with a display and an audio system, cause the device to perform or cause performance of the operations of any of the methods described herein. In accordance with some embodiments, a graphical user interface on an electronic device that includes a memory, and one or more processors to execute one or more programs stored in the memory includes one or more of the elements displayed in any of the methods described herein, which are updated in response to inputs, as described in any of the methods described herein. In accordance with some embodiments, an electronic device that is in communication with a display and an audio system includes means for performing or causing performance of the operations of any of the methods described herein. In accordance with some embodiments, an information processing apparatus, for use in an electronic device that is in communication with a display and an audio system, includes means for performing or causing performance of the operations of any of the methods described herein.

Thus, electronic devices that are in communication with displays and audio systems are provided with faster, more efficient methods and interfaces for providing audio feedback and blurring audio, thereby increasing the effectiveness, efficiency, and user satisfaction with such devices. Such methods and interfaces may complement or replace conventional methods for providing audio feedback and blurring audio.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for providing audio feedback and blurring audio, thereby increasing the effectiveness, efficiency, and user satisfaction with such devices. Such methods and interfaces may complement or replace conventional methods for providing audio feedback and blurring audio.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8B are flow diagrams illustrating a method of dynamically adjusting presentation of audio outputs, in accordance with some embodiments.

FIG. 8C is a flow diagram illustrating a method of dynamically adjusting presentation of audio outputs, in accordance with some embodiments.

FIGS. 8D-8F are flow diagrams illustrating a method of dynamically adjusting presentation of audio outputs, in accordance with some embodiments.

FIGS. 8G-8H are flow diagrams illustrating a method of dynamically adjusting visual presentation of a user interface, in accordance with some embodiments.

FIGS. 9A-9C are flow diagrams illustrating a method of providing audio output based on audio profiles, in accordance with some embodiments.

DESCRIPTION OF EMBODIMENTS

The disclosed embodiments provide methods and devices for dynamically adjusting presentation of audio outputs. More specifically, in some embodiments, the devices provided herein preview audio content by adjusting audio properties (e.g., volume or non-volume properties) in accordance with the magnitude of a user input (e.g., the intensity of a contact on a touch-sensitive surface and/or the length of a swipe gesture). In some embodiments, while a device is providing a first audio output (e.g., playing a first song), the device "blurs in" a second audio output (e.g., a second song) in accordance with the magnitude of a user input. In some embodiments, blurring-in the second audio includes dynamically adjusting a non-volume property of first audio content (e.g., stereo balance, a cut-off frequency of a low-pass filter applied to the first audio content) based on the magnitude of the input.

Consider an example in which a song is playing via a music application on a user's device. At the same time, the user may have a messaging application open that is displaying a video message (imagine that the video is not yet playing and that the user has to press on the image of the video to play it). In some embodiments, the user can play a "hint" of the video message through a press-and-hold gesture on the video message. The hint blurs-out the song (e.g., by reducing the volume and decreasing the cutoff frequency of a low-pass filter as the intensity of the press-and-hold gesture increases) and blurs-in the video message (by increasing the volume as the intensity of the press-and-hold gesture increases). In some embodiments, above a certain contact intensity, the device plays the video message at full volume, and plays the song at low volume while filtering out the song's high frequency content, so that the song is audible only softly as a "whoomp whoomp" in the background.

In accordance with some embodiments, methods and devices are also provided for altering audio feedback. For example, when activation of a respective affordance causes the device to produce audio feedback, activation of the respective affordance twice in quick succession causes the device to alter the audio feedback.

Below, FIGS. 1A-1B, 2, and 3 provide a description of example devices.

Figure 6A:
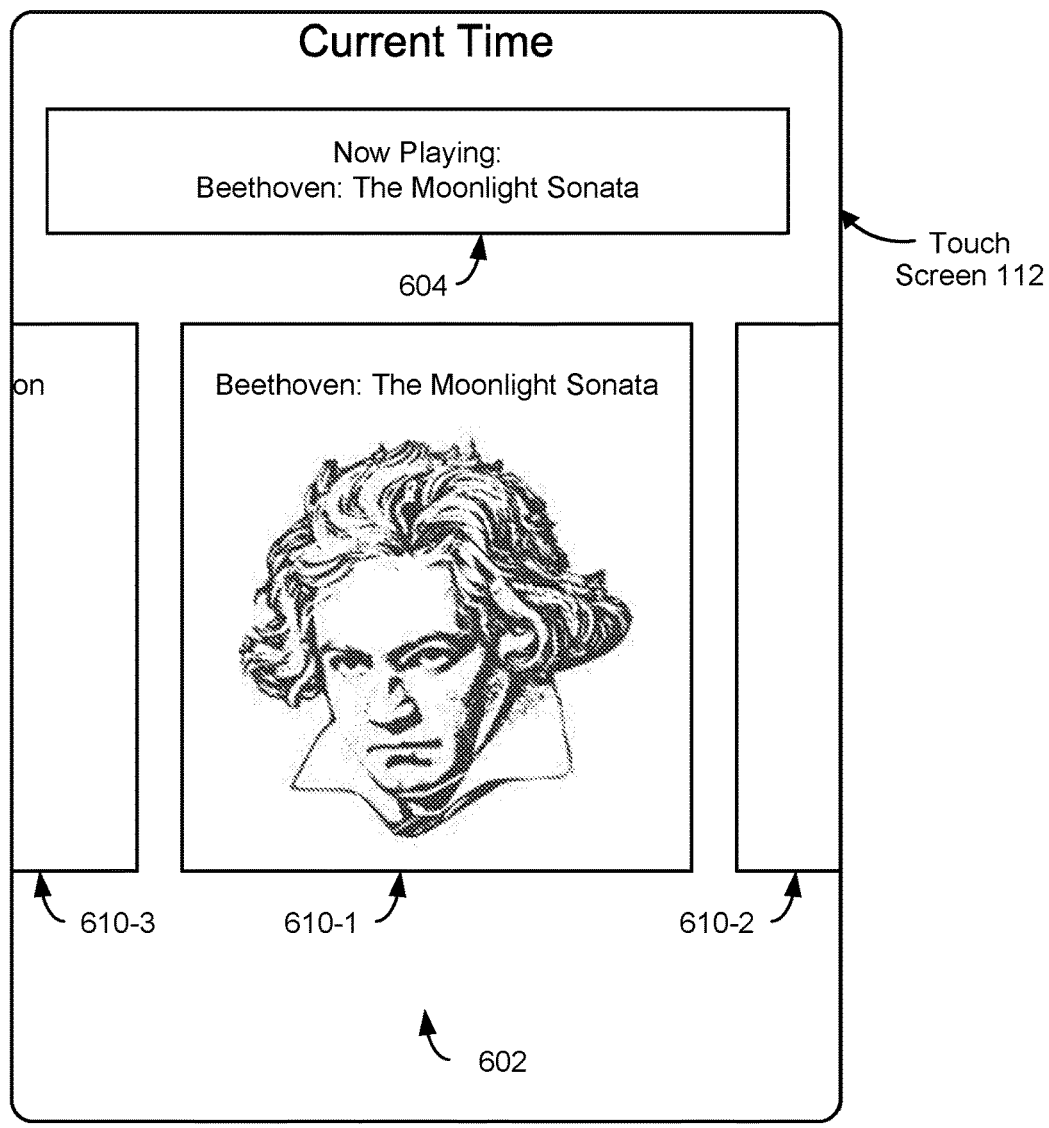
FIGS. 6A-6Y illustrate example user interfaces for dynamically adjusting presentation of audio outputs and, optionally, dynamically adjusting visual presentation of a user interface, in accordance with some embodiments.
Figure 6B:
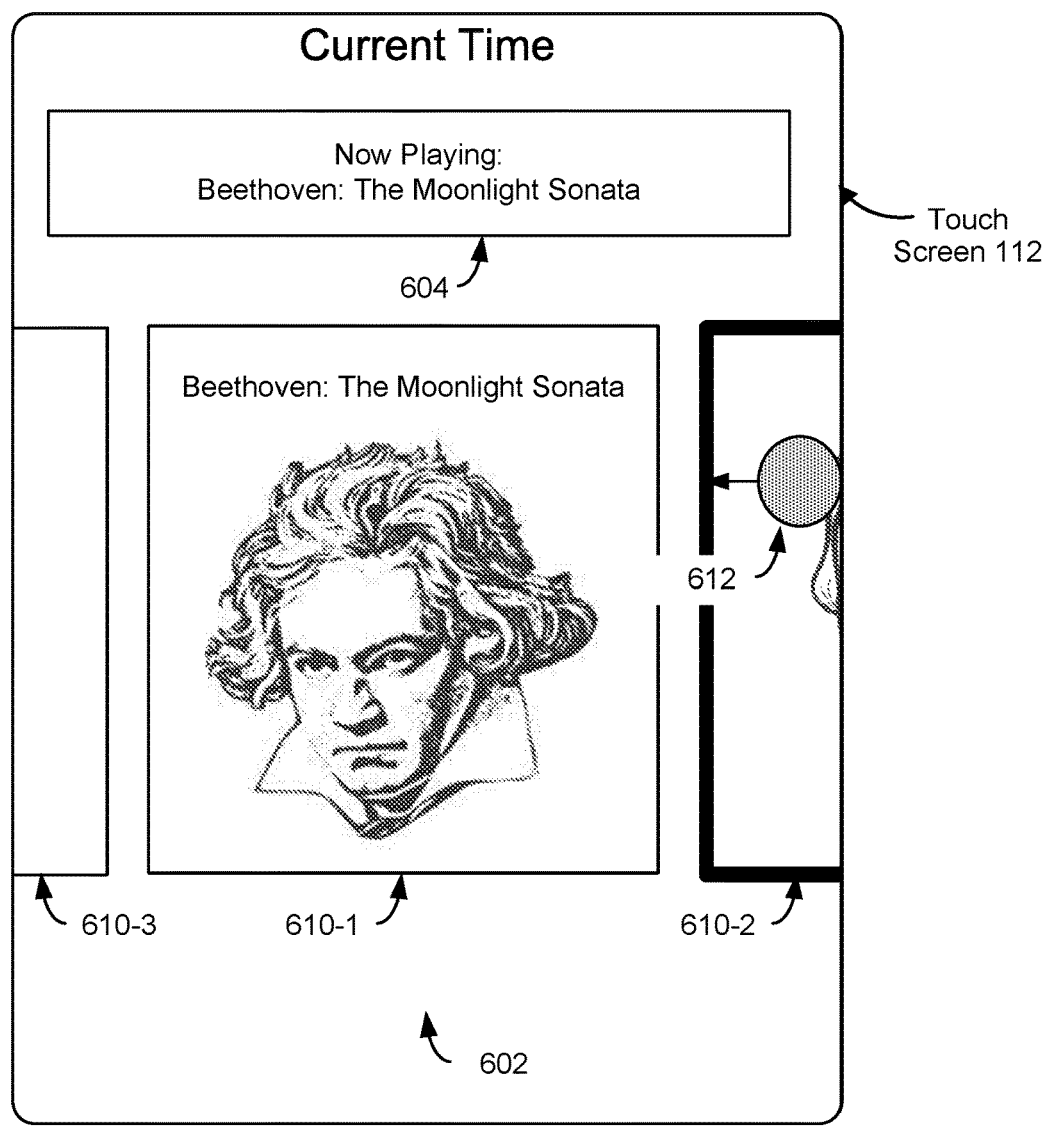
Figure 6B:
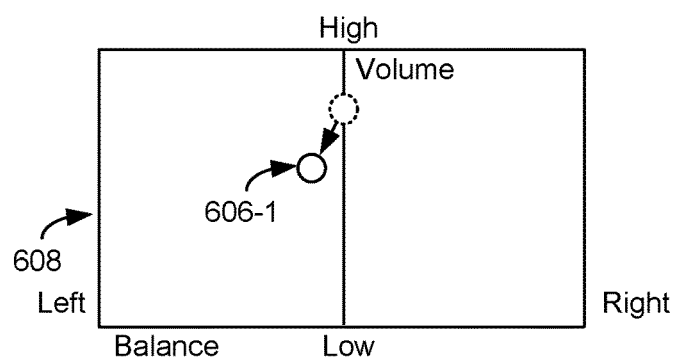
Figure 6C:
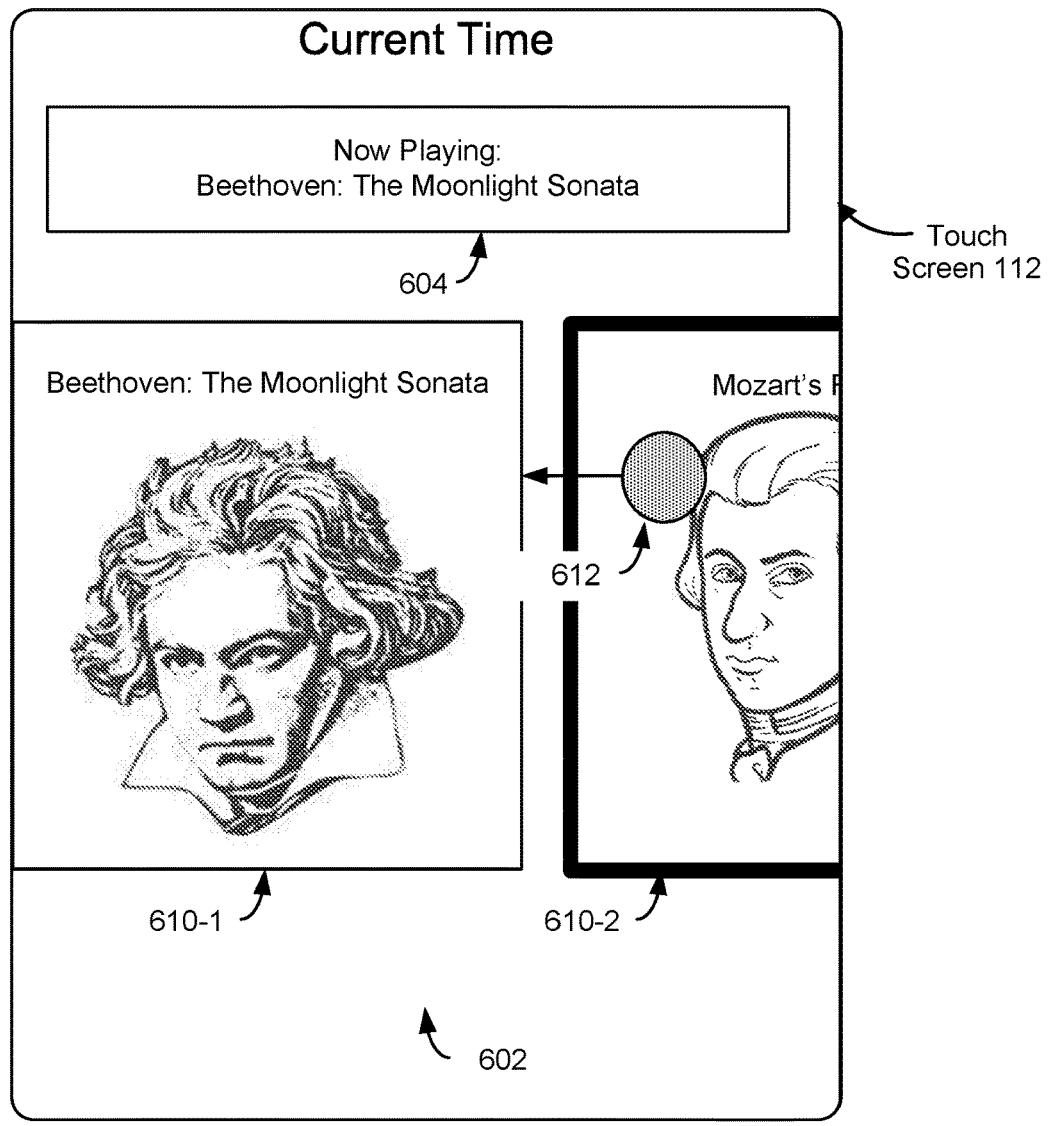
Figure 6C:
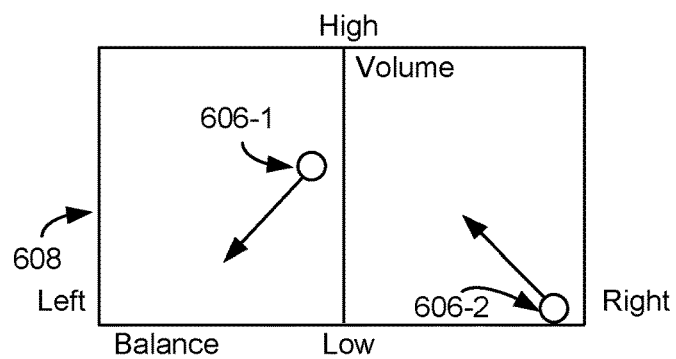
Figure 6D:
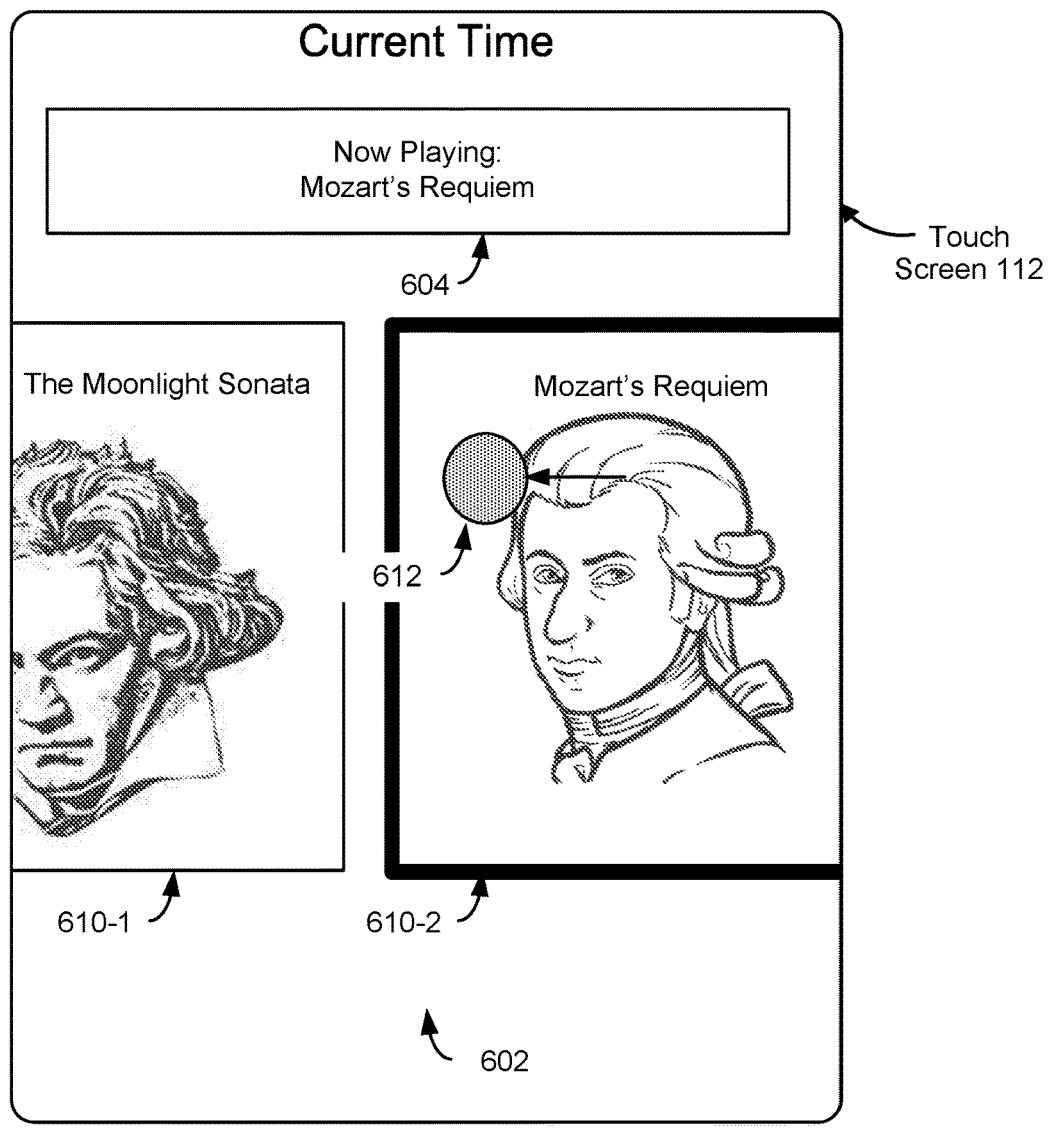
Figure 6D:
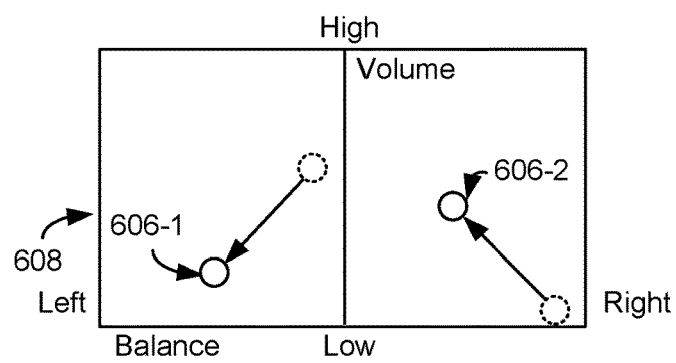
Figure 6E:
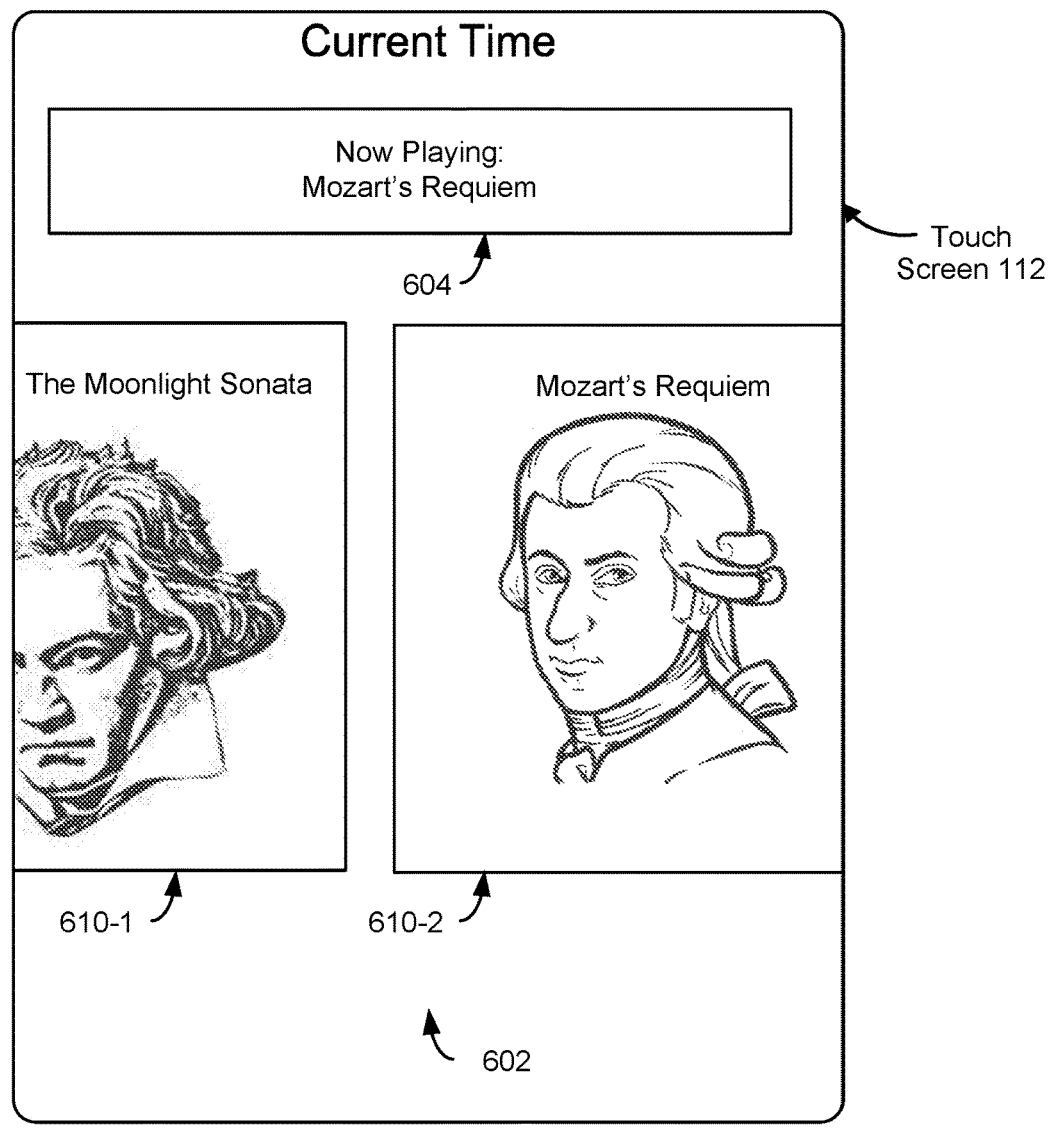
Figure 6E:
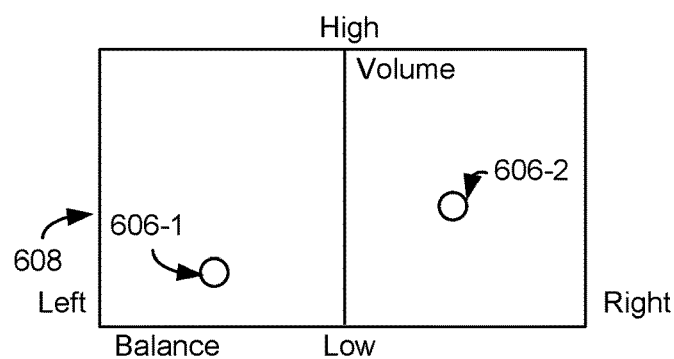
Figure 6F:
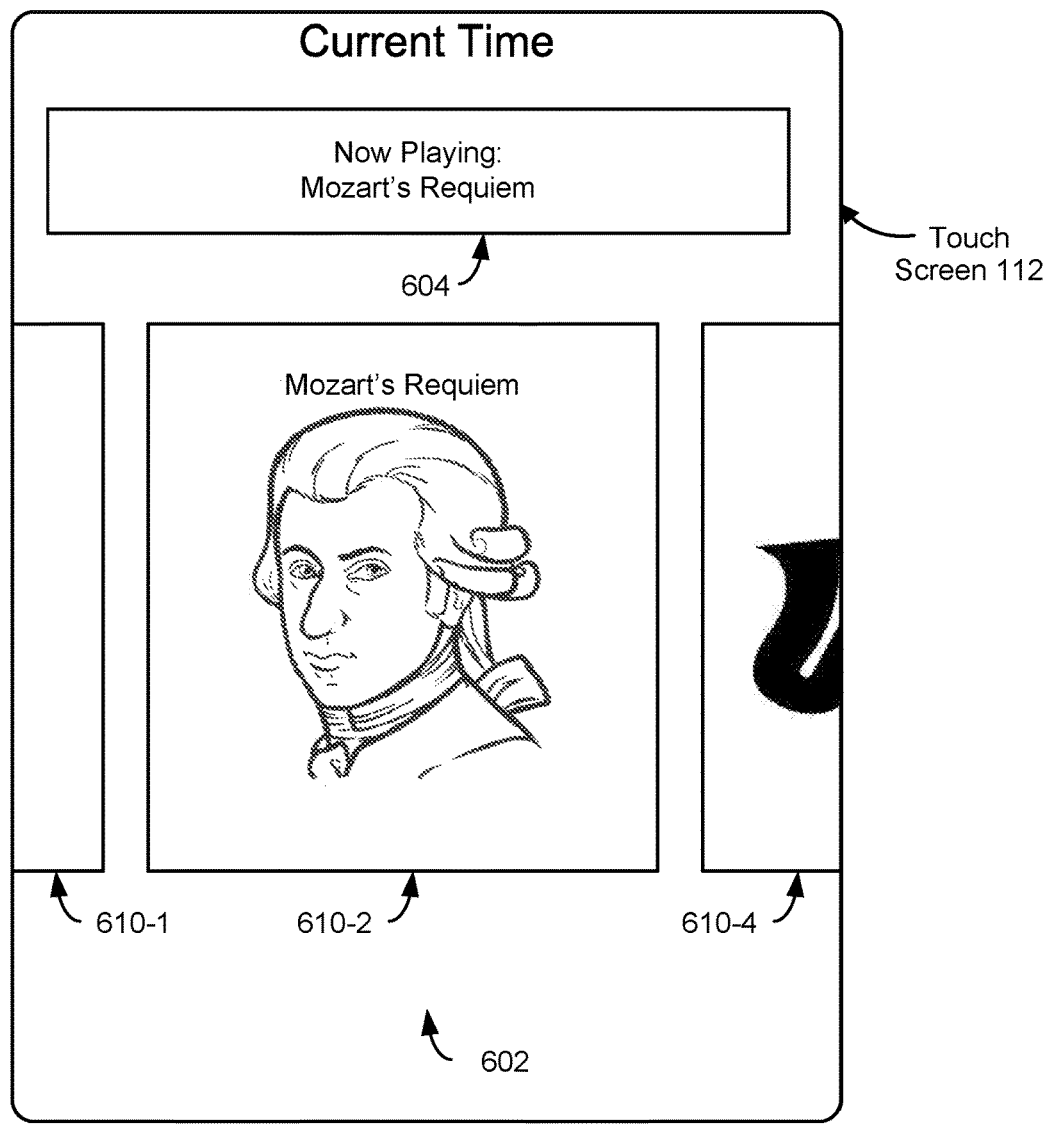
Figure 6F:
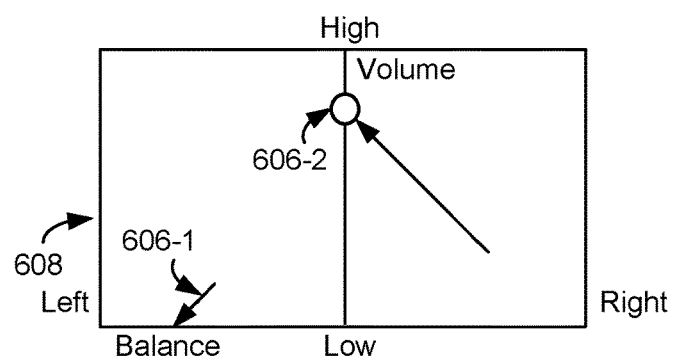
Figure 6G:
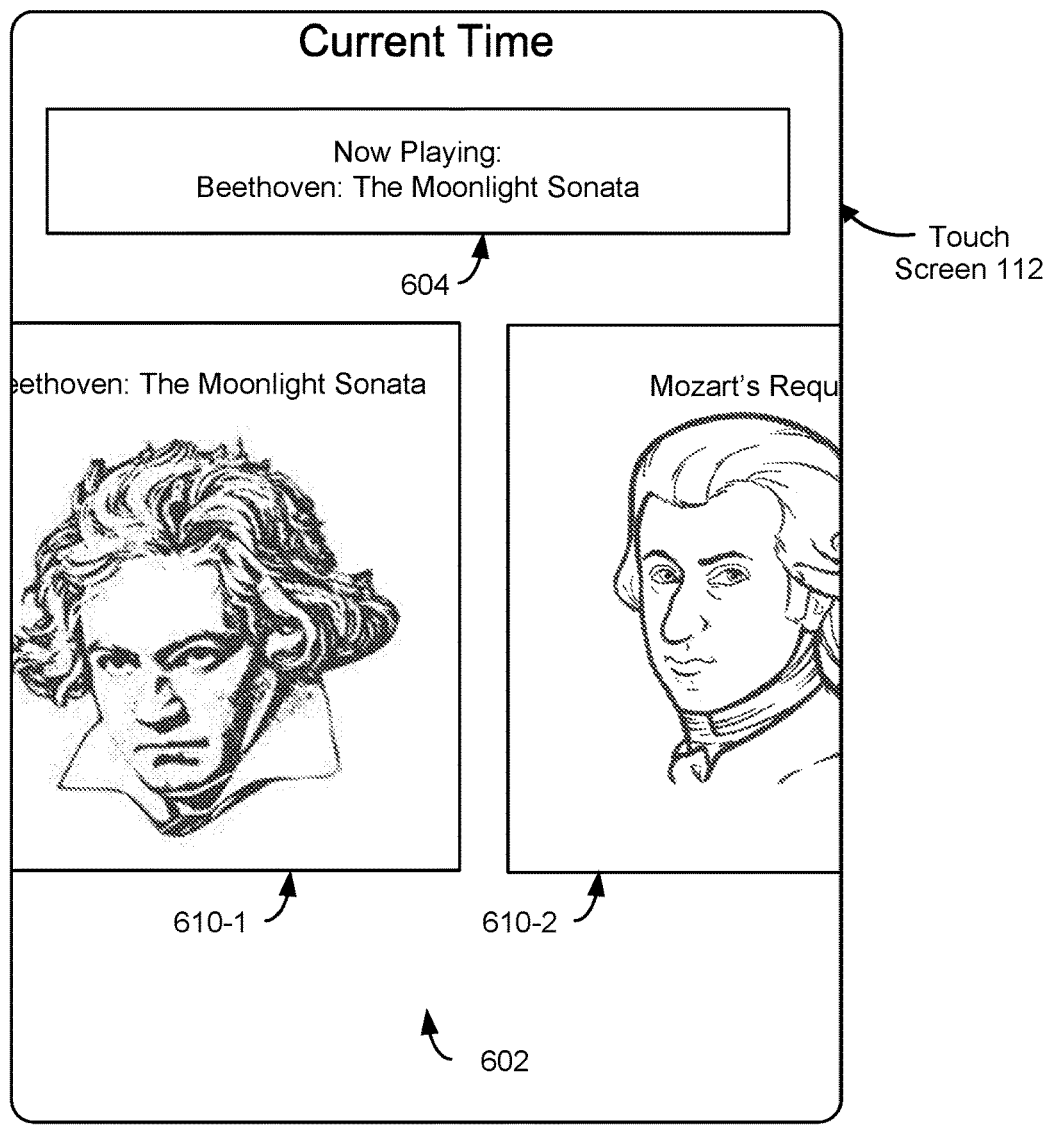
Figure 6G:
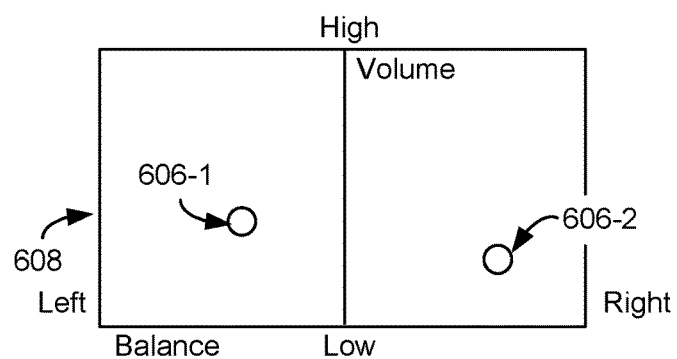
Figure 6H:
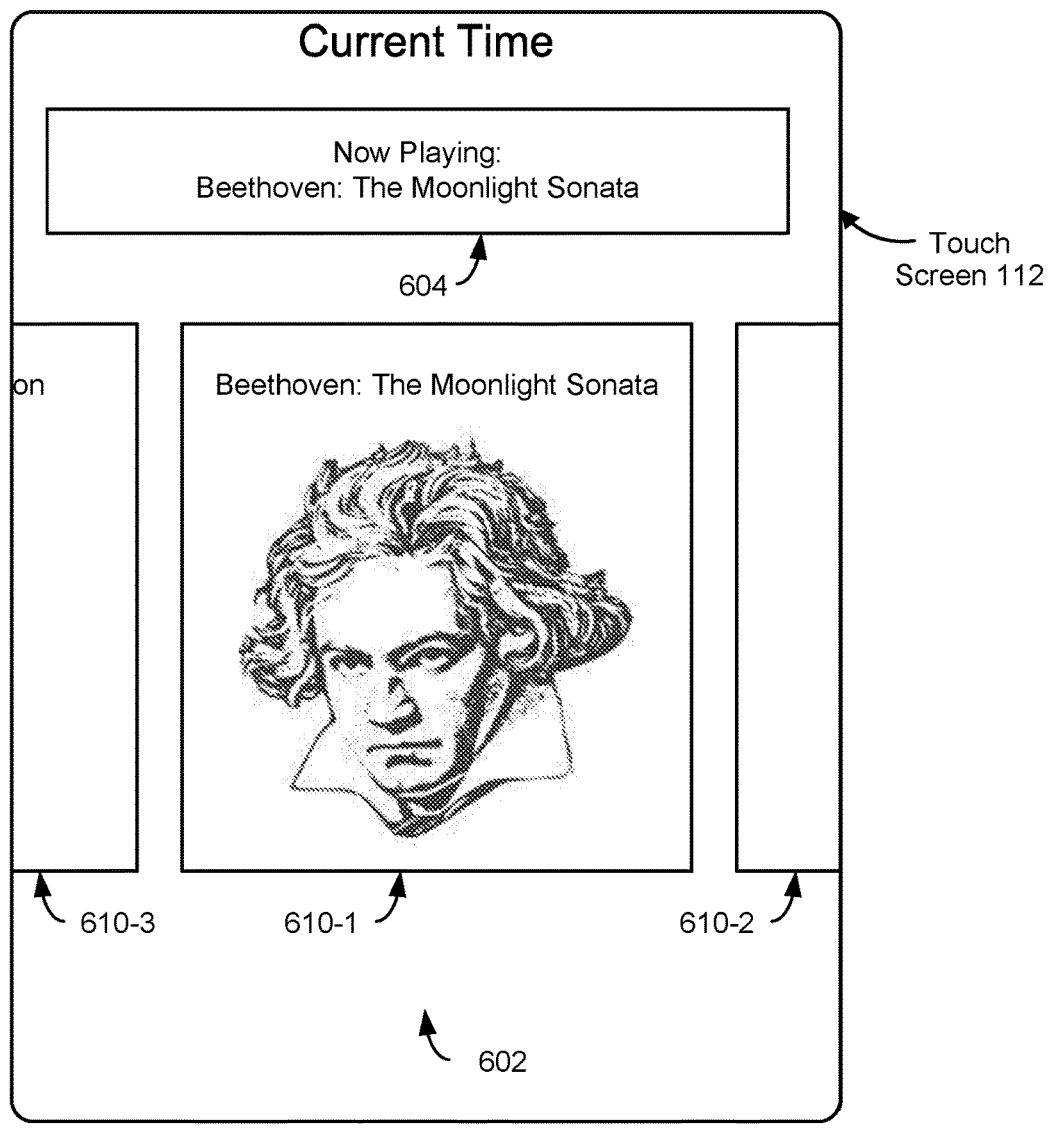
Figure 6H:
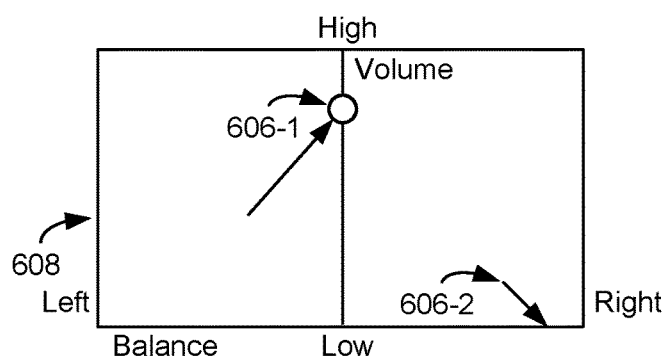
Figure 6I:
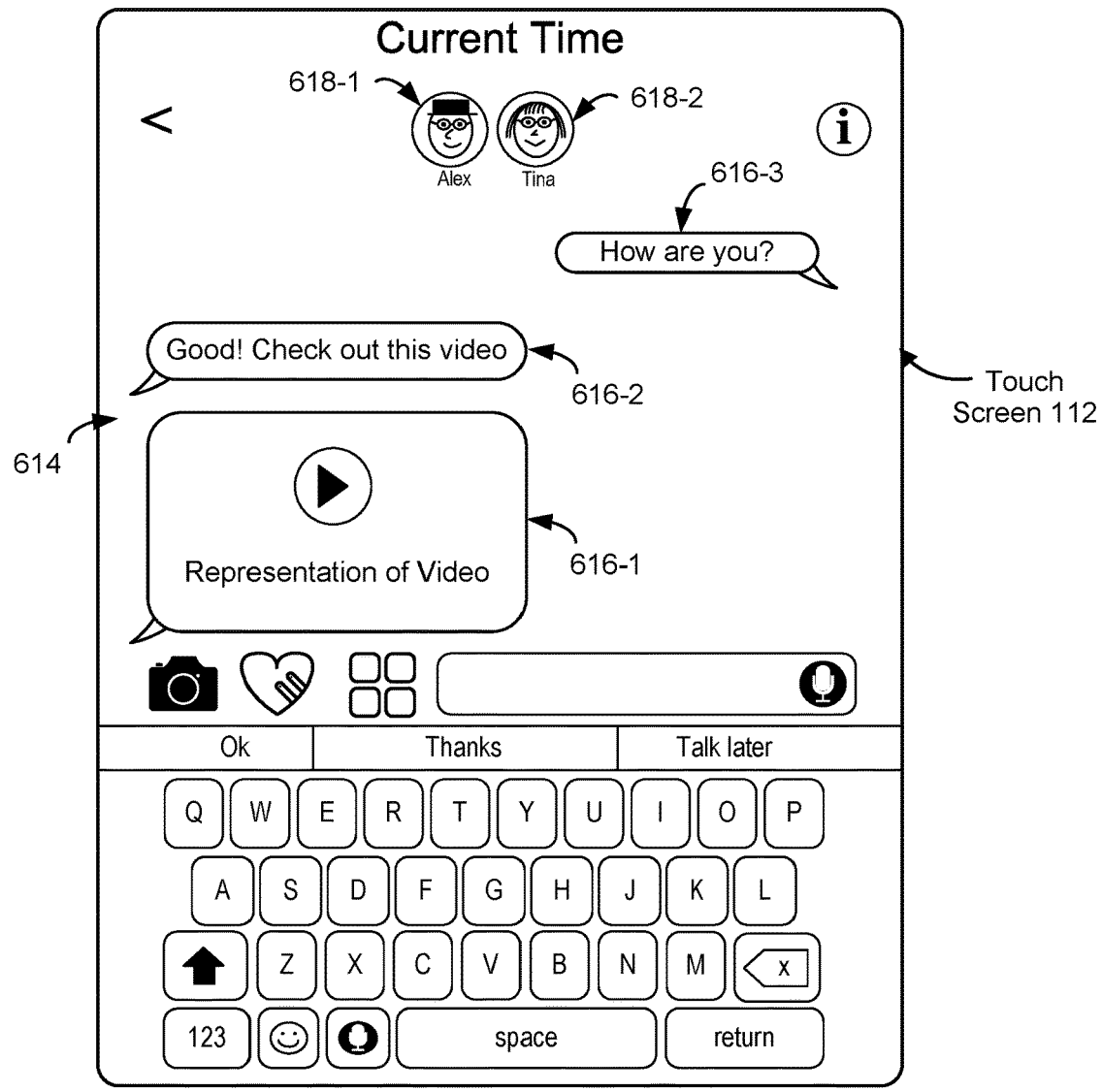
Figure 6I:
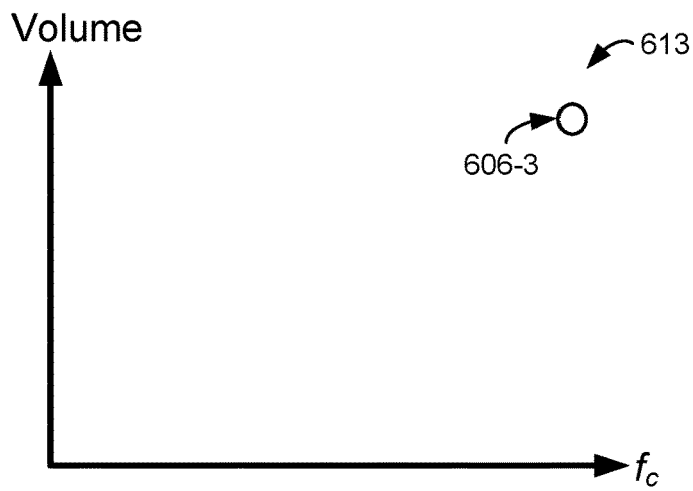
Figure 6J:
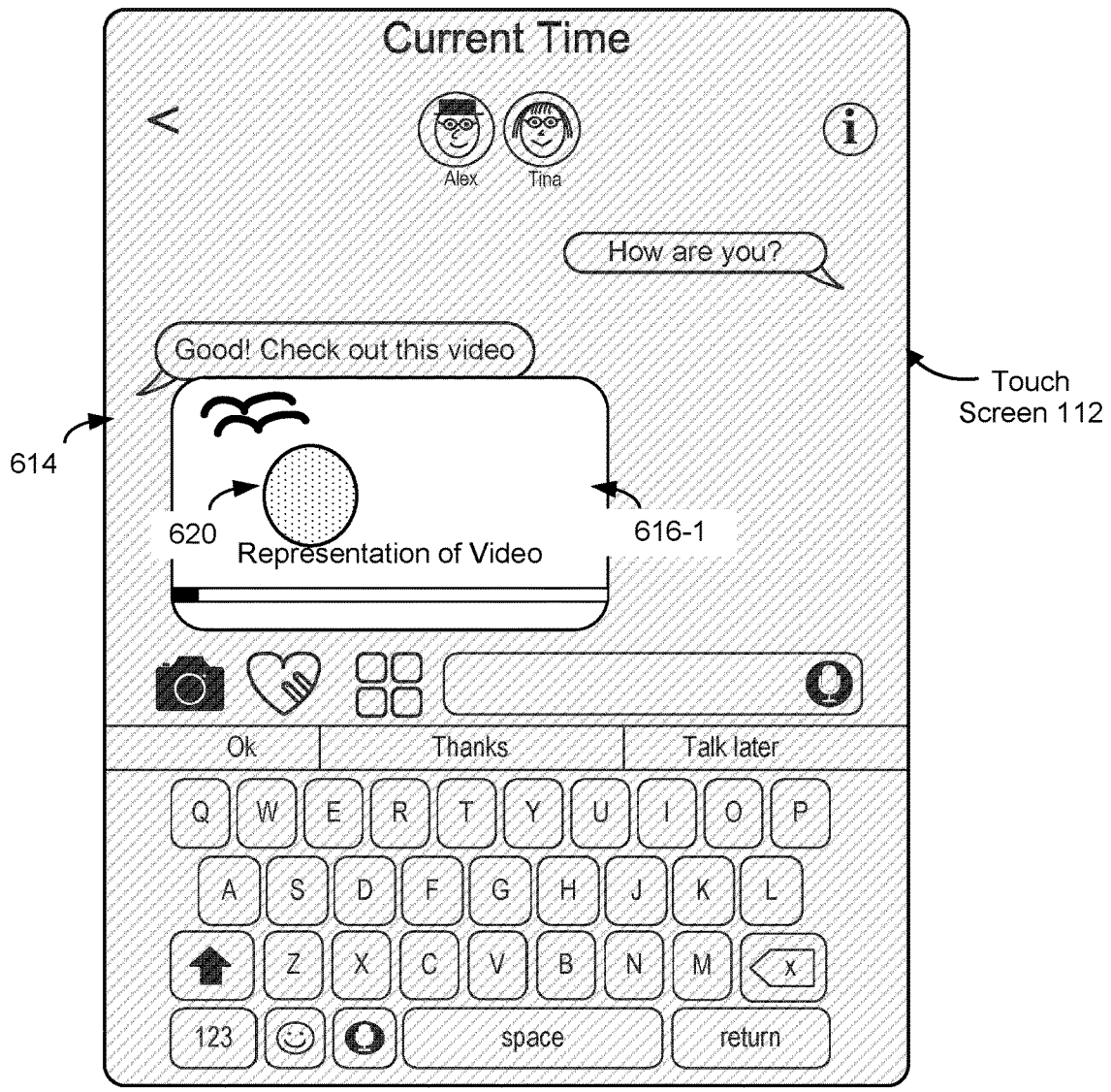
Figure 6J:
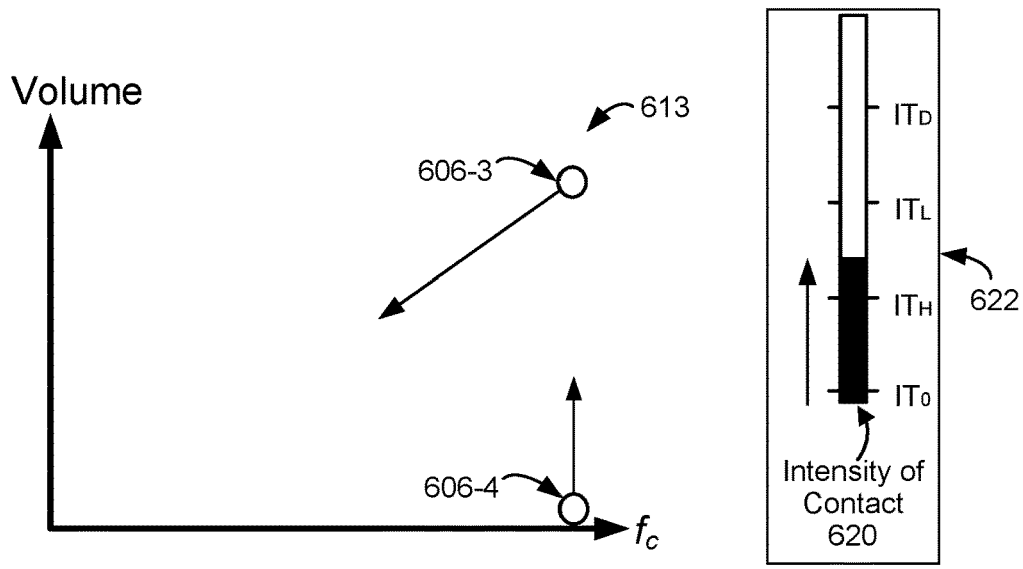
Figure 6K:
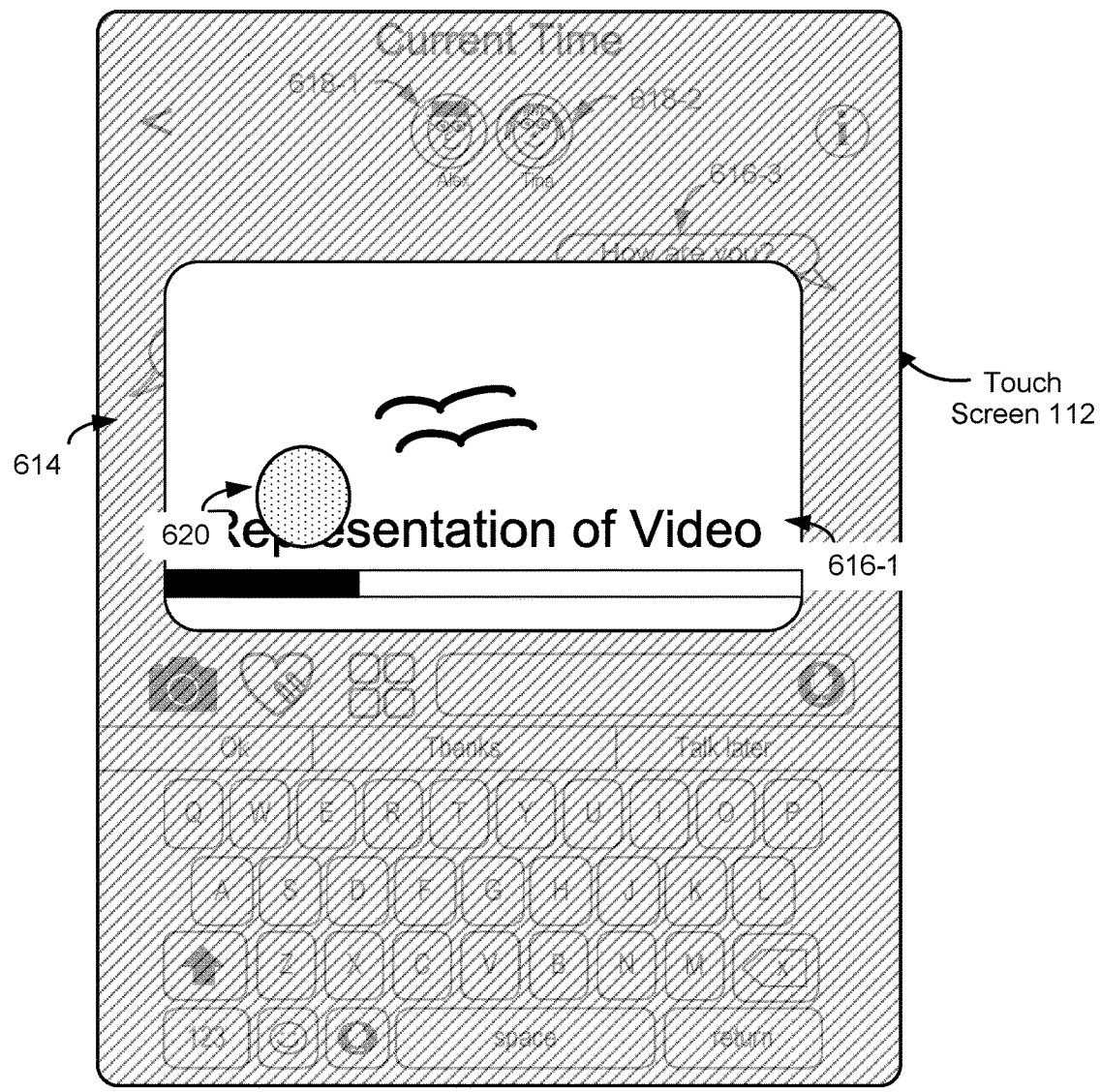
Figure 6K:
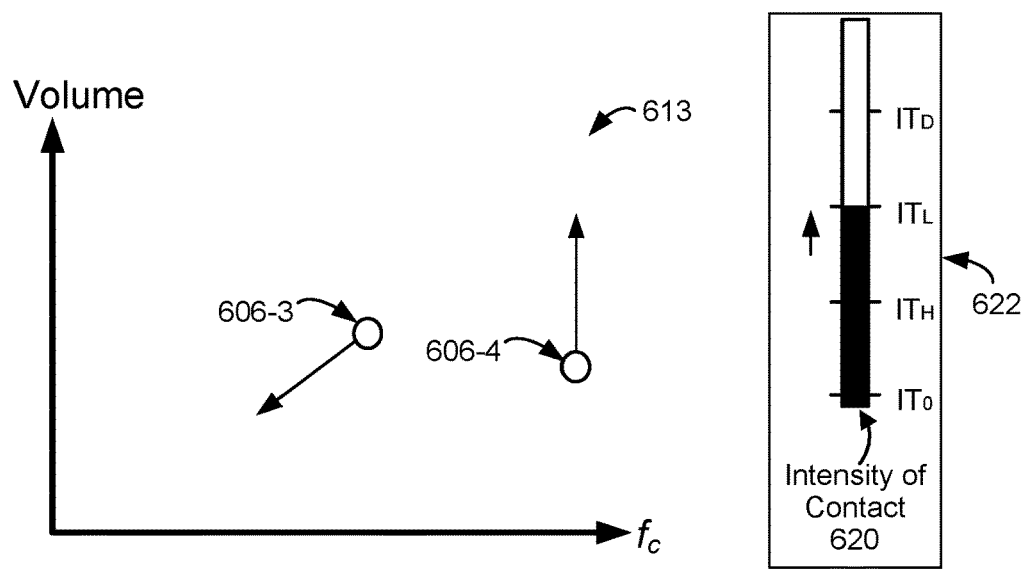
Figure 6L:
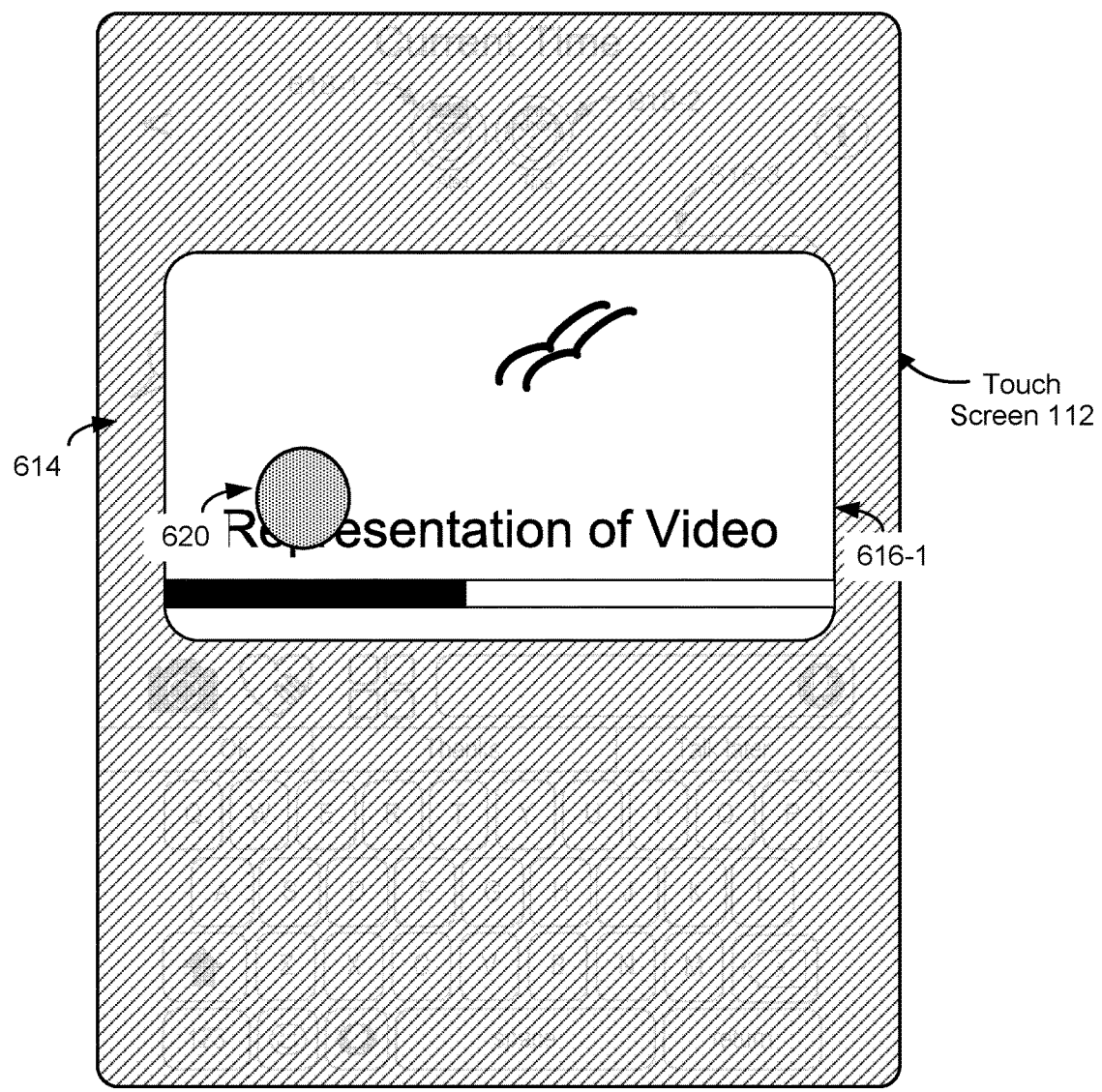
Figure 6L:
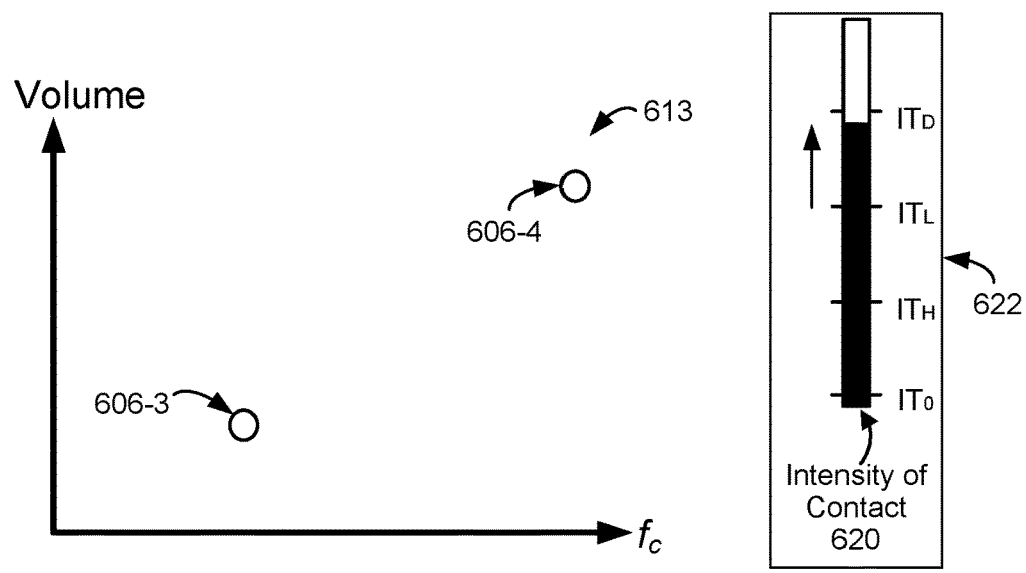
Figure 6M:
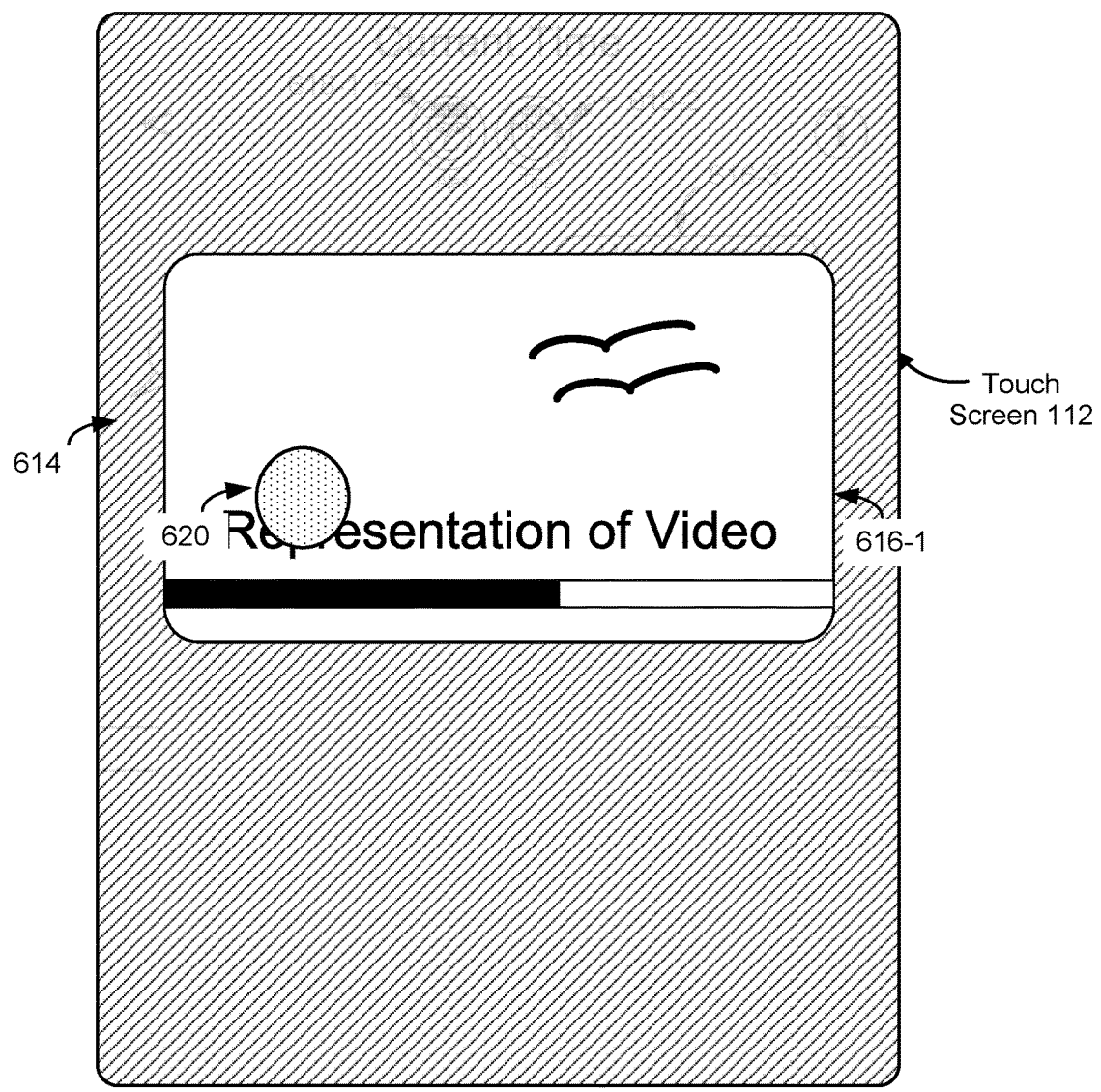
Figure 6M:
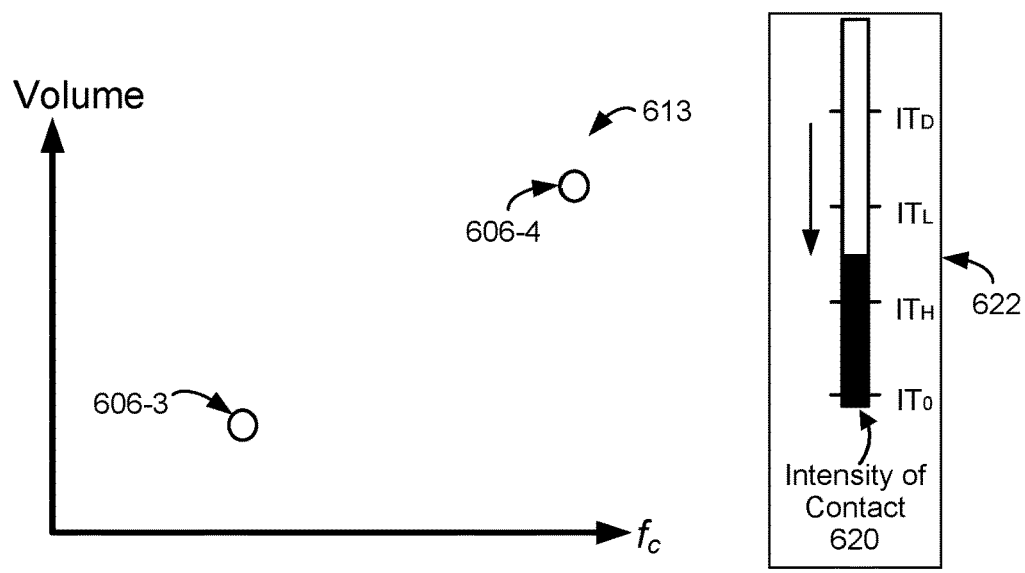
Figure 6N:
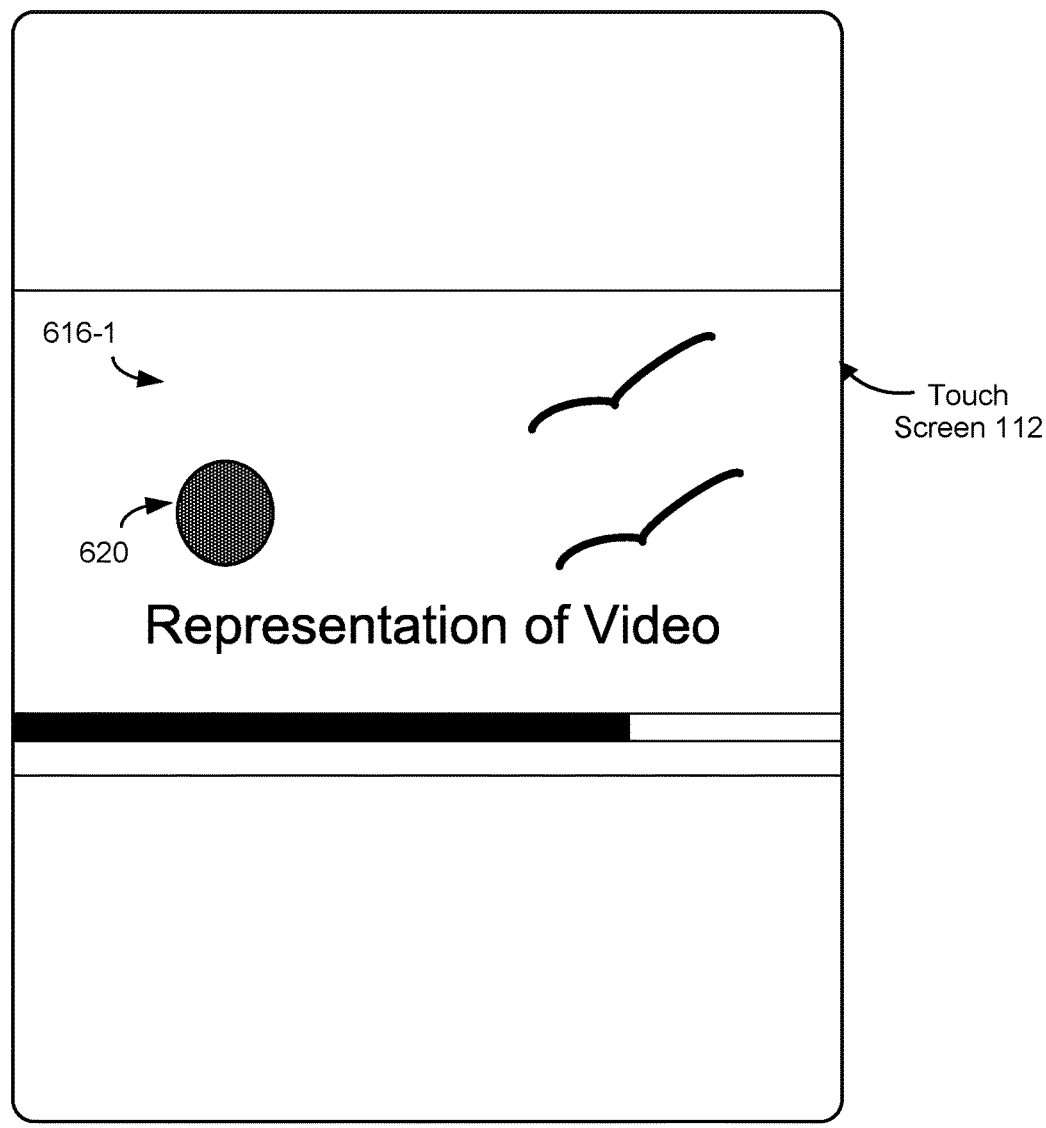
Figure 6N:
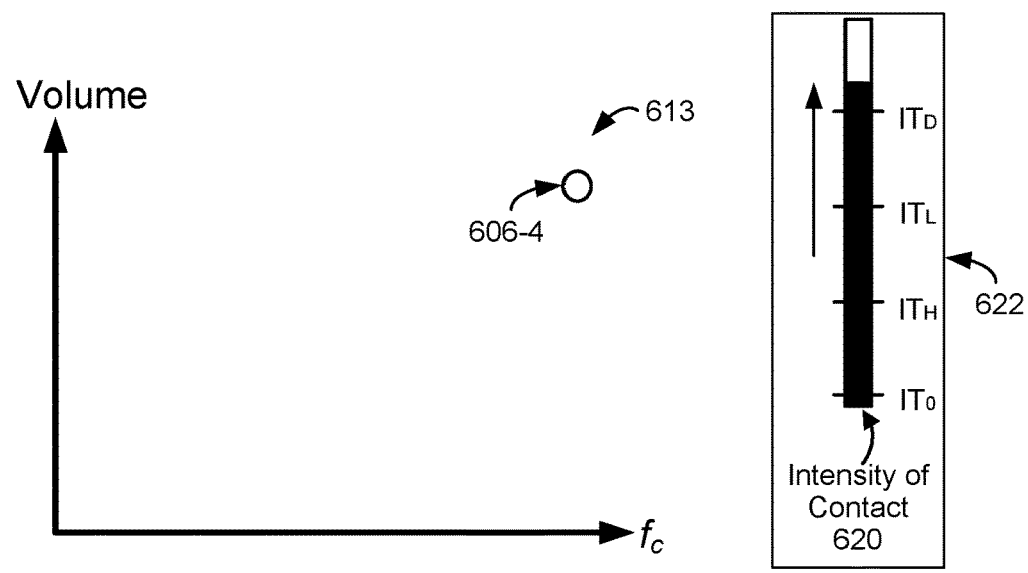
Figure 6O:
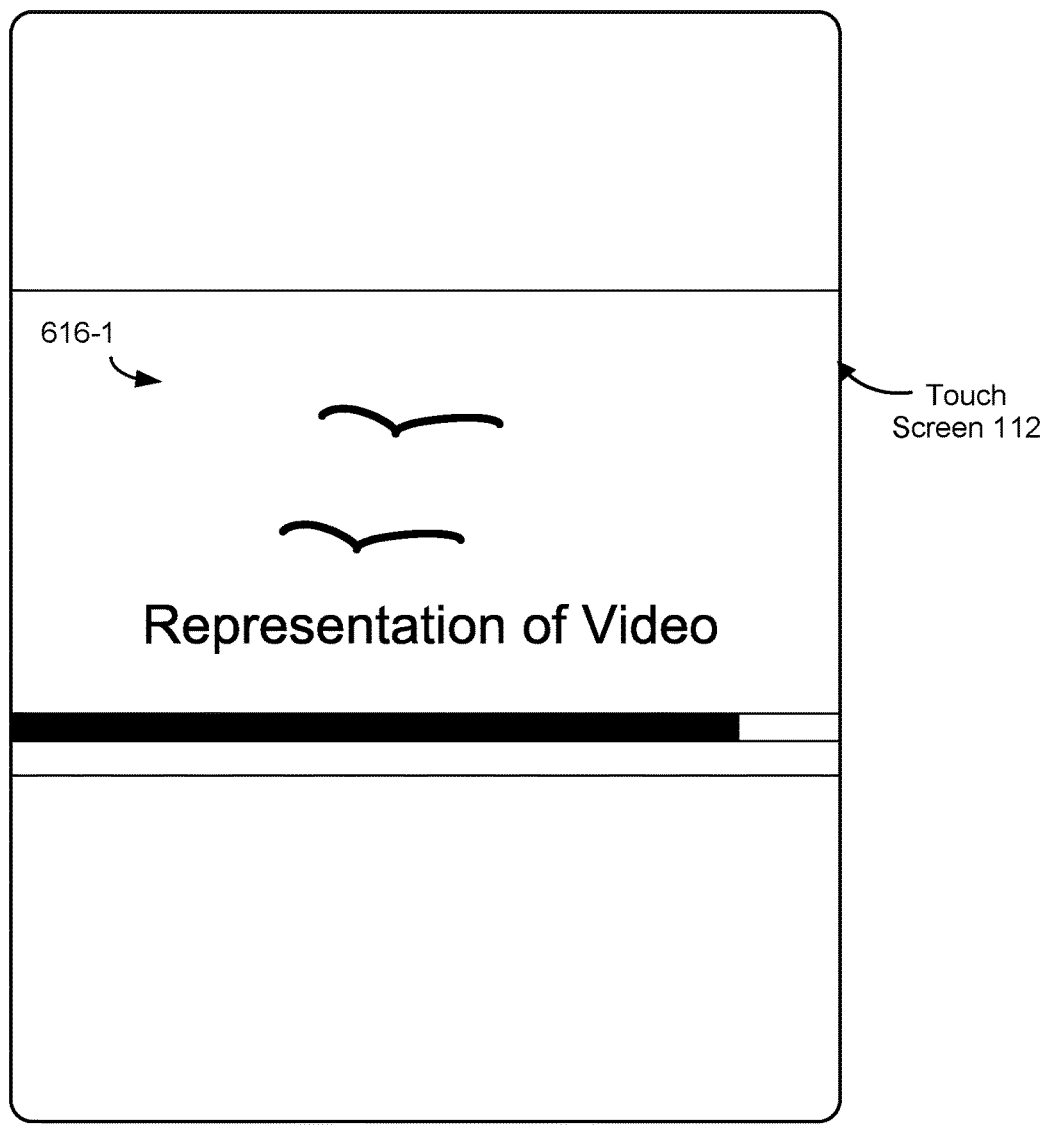
Figure 6O:
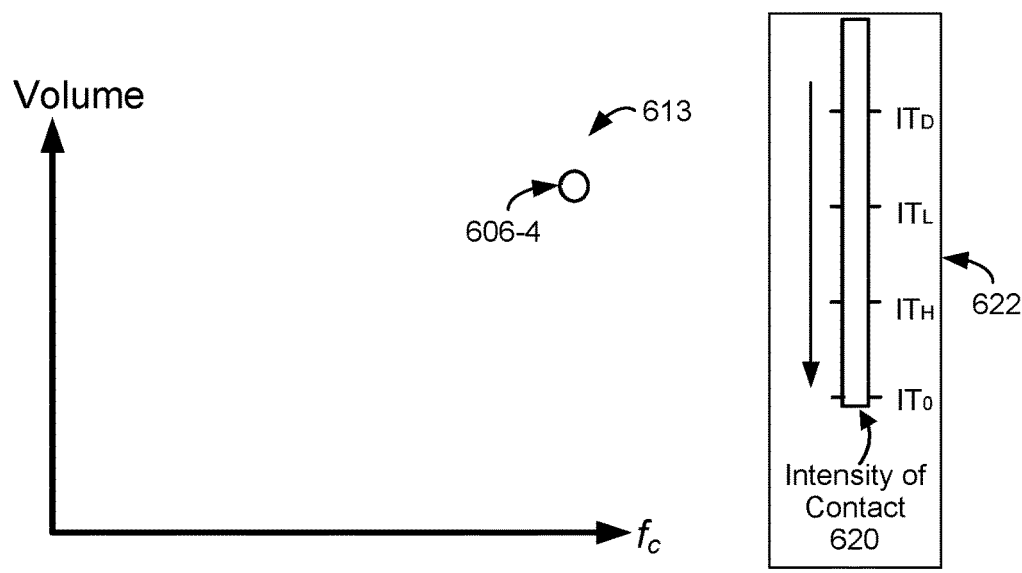
Figure 8B:
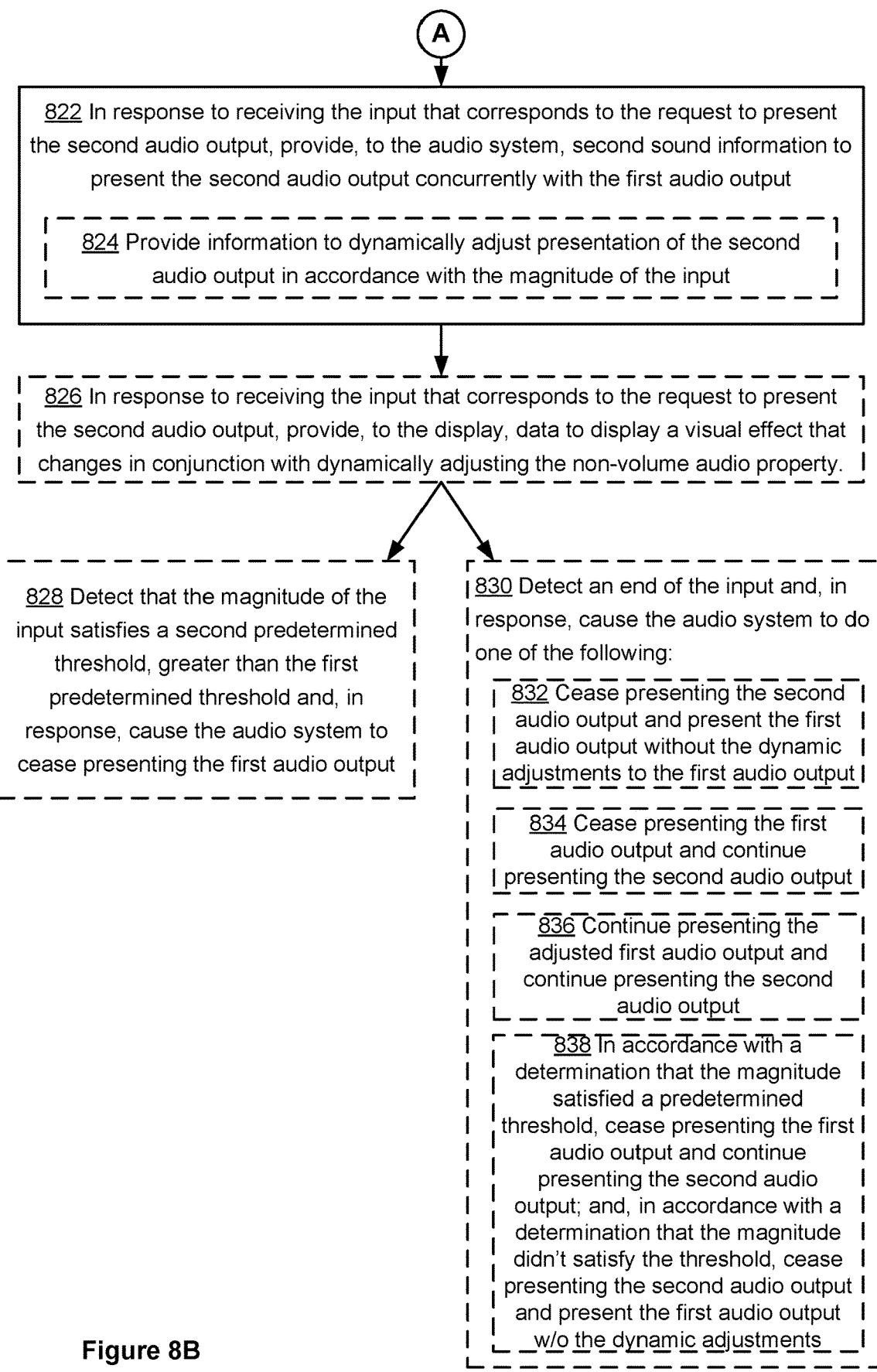

FIGS. 4A-4B and 6A-6O illustrate example user interfaces for "blurring in" an audio output (e.g., when background audio is already playing) in accordance with a magnitude of a user input. FIGS. 8A-8B and FIG. 8C illustrate two methods of "blurring in" an audio output (e.g., when background audio is already playing) in accordance with a magnitude of a user input. The user interfaces in FIGS. 6A-6O are used to illustrate the processes in FIGS. 8A-8C.

FIGS. 4A-4B and 6P-6Y illustrate example user interfaces for dynamically adjusting properties of an audio output (e.g., hinting at the audio output), in accordance with a magnitude of a user input. FIGS. 8D-8F illustrate a method of dynamically adjusting properties of an audio output (e.g., hinting at the audio output), in accordance with a magnitude of a user input. The user interfaces in FIGS. 6P-6Y are used to illustrate the processes in FIGS. 8D-8F.

In addition, FIGS. 4A-4B and 6P-6Y illustrate example user interfaces for providing visual feedback (e.g., visual blurring). FIGS. 9A-9C illustrate flow diagrams of a method of providing visual feedback (e.g., visual blurring), in accordance with some embodiments. The user interfaces in FIGS. 6P-6Y are used to illustrate the processes in FIGS. 9A-9C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
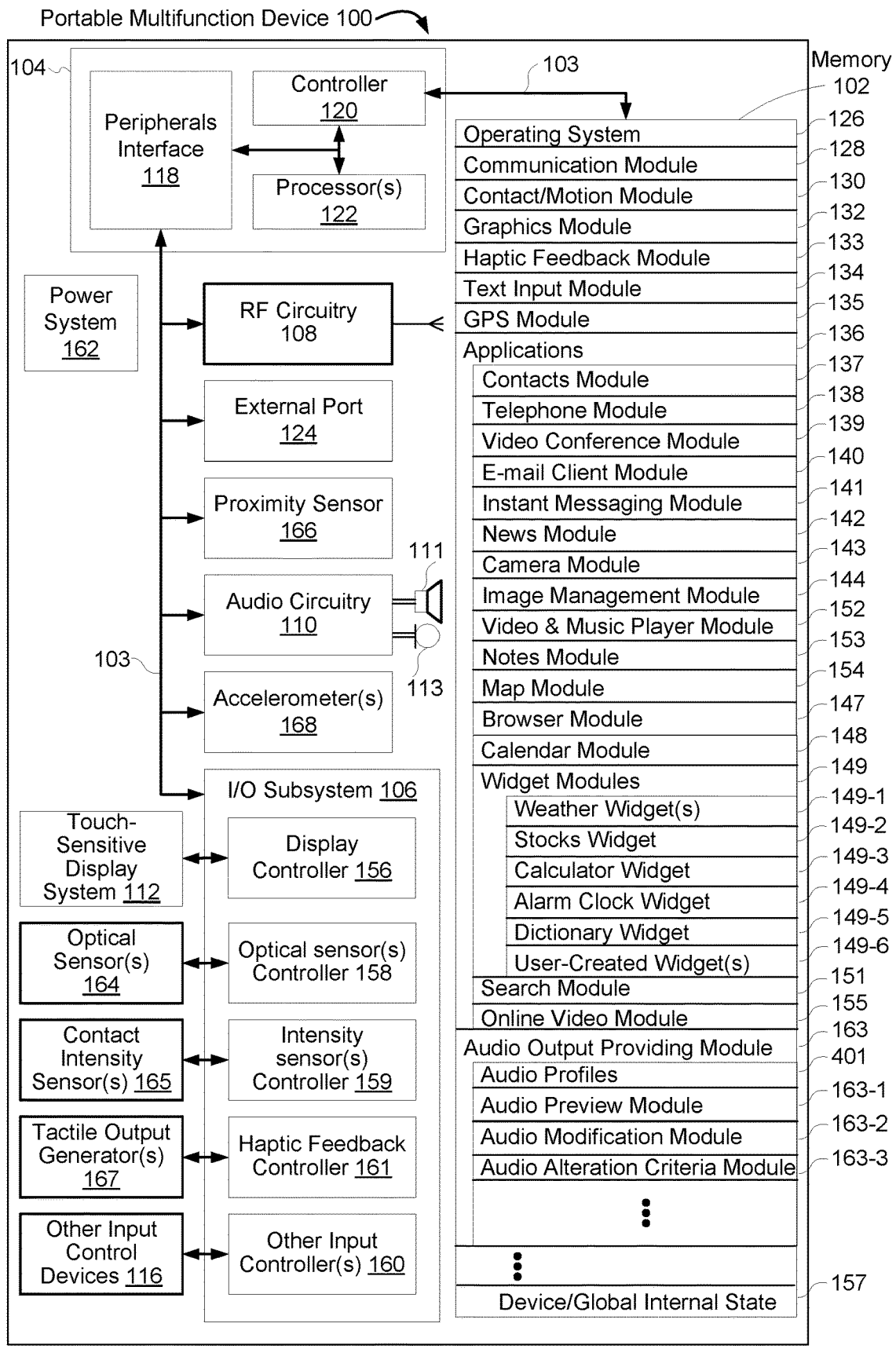
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
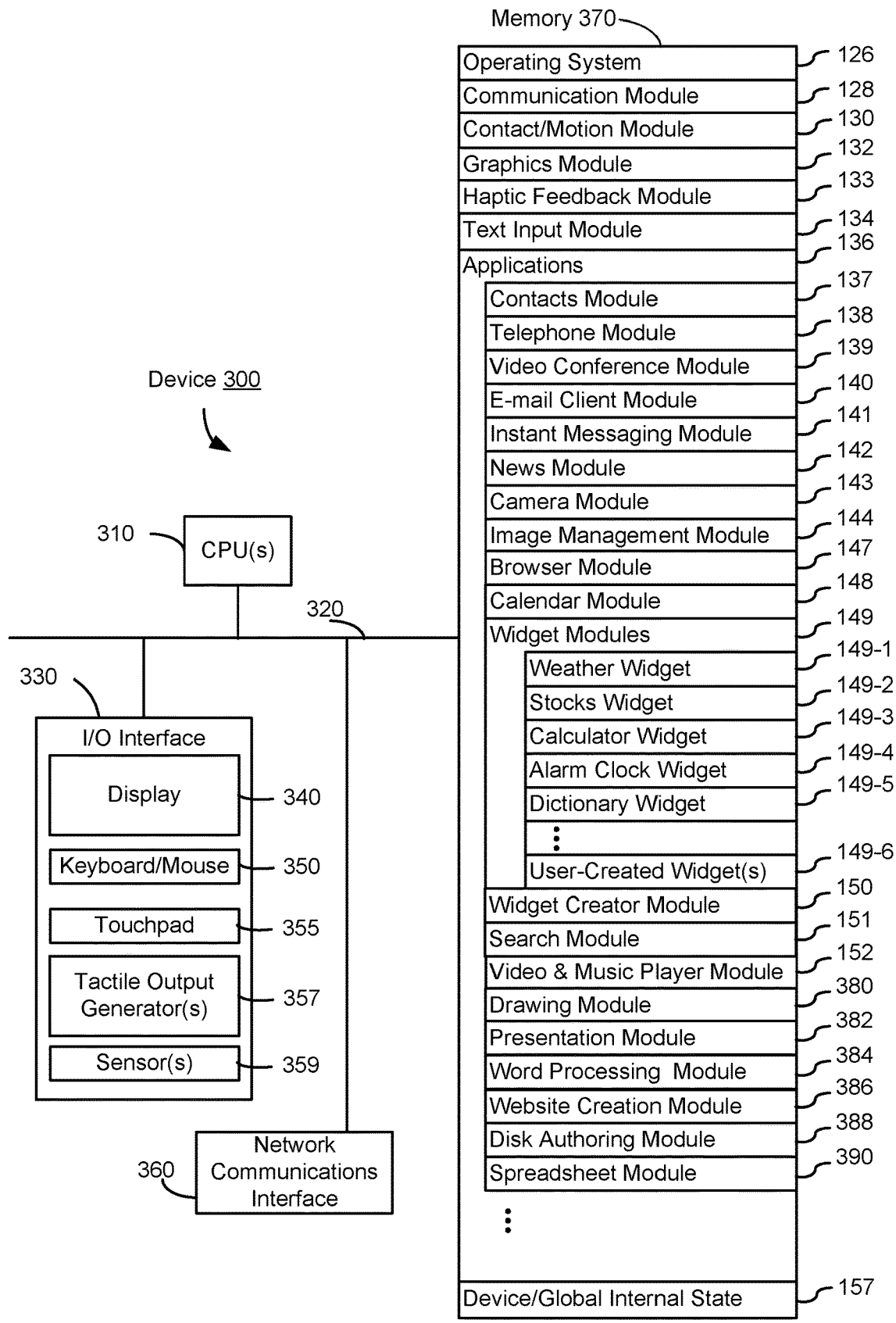
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, applications (or sets of instructions) 136, and audio-specific modules (including audio preview module 163-1, audio modification module 163-2, and audio alteration module 163-3). Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  news module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with touch-sensitive display system 112, display controller 156, contact/motion module 130, and graphics module 132, news module 142 includes executable instructions to display user-specific news articles (e.g., articles collected from a variety of publication sources based on user-specific preferences) and allow users to interact with the user-specific news articles (or to interact with portions of content included within the user-specific news articles).

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Figure 5:
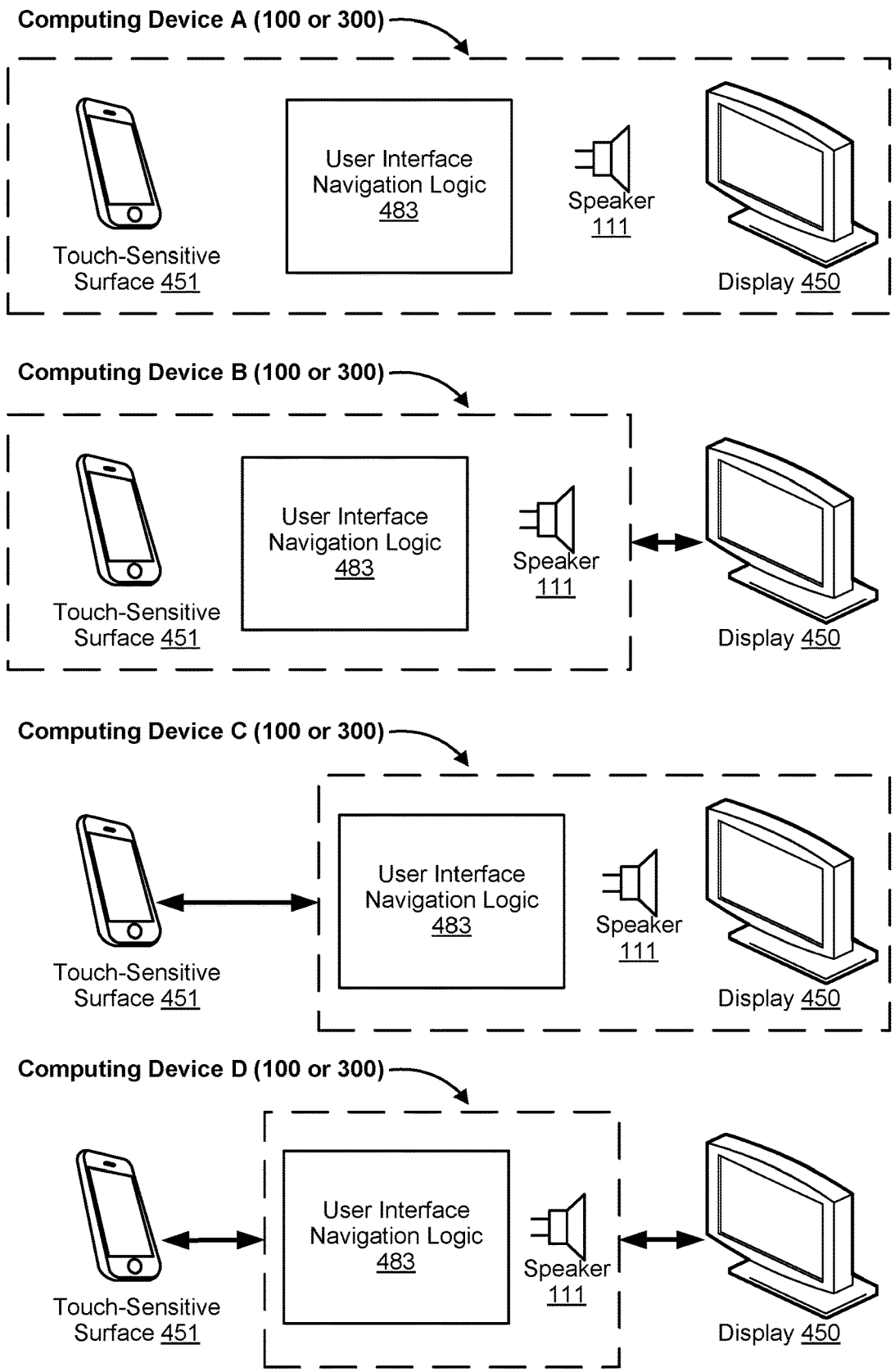
FIG. 5 illustrates example electronic devices that are in communication with a display and touch-sensitive surface where, for at least a subset of the electronic devices the display and/or touch-sensitive surface is integrated into the electronic device in accordance with some embodiments.

As pictured in FIG. 1A, portable multifunction device 100 also includes an audio output providing module 163 for providing sound information to an audio system so that the audio system can present audio output (e.g., as shown in FIG. 5, the audio system can be included in portable multifunction device 100 or separate from portable multifunction device 100). Audio output providing module 163 optionally includes the following modules (or sets of instructions), or a subset or superset thereof:

Audio profiles 401 for storing information about audio characteristics that correspond or are produced in response to, for example, user interactions with portable multifunction device 100 (e.g., audio envelope characteristics, pitch characteristics, left-right (L-R) balance characteristics, reverberation profiles, frequency filtering characteristics);

Audio previewing module 163-1, which includes executable instructions for providing information to play a preview of audio content (e.g., a particular song) and, optionally, adjust presentation of different content (e.g., a different song) in response to a request to present the first audio output (e.g., so that the two songs blur together);

Audio modification module 163-2, which includes executable instructions for altering a first audio output (e.g., an audio output input resulting from a first user input directed to an affordance in a user interface) in response to detecting a second user input directed to an affordance in the user interface (e.g., the same affordance or a different affordance). In some embodiments, the audio modification module 163-1 modifies a respective audio profile 401; and Audio alteration criteria module 163-3, which includes executable instructions for determining, based on audio alteration criteria, whether audio modification module 163-2 should modify the first audio output.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
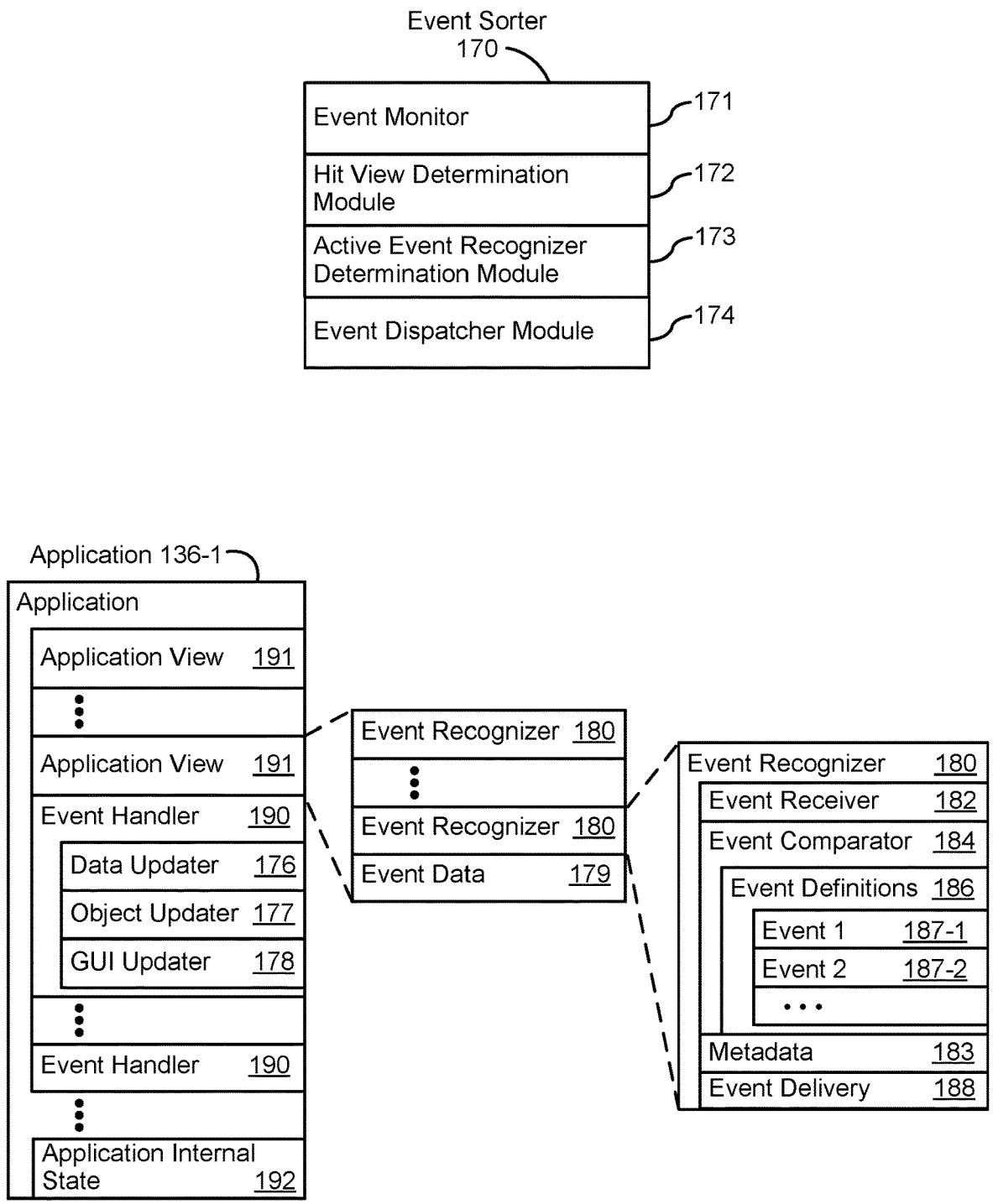
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
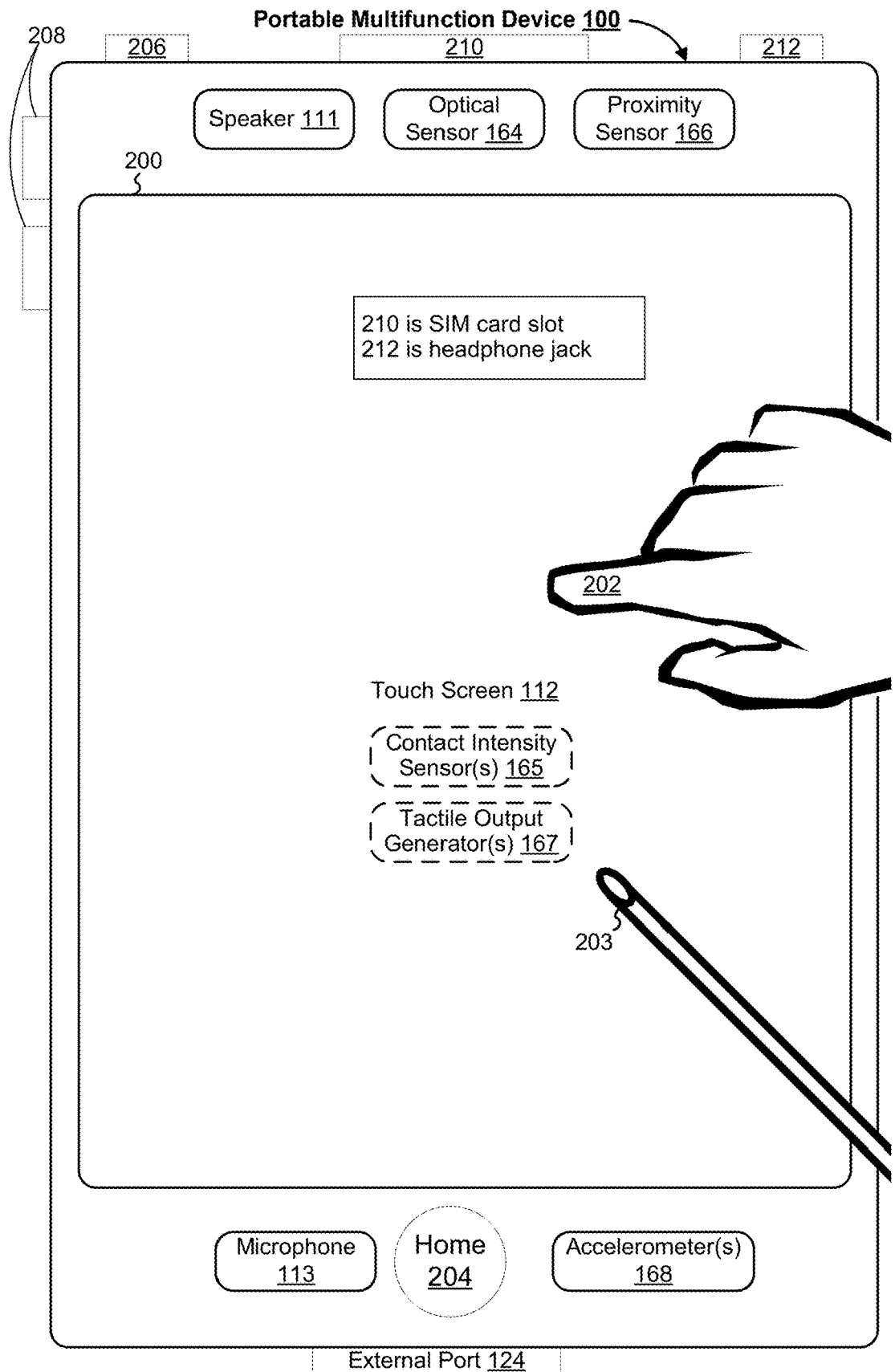
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an example of a multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
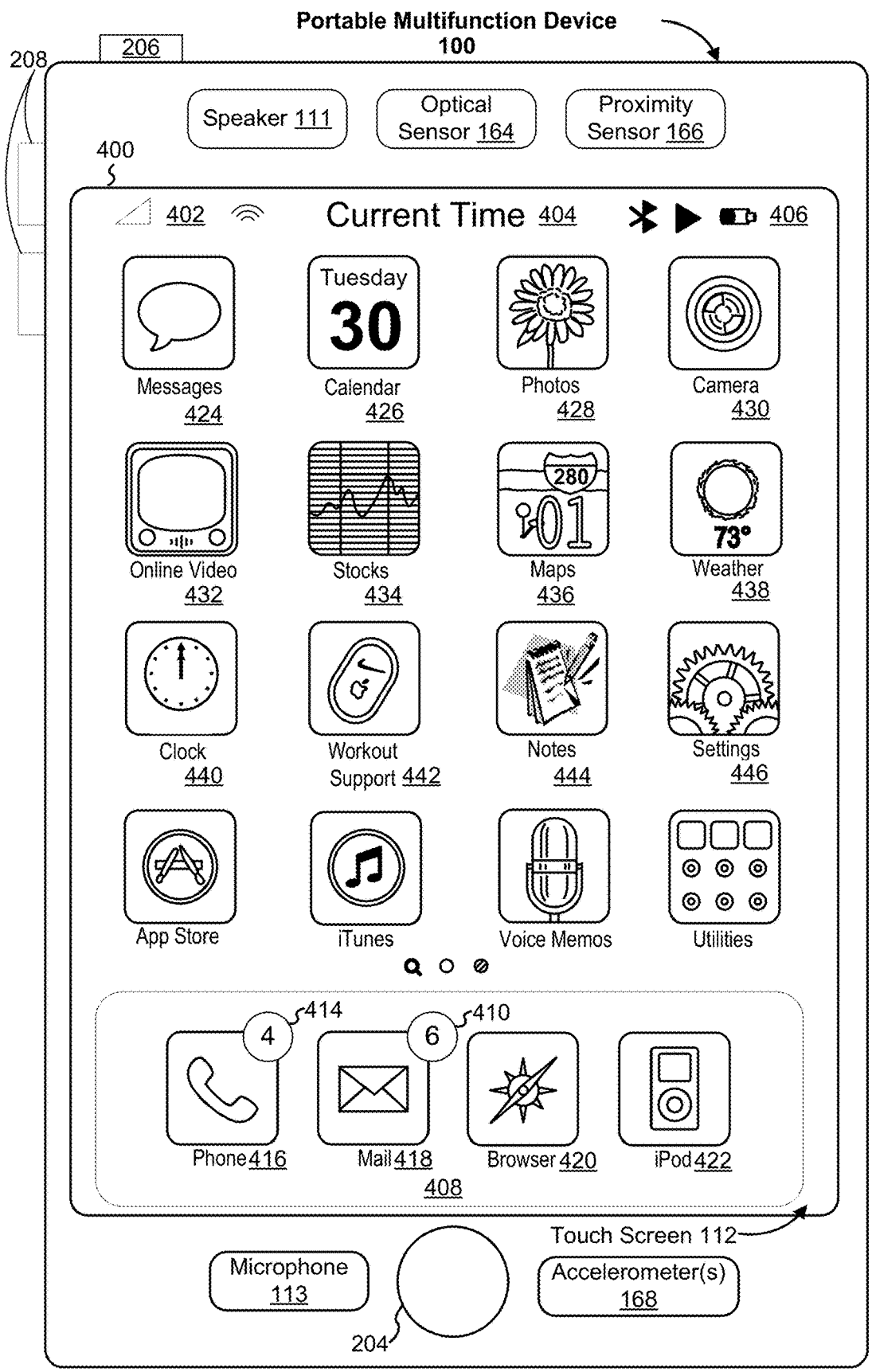
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for news module 142, labeled "News;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
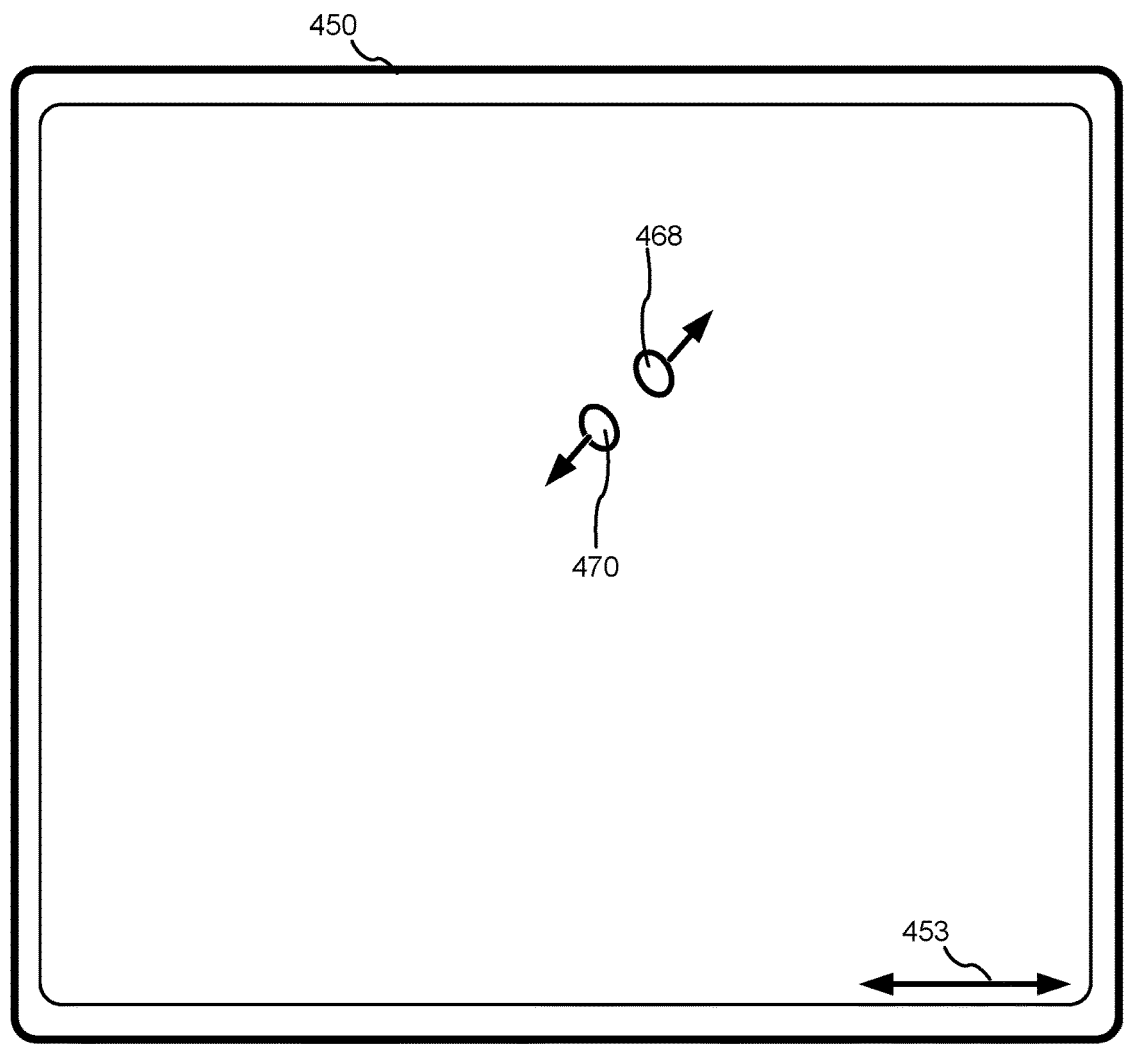
FIG. 4B illustrates an example user interface for a multifunction device with a touch-sensitive surface that is separate from the display in accordance with some embodiments.
Figure 4B:
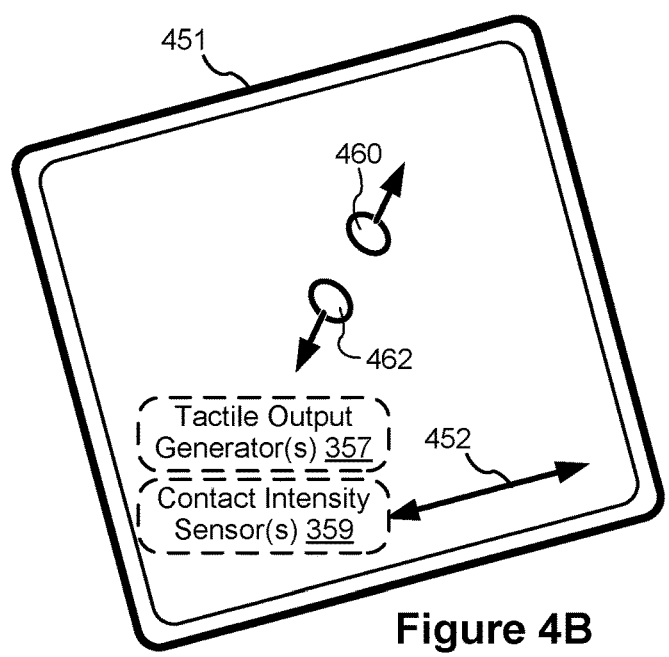

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300. Although many of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 6A-6Y and FIGS. 7A-7G) described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
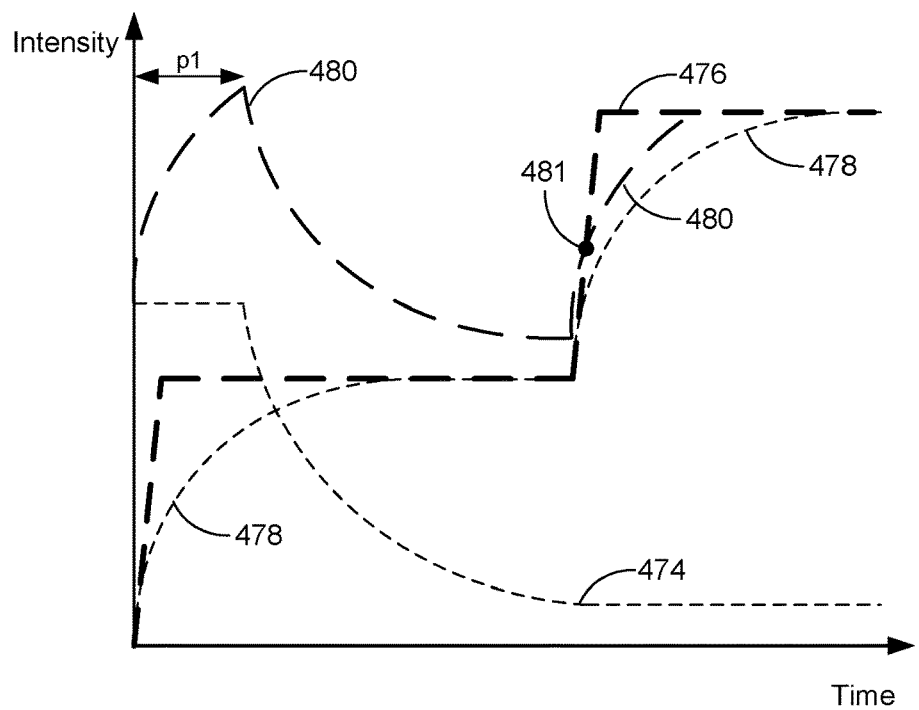
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
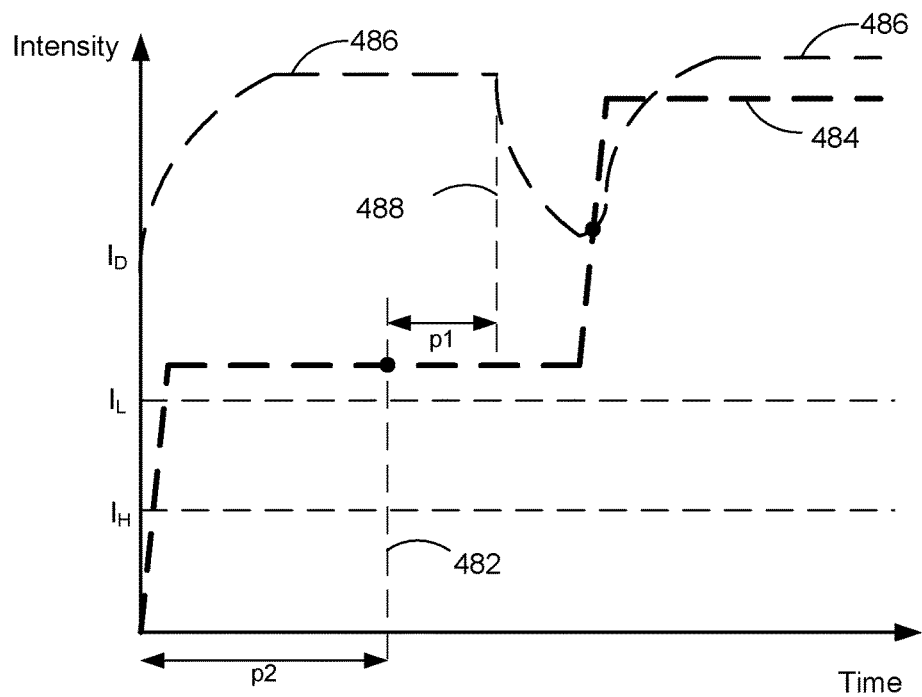

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
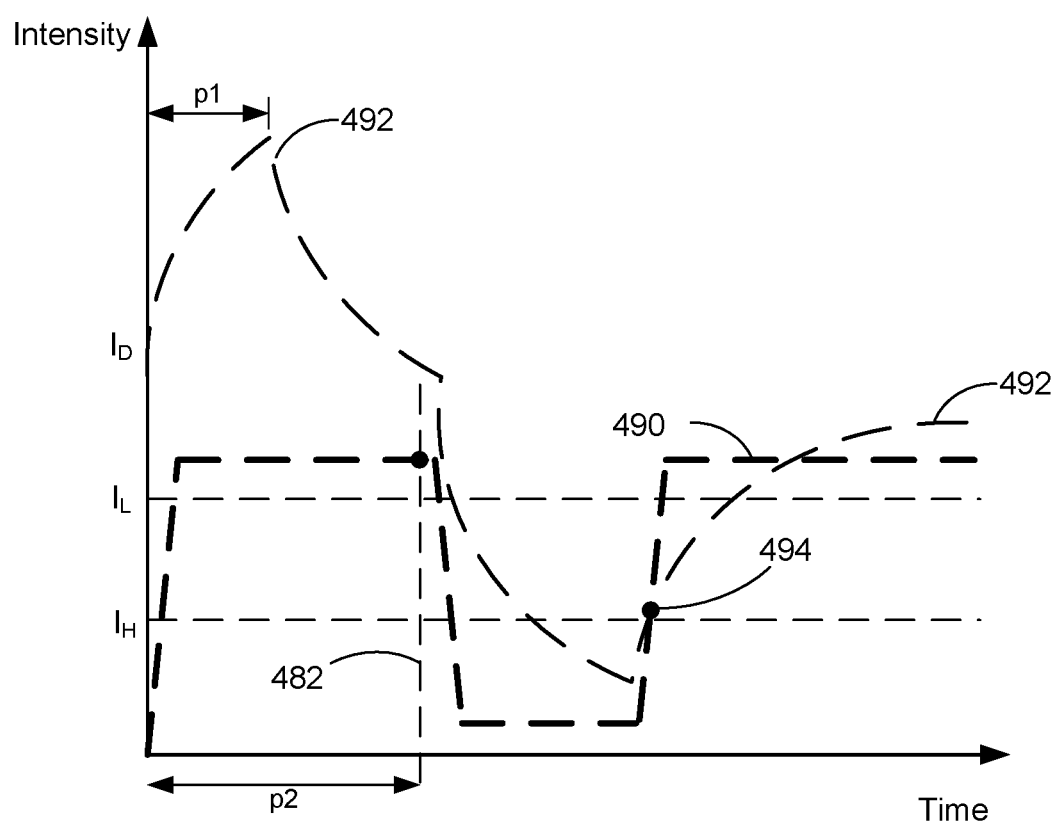

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

FIG. 5 illustrates example electronic devices that are in communication with display 450 and touch-sensitive surface 451. For at least a subset of the electronic devices, display 450 and/or touch-sensitive surface 451 is integrated into the electronic device in accordance with some embodiments. While the examples described in greater detail below are described with reference to a touch-sensitive surface 451 and a display 450 that are in communication with an electronic device (e.g., portable multifunction device 100 in FIGS. 1A-1B or device 300 in FIG. 3), it should be understood that in accordance with some embodiments, the touch-sensitive surface and/or the display are integrated with the electronic device, while in other embodiments one or more of the touch-sensitive surface and the display are separate from the electronic device. Additionally, in some embodiments the electronic device has an integrated display and/or an integrated touch-sensitive surface and is in communication with one or more additional displays and/or touch-sensitive surfaces that are separate from the electronic device.

In some embodiments, all of the operations described below with reference to FIGS. 6A-6Y and 7A-7G are performed on a single electronic device with user interface navigation logic 483 (e.g., Computing Device A described below with reference to FIG. 5). However, it should be understood that frequently multiple different electronic devices are linked together to perform the operations described below with reference to FIGS. 6A-6Y and 7A-7G (e.g., an electronic device with user interface navigation logic 483 communicates with a separate electronic device with a display 450 and/or a separate electronic device with a touch-sensitive surface 451). In any of these embodiments, the electronic device that is described below with reference to FIGS. 6A-6Y and 7A-7G is the electronic device (or devices) that contain(s) the user interface navigation logic 483. Additionally, it should be understood that the user interface navigation logic 483 could be divided between a plurality of distinct modules or electronic devices in various embodiments; however, for the purposes of the description herein, the user interface navigation logic 483 will be primarily referred to as residing in a single electronic device so as not to unnecessarily obscure other aspects of the embodiments.

In some embodiments, the user interface navigation logic 483 includes one or more modules (e.g., one or more event handlers 190, including one or more object updaters 177 and one or more GUI updaters 178 as described in greater detail above with reference to FIG. 1C) that receive interpreted inputs and, in response to these interpreted inputs, generate instructions for updating a graphical user interface in accordance with the interpreted inputs which are subsequently used to update the graphical user interface on a display. In some embodiments, an interpreted input is an input that has been detected (e.g., by a contact motion 130 in FIGS. 1A-1B and 3), recognized (e.g., by an event recognizer 180 in FIG. 1C) and/or prioritized (e.g., by event sorter 170 in FIG. 1C). In some embodiments, the interpreted inputs are generated by modules at the electronic device (e.g., the electronic device receives raw contact input data so as to identify gestures from the raw contact input data). In some embodiments, some or all of the interpreted inputs are received by the electronic device as interpreted inputs (e.g., an electronic device that includes the touch-sensitive surface 451 processes raw contact input data so as to identify gestures from the raw contact input data and sends information indicative of the gestures to the electronic device that includes the user interface navigation logic 483).

In some embodiments, both the display 450 and the touch-sensitive surface 451 are integrated with the electronic device (e.g., Computing Device A in FIG. 5) that contains the user interface navigation logic 483. For example, the electronic device may be a desktop computer or laptop computer with an integrated display (e.g., 340 in FIG. 3) and touchpad (e.g., 355 in FIG. 3). As another example, the electronic device may be a portable multifunction device 100 (e.g., a smartphone, PDA, tablet computer, etc.) with a touch screen (e.g., 112 in FIG. 2).

In some embodiments, the touch-sensitive surface 451 is integrated with the electronic device while the display 450 is not integrated with the electronic device (e.g., Computing Device B in FIG. 5) that contains the user interface navigation logic 483. For example, the electronic device may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 450 is integrated with the electronic device while the touch-sensitive surface 451 is not integrated with the electronic device (e.g., Computing Device C in FIG. 5) that contains the user interface navigation logic 483. For example, the electronic device may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the electronic device may be a portable multifunction device 100 (e.g., a smartphone, PDA, tablet computer, etc.) with a touch screen (e.g., 112 in FIG. 2)

connected (via wired or wireless connection) to a separate touch-sensitive surface (e.g., a remote touchpad, another portable multifunction device with a touch screen serving as a remote touchpad, etc.).

In some embodiments, neither the display 450 nor the touch-sensitive surface 451 is integrated with the electronic device (e.g., Computing Device D in FIG. 5) that contains the user interface navigation logic 483. For example, the electronic device may be a stand-alone electronic device 300 (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). As another example, the electronic device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, the computing device has an integrated audio system. In some embodiments, the computing device is in communication with an audio system that is separate from the computing device. In some embodiments, the audio system (e.g., an audio system integrated in a television unit) is integrated with a separate display 450. In some embodiments, the audio system (e.g., a stereo system) is a stand-alone system that is separate from the computing device and the display 450.

User Interfaces and Associated Processes

Attention is now directed towards embodiments of user interfaces ("UI") and associated processes that may be implemented using an electronic device that communicates with and/or includes a display and a touch-sensitive surface, such as a computing device (e.g., one of Computing Devices A-D in FIG. 5). In some embodiments, the computing device includes one or more sensors to detect intensities of contacts with the touch-sensitive surface. In some embodiments, the computing device includes the display. In some embodiments, the computing device includes the audio system. In some embodiments, the computing device includes neither the display nor the audio system. In some embodiments, the display includes the audio system (e.g., the display and the audio system are components of a television). In some embodiments, certain components of the audio system and the display are separate (e.g., the display is a component of a television and the audio system includes a sound bar that is separate from the television). In some embodiments, the computing device is in communication with a separate remote control through which it receives user inputs (e.g., the remote control includes a touch-sensitive surface or a touch screen through which the user interacts with the computing device). In some embodiments, the remote control includes a motion sensor (e.g., an accelerometer and/or a gyroscope) to detect a motion of the remote control (e.g., a user picking up the remote control).

Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 6P:
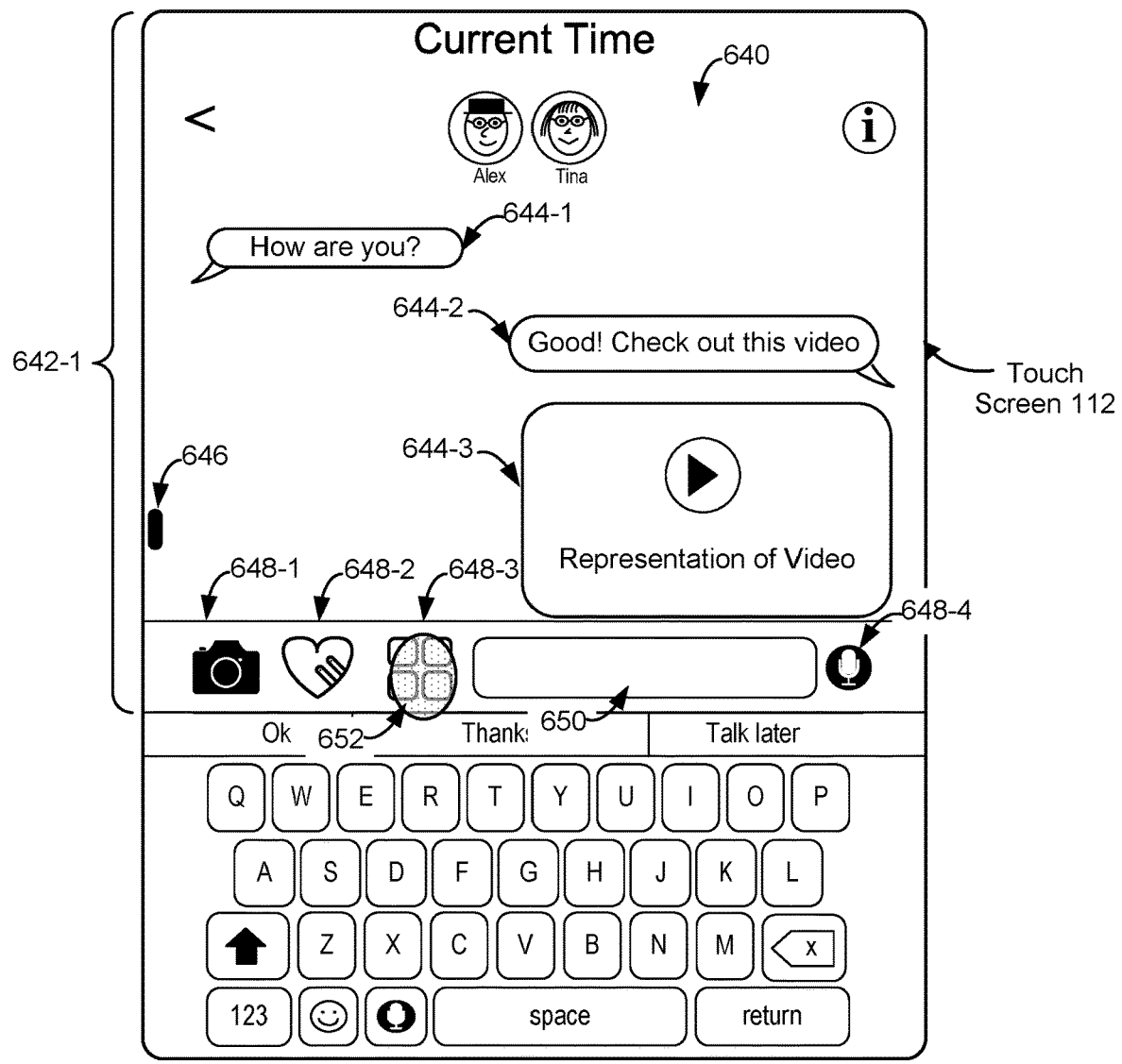
Figure 6Q:
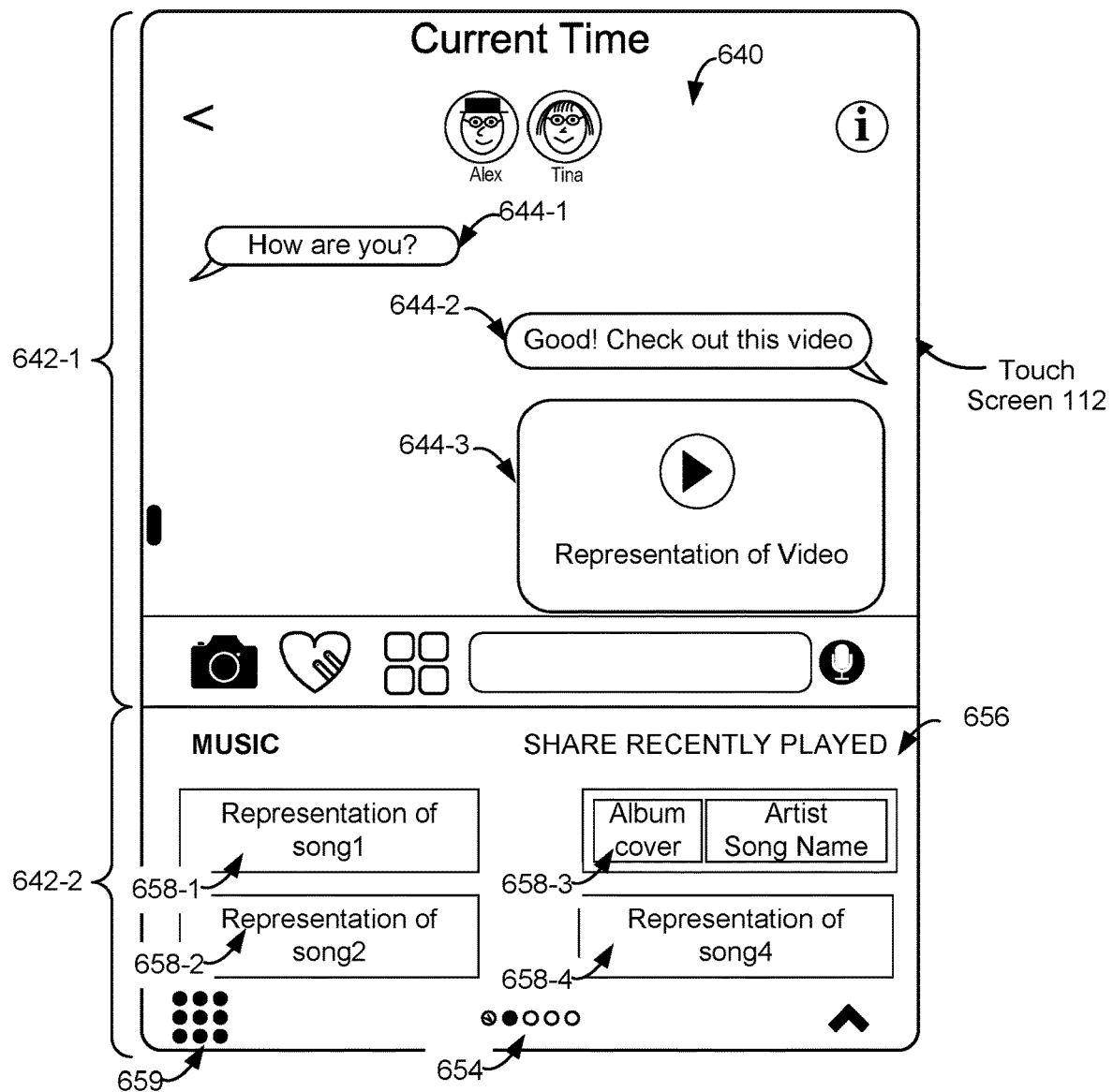
Figure 6R:
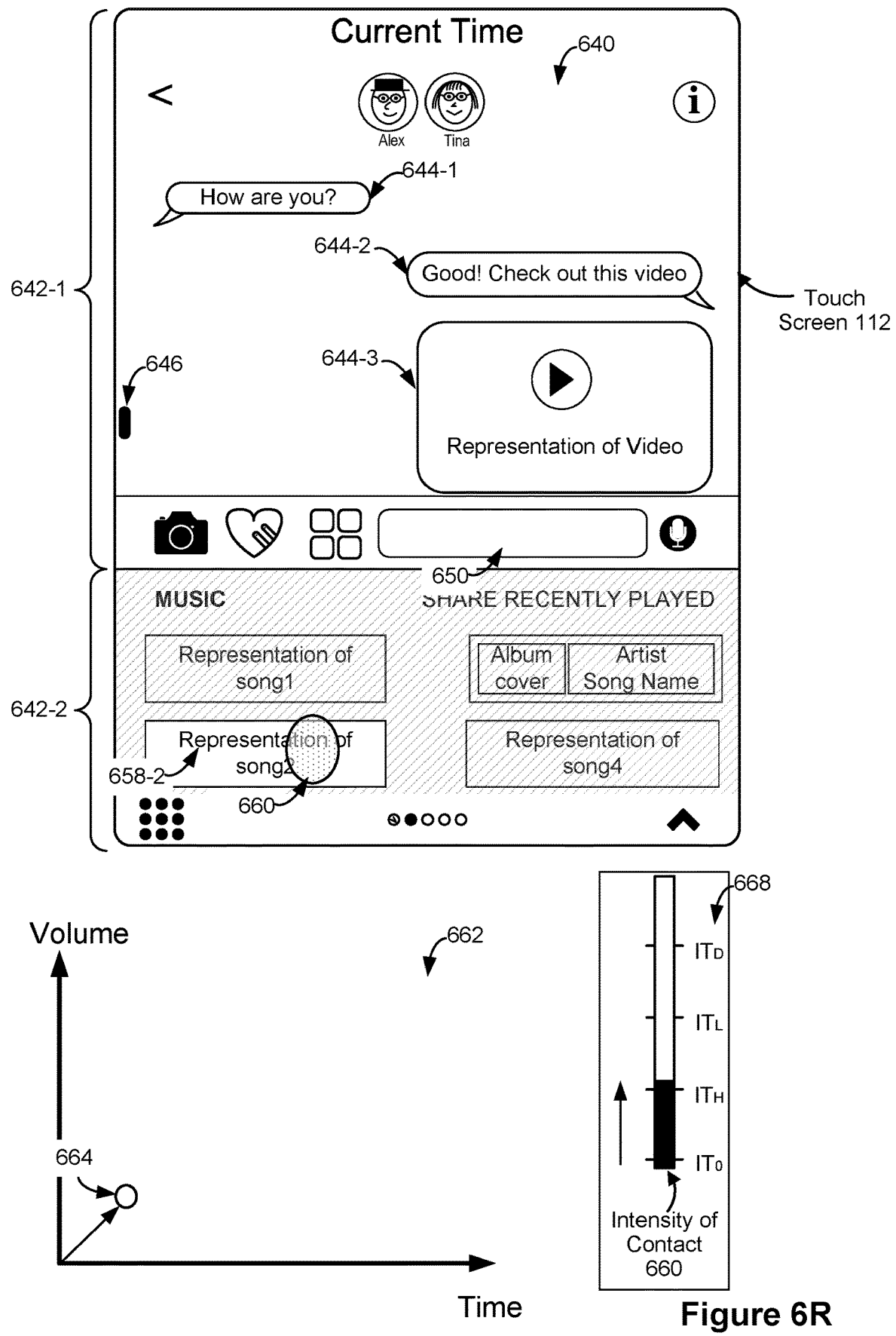
Figure 6S:
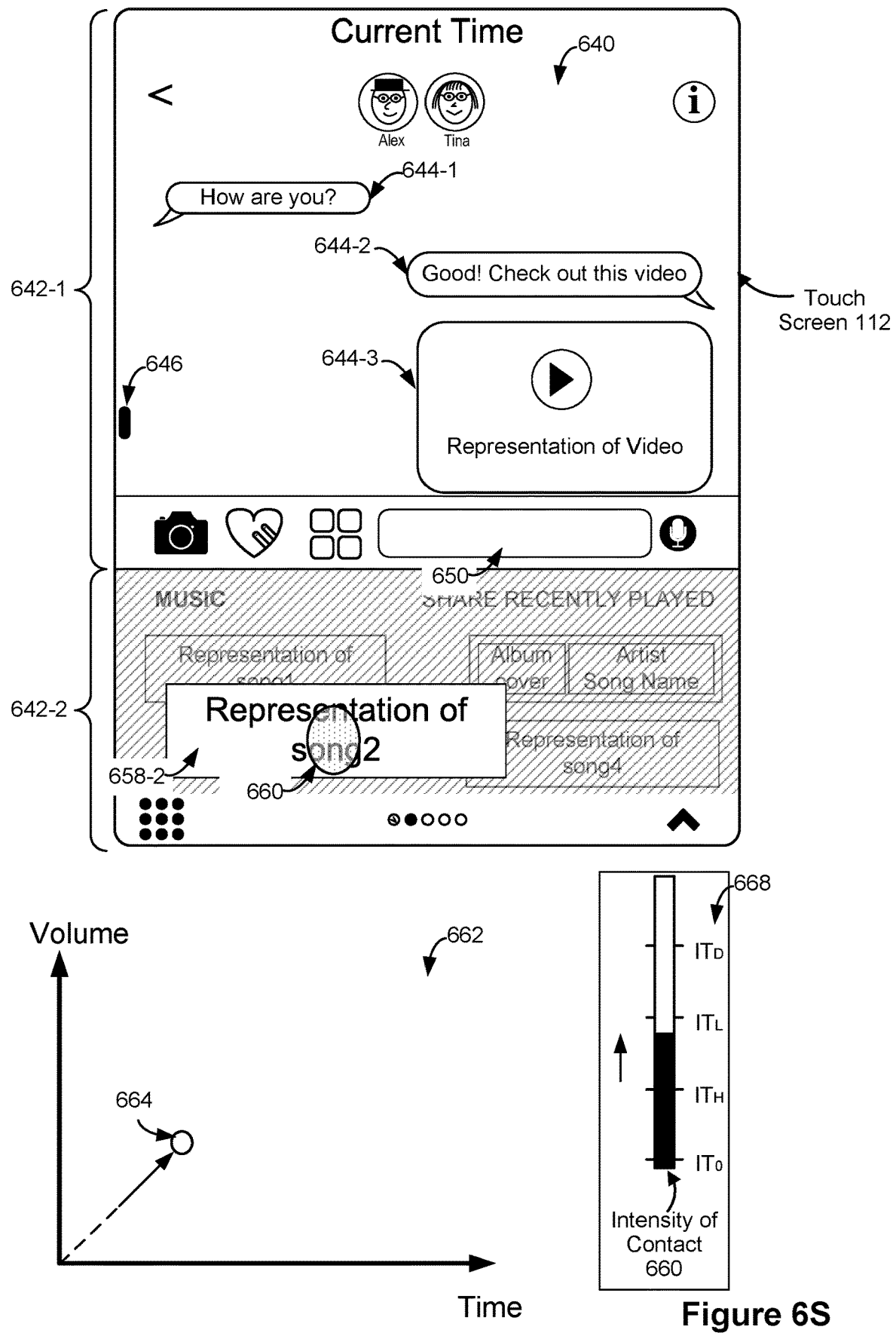
Figure 6T:
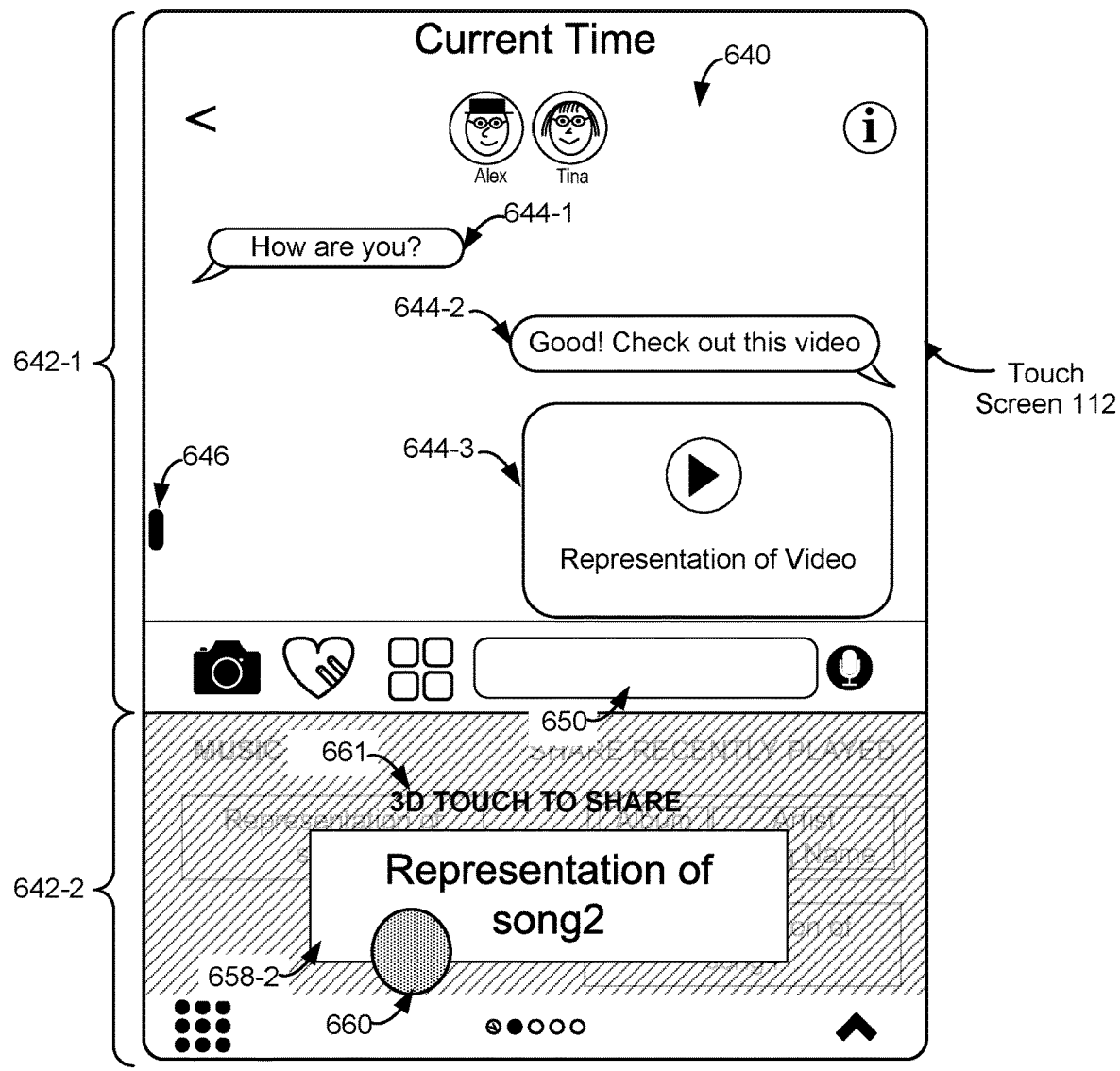
Figure 6T:
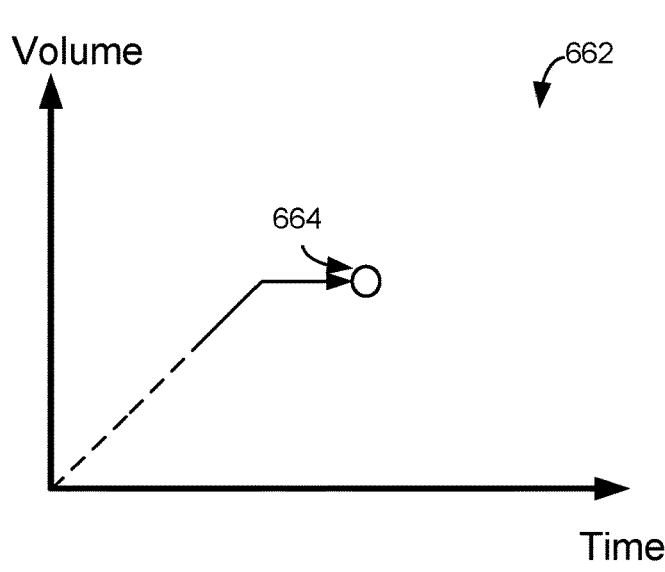
Figure 6T:
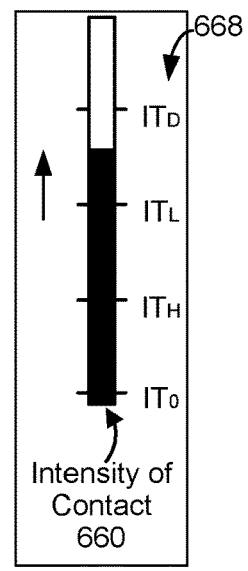
Figure 6U:
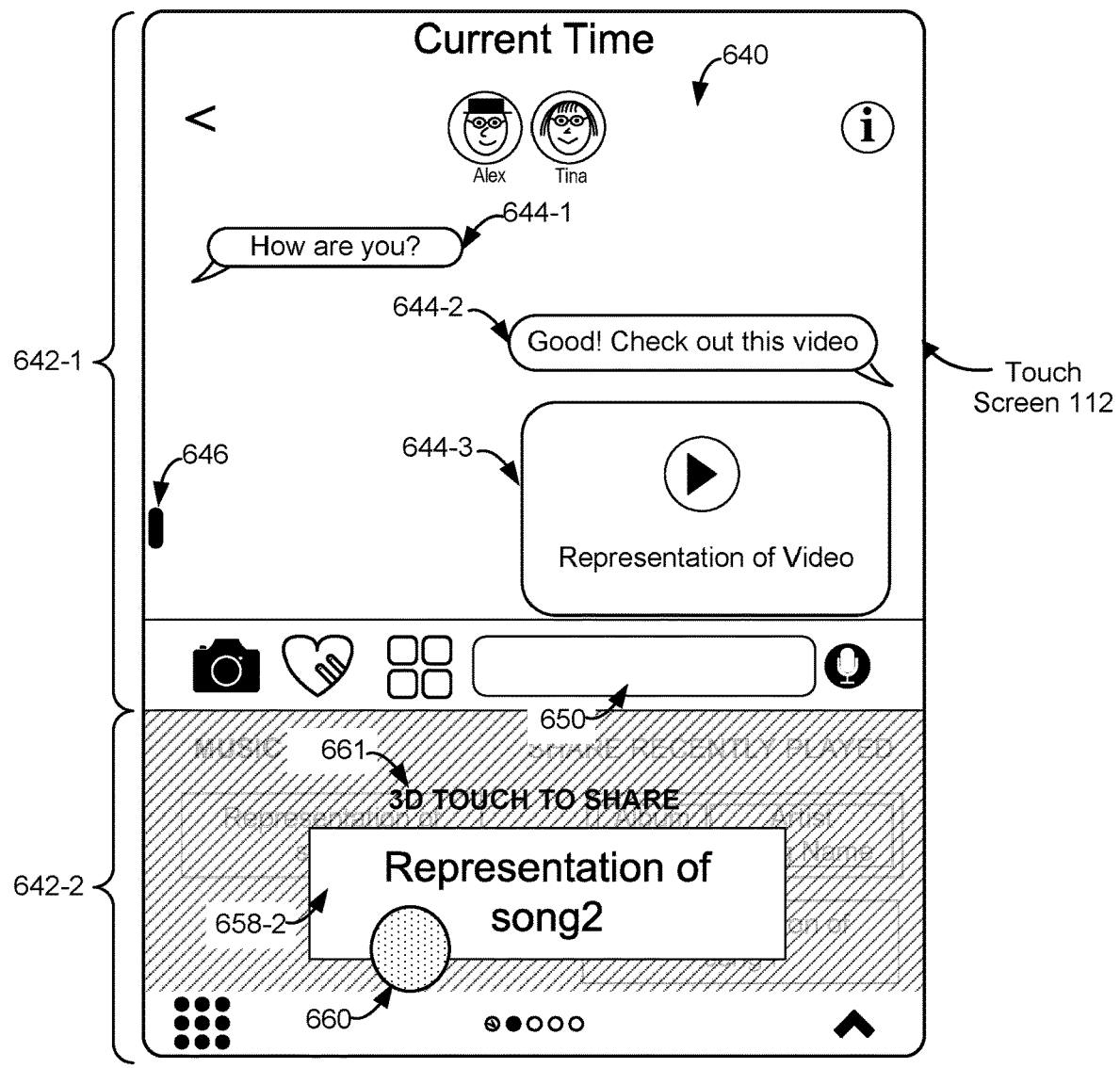
Figure 6U:
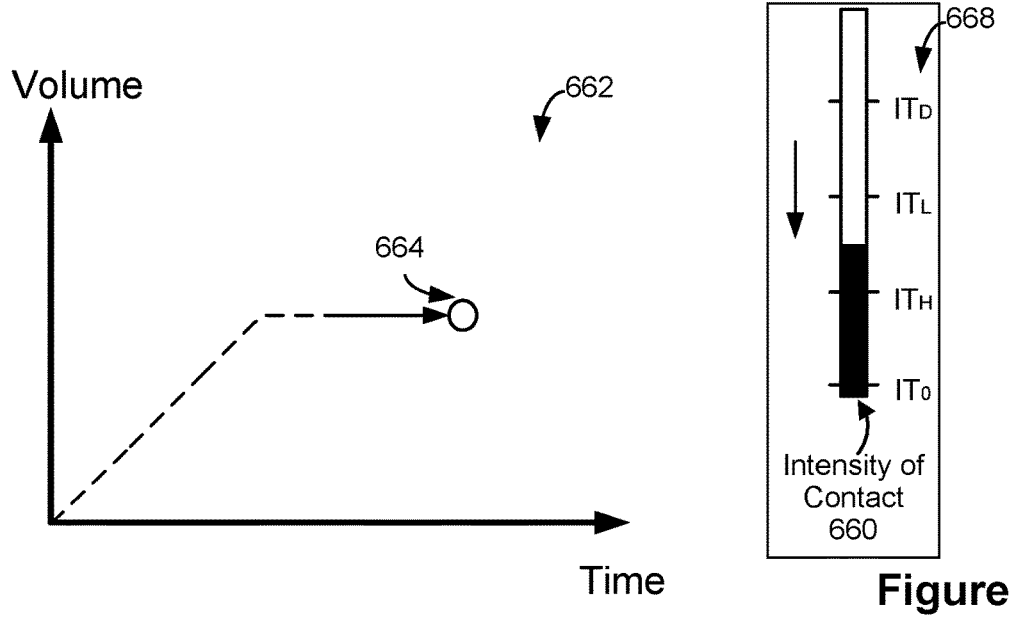
Figure 6V:
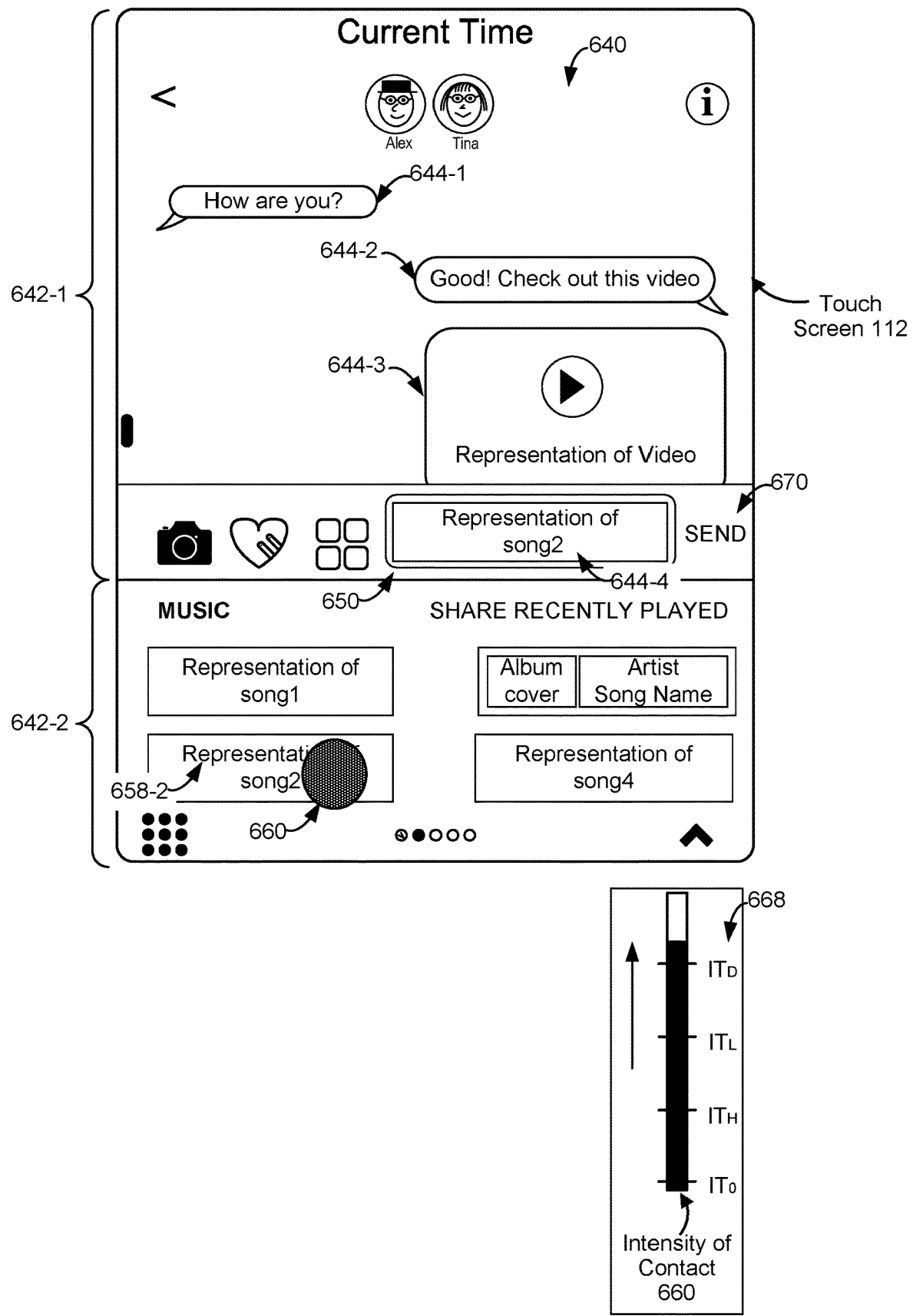
Figure 6W:
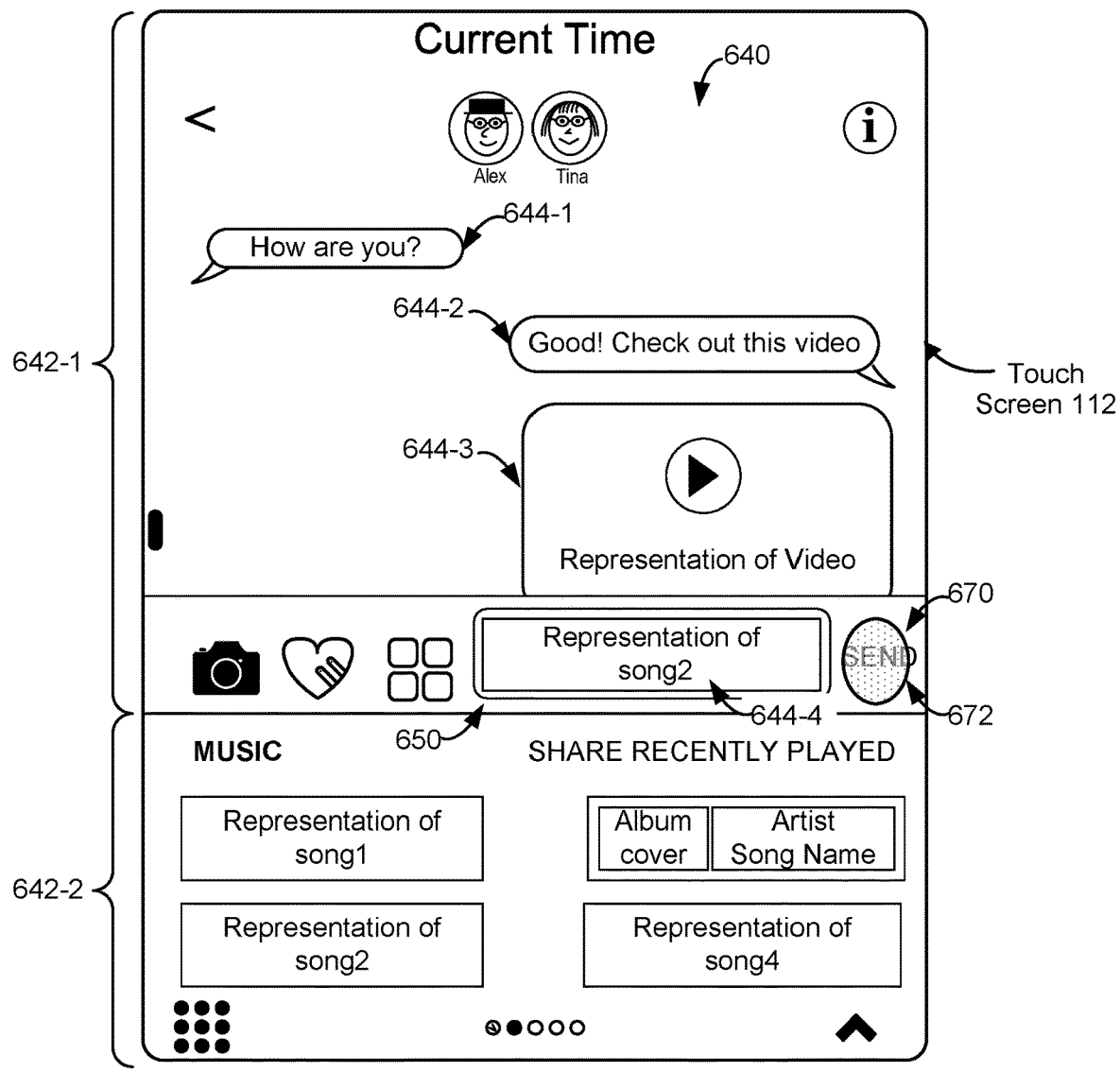
Figure 6X:
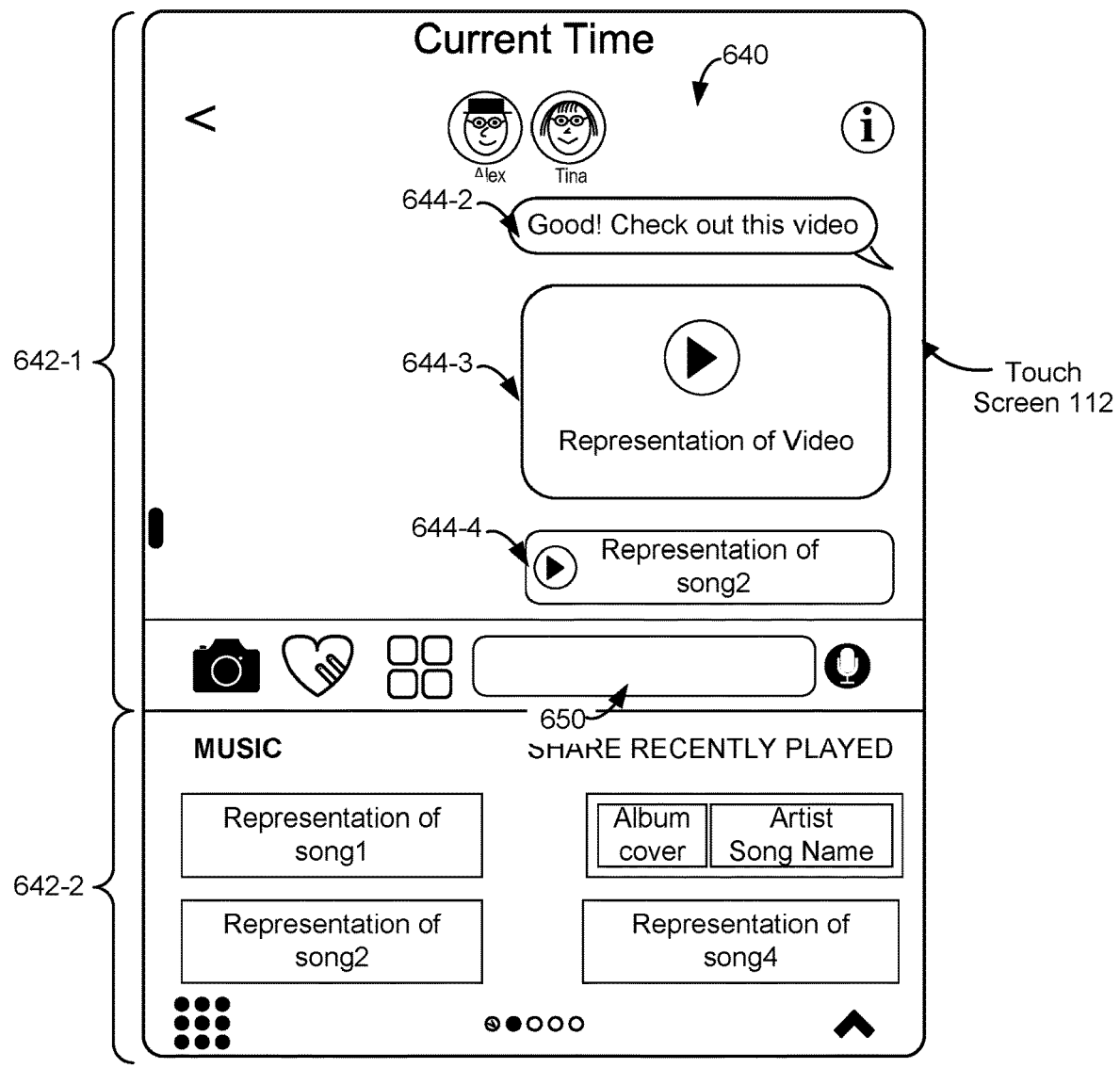
Figure 6Y:
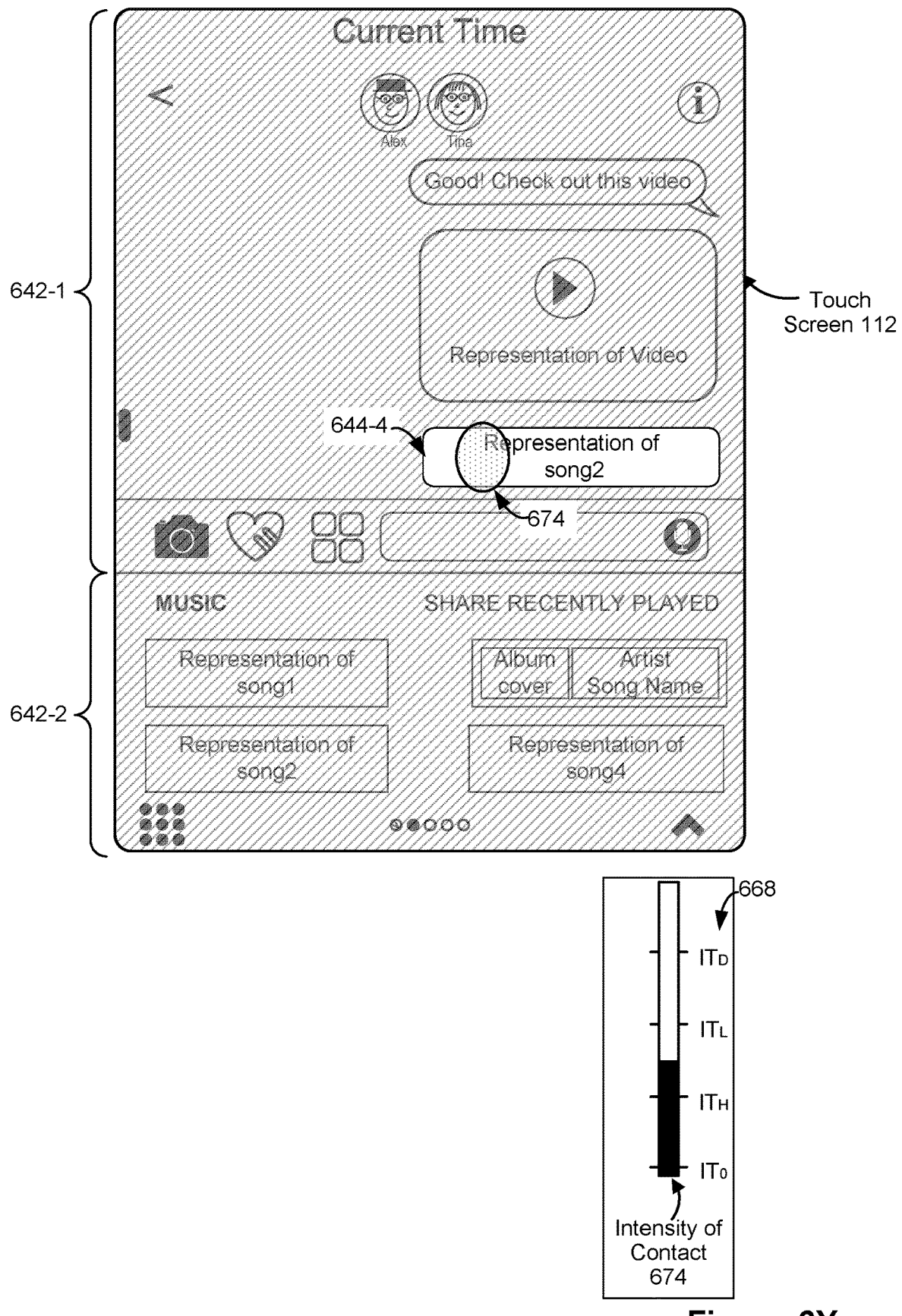

FIGS. 6A-6Y illustrate example user interfaces for dynamically adjusting presentation of audio outputs, in accordance with some embodiments. More specifically, FIGS. 6A-6Y illustrate user interfaces in which volume and/or non-volume properties of audio content are adjusted based on a magnitude of a user input. For example, when a song is playing on a device, a user may perform a gesture requesting that other audio content be provided. The song may be playing, for example, in a music application, and the other audio content might be requested by the user in the same music application or a different application (e.g., the other audio content could be an audio portion of a video sent by another user in a messaging application). As explained in greater detail below, the blurring of the audio content includes dynamically adjusting a non-volume property (e.g., stereo balance) of the first audio content (e.g., the song that was playing on the device prior to the user's input).

FIGS. 6A-6H illustrate an example in which the device (e.g., referred to as device 100 for simplicity), while presenting a first song or album in a music application, blurs in a second song or album in the music application in accordance with the length of a swipe gesture.

FIG. 6A illustrates music application user interface 602 displayed on touch screen 112 of device 100 (for visual clarity, the remainder of device 100, beside touch screen 112, is not displayed). Music application user interface 602 includes banner 604 indicating that device 100 is currently playing Beethoven's Moonlight Sonata. That is, device 100 is providing, to an audio system, sound information 606-1 so that the audio system can present Beethoven's Moonlight Sonata (or a track/song from Beethoven's Moonlight Sonata). As shorthand, the phrase "device 100 presents audio content," or the like, is used to mean that device 100 provides sound information to the audio system so that the audio system can present audio output corresponding to the audio content. The audio system may be integrated into or separate from device 100, as explained with reference to FIG. 5.

Beethoven's Moonlight Sonata is represented by sound information 606-1, shown schematically in audio diagram 608. Sound information 606-1 includes a volume (represented by sound information 606-1's position on the vertical axis of audio diagram 608) and an audio property other than volume, which in this example is a left-right stereo balance ("L-R balance," represented by sound information 606-1's position on the horizontal axis of audio diagram 608). In some embodiments, the non-volume audio property is a filtering property (e.g., a cutoff frequency and/or attenuation factor of a low-pass filter).

Music application user interface 602 also includes audio content representations 610 (e.g., audio content representation 610-1, which represents Beethoven's Moonlight Sonata; audio content representation 610-2, which represents Mozart's Requiem; and audio content representation 610-3, which represents Brahms's Alto Rhapsody). Audio content representations 610 are graphical objects (also called "graphical user interface objects") each occupying a respective region of user interface 602 on touch screen 112. In various circumstances, an audio content representation 610 represents a song, an album, a ringtone, a video content object (e.g., where the video content appears in a text messaging window), an audio file object that appears in the text messaging window, or any other type of media content that includes an audio component. In this example, audio content representations 610 are representations of albums and include displayed album artwork.

At the outset of the example shown in FIGS. 6A-6H, the L-R balance is equally balanced and device 100 is not providing any other sound information besides sound information 606-1.

As shown in FIG. 6B, while the audio system is presenting Beethoven's Moonlight Sonata, device 100 receives an input 612 (e.g., a swipe gesture) that corresponds to a request to present Mozart's Requiem. In this example, input 612 is a request to present Mozart's Requiem because input 612 is received over audio content representation 610-2, which corresponds to Mozart's Requiem.

In some embodiments, in response to an initial portion of input 612 (e.g., slight movement of the swipe gesture), device 100 hints (e.g., aurally and/or visually) that it will start blurring audio. In some embodiments, as used herein, the term "blurring audio" refers to changing audio properties to change the prominence of the blurred audio while it is playing to enable the user to better distinguish other audio that is playing concurrently with the blurred audio. When audio is "blurred," "blurring in" the audio corresponds to increasing the prominence of the blurred audio (e.g., by increasing a cutoff frequency of a low pass filter and/or shifting the audio toward a center channel), and while "blurring out" the audio corresponds to decreasing the prominence of the blurred audio (e.g., by decreasing a cutoff frequency of a low pass filter and/or shifting the audio away from a center channel). In some embodiments, the blurred-in audio properties include volume. In some embodiments, the blurred-in audio properties include one or more non-volume audio properties (e.g., a cutoff frequency of a low-pass filter or left/right balance). For example, device 100 provides an aural hint that audio will start blurring by dynamically adjusting the L-R balance of sound information 606-1 with the magnitude of the initial portion of input 612 (e.g., the slight movement of the swipe gesture). In this example, the L-R balance of sound information 606-1 is shifted slightly to the left. As another example of an aural hint, the volume of sound information 606-1 is reduced. In some embodiments, device 100 also provides a visual hint by increasing the visual prominence of audio content representation 610-2 (which is demonstrated schematically in FIG. 6B by the bold border surrounding audio content representation 610-2). In some embodiments, increasing the visual prominence includes visually blurring the other audio content representations besides audio content representation 610-2 (and optionally visually blurring the rest of the user interface as well). In some embodiments, these hints are provided before Mozart's Requiem aurally "blurs in," as described below.

In some embodiments, a visual effect (e.g., a blur radius) changes in conjunction with the dynamically adjusted non-volume audio property (e.g., as the swipe lengthens, user interface 602 (with the exception of audio content representation 610-2) blurs in a lock-step manner with the shifting L-R balance of sound information 606-1).

As shown in FIGS. 6C-6D, device 100 provides, to the audio system, sound information 606-2 to present Mozart's Requiem concurrently with Beethoven's Moonlight Sonata. In some embodiments, the "blurring in" of the second audio content is done in response to the magnitude of input 612 exceeding a predetermined threshold (e.g., the swipe moves by more than a small predetermined amount). In some embodiments, device 100 presents Mozart's Requiem statically; that is, as soon as Mozart's Requiem begins playing, it does so at a fixed volume and fixed L-R balance (e.g., an equally balanced L-R balance). Alternatively, as shown in the figures, presentation of Mozart's Requiem is also dynamically adjusted in accordance with the magnitude of input 612. For example, as the user moves input 612 farther to the left, the L-R balance of Mozart's Requiem shifts more to the left (as shown by the leftward shift of sound information 606-2 in audio diagram 608 in FIGS. 6C-6D). Presentation of Beethoven's Moonlight Sonata continues to be dynamically adjusted in accordance with the swipe gesture. For example, as the user moves input 612 farther to the left, the L-R balance of Beethoven's Moonlight Sonata shifts more to the left (as shown by the leftward shift of sound information 606-1 in audio diagram 608 in FIGS. 6C-6D). This gives the user the sensation that Beethoven's Moonlight Sonata is shifting off of center-stage to the left and Mozart's Requiem is shifting onto center-stage from the right, taking the Moonlight Sonata's place.

In some embodiments, device 100 also dynamically adjusts the volume of Beethoven's Moonlight Sonata in accordance with the magnitude of the swipe gesture (e.g., device 100 reduces the volume as input 612 moves farther to the left, as represented by the downward shift of sound information 606-1 in audio diagram 608 in FIGS. 6C-6D). In some embodiments, device 100 also dynamically adjusts the volume of Mozart's Requiem in accordance with the magnitude of the swipe gesture (e.g., device 100 increases the volume of Mozart's Requiem as input 612 moves farther to the left, as represented by the upward shift of sound information 606-2 in audio diagram 608 in FIGS. 6C-6D). In some embodiments, the volumes of Beethoven's Moonlight Sonata and Mozart's Requiem are roughly proportional to the fraction of representations 610-1 and 610-2 that are displayed, respectively, within a predefined region of the display (e.g., the entire display or a center region of the display). So as the user pulls audio content representation 610-2 onto the center of the display, Mozart's Requiem becomes more aurally prominent as well as more aurally centered.

FIG. 6E illustrates device 100 detecting an end of user input 612 (e.g., user input 612 has been released). Thus, user input 612 is no longer shown in FIG. 6E.

In some embodiments, in response to detecting the end of user input 612, device 100 determines whether to continue presenting the first audio content (e.g., and cease presenting the second audio content), or vice-versa, based on a determination that the magnitude of input 612 exceeds (or exceeded) a predetermined threshold.

FIG. 6F illustrates that, in this example, because input 612 has dragged audio content representation 610-2 so that more of it is displayed than audio content representation 610-1, release of input 612 causes audio content representation 610-2 to move into place in the middle of the screen, with device 100 presenting only Mozart's Requiem. Thus, in response to detecting the end of input 612, device 100 ceases presenting the first audio content (e.g., the Moonlight Sonata) and continues presenting the second audio content (Mozart's Requiem). In some embodiments, device 100 completes the dynamic adjustments to Mozart's Requiem (e.g., gradually changes the L-R balance and volume over a period of 0.5 seconds after input 612 is released, so that Mozart's Requiem is presented with equal balance at a preset volume). This is illustrated schematically by the upward and leftward shift of sound information 606-2 in audio diagram 608 in FIGS. 6E-6F. In some embodiments, the visual effects (e.g., blurring) are also reversed in response to detecting the end of input 612.

FIGS. 6G-6H illustrate what would have happened in this example if input 612 had not dragged audio content representation 610-2 so that more of it is displayed than audio content representation 610-1. Thus, FIG. 6G illustrates the state of user interface 602 immediately after release of an input that is shorter than, but otherwise analogous to, input 612. In response, as shown in FIG. 6H, device 100 ceases presenting (e.g., causes the audio system to cease presenting) Mozart's Requiem and resumes presenting only Beethoven's Moonlight Sonata. Beethoven's Moonlight Sonata is then presented without the dynamic adjustments that had been made to it (e.g., the changes to the L-R balance and volume are reversed over 0.5 seconds, so that Beethoven's Moonlight Sonata is presented equally balanced and at a preset volume). This is illustrated schematically by the upward and rightward shift of sound information 606-1 in audio diagram 608 in FIGS. 6G-6H. In some embodiments, the visual effects (e.g., blurring) are also reversed in response to detecting the end of the input.

In some embodiments, device 100 "pops" the second audio output into place, both visually and aurally, when the magnitude of input 612 satisfies a second predetermined threshold, greater than the first predetermined threshold (e.g., there is a first threshold where, if the input is released, the second audio output moves into place, and there is a second threshold, where the second audio output pops into place even before the input is released).

In some embodiments, as an alternative to the examples shown in FIGS. 6E-6H, in response to detecting the end of input 612, device 100 continues presenting the adjusted first audio output and continues presenting the second audio output.

FIGS. 6I-6O illustrate an example in which a device (e.g., referred to as device 100 for simplicity), while presenting a song or album in a music application, blurs in an audio portion of a video sent to the user in a messaging application (e.g., a different application than the music application), in accordance with the intensity of a press input. Various aspects of the example shown in FIGS. 6I-6O are analogous to the example shown in FIGS. 6A-6H. Those details are not repeated here. The difference between the example shown in FIGS. 6I-6O and the example shown in FIGS. 6A-6H is that, in FIGS. 6I-6O, the input is a press input whose magnitude is an intensity of the press input and, further, in FIGS. 6I-6O, device 100 blurs audio from two different applications (e.g., a music application and a messaging application).

In addition, FIGS. 6I-6O illustrate blurring of audio by dynamically adjusting a low-pass filter cutoff frequency rather than an L-R balance. To that end, FIGS. 6I-6O include an audio diagram 613. The vertical axis of audio diagram 613 represents volume and the horizontal axis represents the low-pass filter cutoff frequency.

FIG. 6I illustrates a user interface 614 for a messaging application displayed on touch screen 112. User interface 614 displays messages 616, some of which were received by a user of device 100 (e.g., messages 616-1 and 616-2) and some of which were sent by the user of device 100 (e.g., message 616-3). User interface 614 includes avatars 618 indicating the participants in the conversation (e.g., "Alex," whose avatar is 618-1," and "Tina," whose avatar is 618-2). For example, Tina sent Alex message 616-1, which is a representation of a video.

In FIG. 6I, audio diagram 613 includes a representation of sound information 606-3, meaning that device is presenting audio content. In this example, sound information 606-3 corresponds to Brahms's Alto Rhapsody, so at the outset, device 100 is presenting Brahms's Alto Rhapsody via a music application that is separate or distinct from the messaging application. Brahms's Alto Rhapsody is being provided at a particular volume and with a low-pass filter cut-off frequency (hereinafter "cutoff frequency") set to a high value. In some embodiments, the cutoff frequency at the outset is above a maximum frequency audible by humans (e.g., about 20 kHz), so that the low-pass filter has no audible effect on the audio output when no audio blurring is being performed. In some embodiments, a low-pass filter is not applied at the outset (i.e., when no audio blurring is being performed). Rather, a low-pass filter is turned on when audio blurring begins. For simplicity, FIG. 6I illustrates sound information 606-3 being presented with the cutoff frequency set to a high value at the outset.

As shown in FIGS. 6J-6K, while device 100 is presenting the Alto Rhapsody, device 100 receives an input 620 that corresponds to a request to present video message 616-1, including video message 616-1's audio (e.g., the input is an input on a region of touch screen 112 corresponding to video message 616-1).

In this example, input 620 is a press input (e.g., a press-and-hold input) on touch screen 112. Touch screen 112 has one or more sensors to detect intensity of contacts. The intensity of input 620 is represented on intensity diagram 622. In FIG. 6J, the intensity of input 620 is above a hint threshold (e.g., $IT_H$). As a result, device 100 begins aurally blurring an audio portion of video message 616-1 into Brahms's Alto Rhapsody. That is, when the intensity of input 620 goes above the hint threshold (e.g., $IT_H$) but has not gone above a peek threshold (e.g., $IT_L$), device 100 reduces the volume of the Alto Rhapsody and lowers the cutoff frequency as the intensity of input 620 is increased. These effects are shown schematically by the downward and leftward shift of sound information 606-3 in audio diagram 613. The effect of lowering the cutoff frequency of the low-pass filter is to filter out more and more of the high-frequency components of the Alto Rhapsody, leaving just its bass.

At the same time, the volume of video message 616-1 is increased (e.g., proportionally) as the intensity of contact 620 is increased (as represented by the upward arrow for sound information 606-4, corresponding to video message 616-1). Sound information 606-4 is effectively not low-pass filtered (e.g., it is filtered by a low-pass filter with a cutoff frequency above the human-audible range, or it is not low-pass filtered at all).

In some embodiments, as long as the intensity of input 620 has gone above the hint threshold (e.g., $IT_H$) but has not gone above a peek threshold (e.g., $IT_L$), the visual prominence of video message 616-1 changes dynamically with the intensity of input 620 (e.g., the visual prominence of the video and aural prominence of the corresponding audio increase with increasing intensity and decrease with decreasing intensity). For example, as shown in FIGS. 6J-6K, increasing the intensity of input 620 increases the size of video message 616-1, centers video message 616-1, and blurs everything else in user interface 614 with the exception of video message 616-1 with a blur radius proportional to the intensity of input 620 (increasing blur radius in these figures is represented schematically by the decreasing transparency of the pattern overlaying all of user interface 614 with the exception of video message 616-1).

The effects of increasing intensity between $IT_H$ and $IT_L$ can be seen by comparing FIGS. 6J and 6K. In some embodiments, the user can scrub the volumes of the Alto Rhapsody and video message 616-1 (as well as the cutoff frequency of the Alto Rhapsody) back-and-forth by increasing and decreasing the intensity of input 620. For example, if FIGS. 6J and 6K were reversed, the volume and cutoff frequency for sound information 606-3 would increase and the volume for sound information 606-4 would decrease.

In this example, while device 100 is presenting the audio output for video message 616-1, device 100 also presents the video output for video message 616-1. Thus, FIGS. 6J-6O illustrate a video progressing (e.g., video message 616-1 is a simple video of birds flying around the frame).

As shown in FIGS. 6L-6M, when the intensity of input 620 reaches a "peek" threshold, device 100 presents the Alto Rhapsody with a preset cutoff frequency and a first preset volume (e.g., a low volume), and presents video message 616-1 with a second preset volume (e.g., a higher volume than the first preset volume) regardless of the intensity of input 620 (e.g., as long as the intensity of input 620 stays below a "pop" threshold, which in this example is $IT_D$). For example, device 100 detects an increase in the intensity of input 620 above $IT_L$ (FIG. 6L) followed by a decrease in intensity of input 620 below $IT_L$ (FIG. 6M), but maintains sound information 606-3 and sound information 606-4 at their "peek" locations in audio diagram 613 (e.g., the visual prominence of the video and aural prominence of the corresponding audio are maintained at least the level show in 6K, even if the intensity of the contact decreases below $IT_L$). The effect is that the audio from video message 616-1 is predominantly presented with only a quiet bass background of the Alto Rhapsody remaining audible.

In addition, the visual changes are locked-in after the intensity of input 620 reaches the "peek" threshold. In FIG. 6L, video message 616-1 is centrally positioned with the remainder of user interface 614 heavily blurred. This blurring, as well as video message 616-1's central position, are maintained in FIG. 6M when the intensity of input 620 drops below $IT_L$.

However, in some embodiments, release of input 620 at any point in FIGS. 6J-6M would result in device 100 ceasing to present video message 616-1 and resuming full presentation of the Alto Rhapsody (e.g., at the second preset volume and without filtering) and would, optionally, return to the state of the user interface displayed in FIG. 6I.

FIGS. 6N-6O illustrate that, in some embodiments, device 100 "pops" video message 616-1 into place when the intensity of input 620 is above a pop threshold (e.g., $IT_D$). Once the intensity of input 620 goes above deep press threshold $IT_D$, the volume of video message 616-1 remains at the second preset volume and remains unfiltered, even if the intensity of input 620 subsequently drops below $IT_D$ or input 620 ends altogether (FIG. 6O). In some embodiments, device 100 visually pops video message 616-1 into place as well (e.g., video message 616-1 expands to take up the entire screen or most of the screen). In addition, device 100 ceases presenting the first audio output (e.g., the Alto Rhapsody).

FIGS. 6P-6Y illustrate an example in which the device (e.g., referred to as device 100 for simplicity), previews audio from a media item by dynamically changing a set of one or more audio properties of the media item as a characteristic intensity of a contact changes, in accordance with some embodiments. For example, when device 100 receives a contact on a representation of a song, device 100 will play the song with a volume that is proportional to the intensity of the contact, at least for a range of contact intensities. In some embodiments, when the contact reaches a first intensity threshold, device 100 will "peek" preview the media item by maintaining the volume at a preset level, even if the intensity of the contact subsequently drops. In some embodiments, when the contact reaches a second intensity threshold, device 100 will perform another operation (e.g., besides previewing the media item), such as performing a selection operation.

FIGS. 6P-6Y also illustrate an example in which, in response to the input, device 100 obscures (e.g., blurs) either an entire user interface (with the exception of a selected user interface object) or only a portion of the user interface. In some embodiments, the obscuring of the user interface (e.g., the entire user interface or just the portion of the user interface) is performed when the contact meets intensity-based activation criteria. For example, a press-and-hold input with an intensity rising above the hint threshold $IT_H$ results in obscuring, while a tap gesture results in a different operation being performed (e.g., a selection operation for the user interface object).

FIG. 6P illustrates a user interface 640 for a messaging application. User interface 640 includes interactive region 642-1. Interactive region 642-1 is a conversation region that includes a plurality of messages 644 (of which, message 644-1, message 644-2, and message 644-3 are representative) between conversation participants (e.g., Alex and Tina). The user can interact with interactive region 642-1 by scrolling through messages 644 (e.g., a position within the conversation region is shown by a scroll bar 646) or by interacting with individual messages 644 (e.g., tapping on message 644-3 to play a video, or pressing (e.g., and holding) on message 644-3 to "peek" at the video, as described with reference to FIGS. 6I-6O). Interactive region 642-1 also includes a plurality of affordances (e.g., icon 648-1, icon 648-2, icon 648-3, and icon 648-4, each of which enables particular device functionality), and a shelf 650 (e.g., a staging area for content that the user has entered but not yet sent to other conversation participants).

FIG. 6P illustrates an input 652 (e.g., a tap gesture) on icon 648-3. As shown in FIG. 6Q, tap gesture 652 causes user interface 640 to display an interactive region 642-2 (e.g., a separate interactive region distinct from interactive region 642-1). In some embodiments, interactive region 642-1 is a user interface for a primary application (e.g., the messaging application) and interactive region 642-2 is configured to display content from different mini-applications that operate within the primary application. The user can swipe between mini-applications, changing which mini-application is displayed in interactive region 642-2. Interactive region 642-2 also includes an affordance 659 that brings up a list of mini-applications to display in interactive region 642-2. Indicator 654 indicates which mini-application is currently being displayed in interactive region 642-2 (e.g., swiping left would result in a different mini-application being displayed in region 642-2 and the solid dot in indicator 654 moving one to the right).

In this example, the mini-application is a media selection mini-application 656 for selecting media to share in the conversation between the conversation participants. (e.g., a scrollable sheet that displays the 30 most recent songs played on device 100). Media selection mini-application includes representations of media items 658 (e.g., representations of media items 658-1 through 658-4). In some embodiments, the media items are songs, albums, videos, or the like. Representation 658-3 includes displayed information about the media item (e.g., an artist, a song name) and album cover art. In some embodiments, a tap gesture (not shown) on a respective representation 658 selects the respective representation 658 by placing it in shelf 650 (e.g., as an audio message, so that it is staged for sending to the conversation). In some embodiments, a tap gesture (not shown) on a respective representation 658 selects the respective representation 658 by playing the media item (e.g., playing locally on device 100).

FIG. 6R illustrates an input 660 that includes a contact on representation 658-2 (e.g., a press-and-hold gesture on representation 658-2). The press-and-hold gesture meets media hint criteria (e.g., intensity-based activation criteria) by virtue of having a contact intensity above the hint threshold $IT_H$, as illustrated in intensity diagram 668. As a result, device 100 starts playing a portion of the media item corresponding to representation 658-2 (e.g., a beginning portion or a representative portion selected to contain a recognizable portion of the media item). The playing of the media item is represented in audio diagram 662 by audio output 664. Audio diagram 662 illustrates the volume of the media item versus time.

As shown in FIGS. 6R-6S, while the media item is playing, device 100 dynamically changes the volume of the media item as the characteristic intensity of the contact changes (e.g., the volume of the media item increases as the characteristic intensity of the contact increases and decreases as the characteristic intensity of the contact decreases). For example, the increase in intensity of the contact from FIG. 6R to FIG. 6S (e.g., from just above $IT_H$ to just below $IT_L$) is accompanied by a corresponding increase in volume (an arrow in intensity diagrams 668 in FIGS. 6R-6V illustrates the change in intensity from the previous figure; similarly the solid line in audio diagram 662 in FIGS. 6R-6U illustrates the change corresponding to the arrow in intensity diagram 668 for that figure, while the dashed line represents changes in previous figures). If the intensities were reversed (e.g., if FIG. 6S were to occur before FIG. 6R), the volume of the media item would decrease.

In some embodiments, when a different audio output is already being produced before the media item starts playing, device 100 blurs the two audio outputs together, as described with reference to FIGS. 6A-6O, method 800, method 840, and FIGS. 8A-8C.

In addition, FIGS. 6R-6S illustrate that device 100 dynamically changes a visual appearance of interactive region 642-2 as the volume of the media item is changed. For example, device 100 dynamically obscures (e.g., blurs) interactive region 642-2 as the characteristic intensity of the contact changes (e.g., in lockstep with the changes to the audio, so that as the characteristic intensity of the contact increases, a blur radius also increases). Thus, the increase in intensity of the contact from FIG. 6R to FIG. 6S is accompanied by a corresponding increase in blurriness (increasing blurriness in these figures is represented schematically by the decreasing transparency of the pattern overlaying other content in interactive region 642-2 as the device moves from FIG. 6R to FIG. 6S). In this example, device 100 dynamically obscures interactive region 642-2 without obscuring interactive region 642-1 (e.g., to indicate that the hint relates to the mini-application portion of the user interface and not to the whole user interface).

In addition, representation 658-2, which is not obscured, increases in size and moves to the center of interactive region 642-2 as the contact intensity increases. In this example, the user can scrub the visual and audio changes back-and-forth by changing the intensity of the contact within a "hint" range of intensities (e.g., between $IT_H$ and $IT_L$), as long as the contact intensity has not reached a "peek" intensity threshold (e.g., $IT_L$).

FIGS. 6T-6U illustrates the result of the contact reaching a peek threshold (e.g., the result of device 100 detecting an increase in the characteristic intensity of the contact above $IT_L$). In this example, once the intensity of the contact reaches the peek threshold, the volume of audio output 664 remains fixed (e.g., locked-in to a preset level, such as whatever volume the user has device 100 set at). Thus, an increase in the intensity of the contact between $IT_L$ and $IT_D$ does not result in an increase in the volume. Similarly, subsequent detection of a decrease in the characteristic intensity of the contact below $IT_L$, as shown in FIG. 6U, has no effect on the volume (e.g., as long as contact is continuously maintained; in some embodiments, lift-off ceases presentation of the media item, either gradually or immediately, and reverses the visual changes to interactive region 642-2).

In some embodiments, once the contact reaches $IT_L$, device 100 displays an indication 661 that an increase in the characteristic intensity of the contact will cause the device to perform a selection operation with respect to the media item (e.g., the words "3D TOUCH TO SHARE"). A subsequent decrease of the contact intensity below $IT_L$ does not modify the obscuring of the remainder of interactive region 642-2, the size of representation 658-2, or the "3D TOUCH TO SHARE" indication.

FIG. 6V illustrates device 100 detecting an increase in the characteristic intensity of the contact above a "pop" threshold (e.g., $IT_D$). As a result, device 100 ceases playing the media item (hence, audio diagram 662 is absent from FIGS. 6V-6X) and performs a selection operation for the media item (e.g., device 100 places the media item in shelf 650).

In some embodiments, as shown, the selection operation is performed immediately upon detection of the intensity of the contact exceeding $IT_D$. Input 660 then becomes inactive. In other words, although input 660 is shown in FIG. 6V over the original representation 658-2, input 660 has no effect on the original representation 658-2. The user could reselect the original representation 658-2 by releasing input 660 and entering a new user input.

In FIG. 6V, the media item is now represented by audio message 644-4, which corresponds to representation 658-2 as shown in FIGS. 6Q-6U. In some embodiments, audio message 644-4 looks identical to representation 658-2 as shown in FIG. 6R. In addition, device 100 ceases obscuring interactive region 642-2 (e.g., reverses the blurring).

Placing content in shelf 650 also results in device 100 displaying a "send" button 670. FIG. 6W illustrates a user input 672 (e.g., a tap gesture) selecting the send button 670, which sends audio message 644-4 to the conversation participants and results in audio message 644-4 being added to the conversation region, as shown in FIG. 6X.

FIG. 6Y illustrates an input 674 that includes a contact on audio message 644-4 (e.g., a press-and-hold gesture on audio message 644-4). Because the contact in input 674 contact is above $IT_H$, device 100 obscures the interactive region 642-1 and interactive region 642-2 with the exception of audio message 644-4. In some embodiments, in response to a press-and-hold input with a contact above $IT_H$, device 100 also previews audio message 644-4 in an analogous manner to that described previously (e.g., including dynamically changing the audio). In contrast, in response to a tap gesture (e.g., with an intensity below $IT_H$), device 100 performs a selection operation with respect to audio message 644-4 (e.g., plays the entirety of audio message 644-4) without obscuring the second interactive region of the application and without obscuring the first interactive region of the application.

Additional details regarding FIGS. 6A-6Y (and the user interfaces shown therein) are provided below in reference to FIGS. 8A-8H.

FIGS. 7A-7G illustrate example user interfaces for providing audio output based on audio profiles, in accordance with some embodiments. More specifically, FIGS. 7A-7G illustrate an example in which activation of an affordance (e.g., a button on touch screen 112) causes the device to output a sound having an audio profile (e.g., an audio profile that governs pitch, reverberation, and/or decay of the audio output over time). When a second affordance is activated, the device determines if audio alteration criteria are satisfied, and if so, modifies the audio profile corresponding to the first affordance. For example, when the second affordance is activated soon after activation of the first affordance, the device causes the first affordance's sound to decay more quickly.

The user interfaces in these figures are used to illustrate the processes described below, including the processes in FIGS. 9A-9C.

For convenience, FIGS. 7A-7G are described with reference to device 100. As shorthand, the phrase "device 100 presents audio corresponding to an affordance," or the like, is used to mean that device 100 provides (or initiates providing) sound information to an audio system so that the audio system can present audio output corresponding to the affordance. The audio system may be integrated into or separate from device 100, as explained with reference to FIG. 5.

More specifically, FIGS. 7A-7G illustrate an example in which audio alteration criteria are satisfied when the second affordance is activated within a threshold time $T_{thres}$ of activation of the first affordance.

Figure 7A:
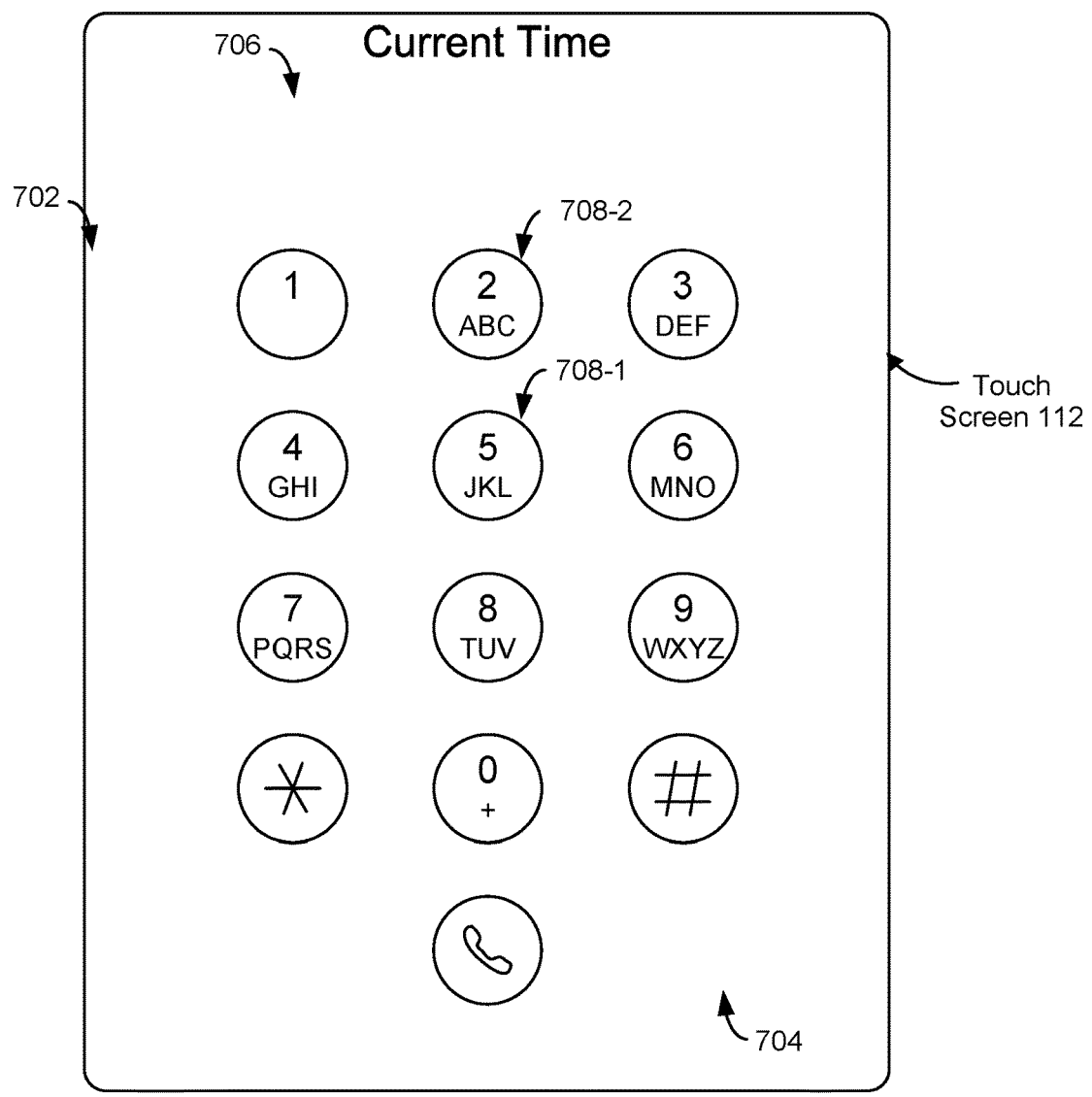
FIGS. 7A-7G illustrate example user interfaces for providing audio output based on audio profiles, in accordance with some embodiments.

FIG. 7A illustrates a user interface 702 for a phone application (e.g., telephone module 138). User interface 702 displays a keypad 704 through which a user can enter characters, for example, into a dialed-number bar 706. To that end, keypad 704 includes a set of affordances 708 corresponding to numbers (e.g., affordance 708-1 corresponding to a "5" and affordance 708-2 corresponding to a "2").

Figure 7B:
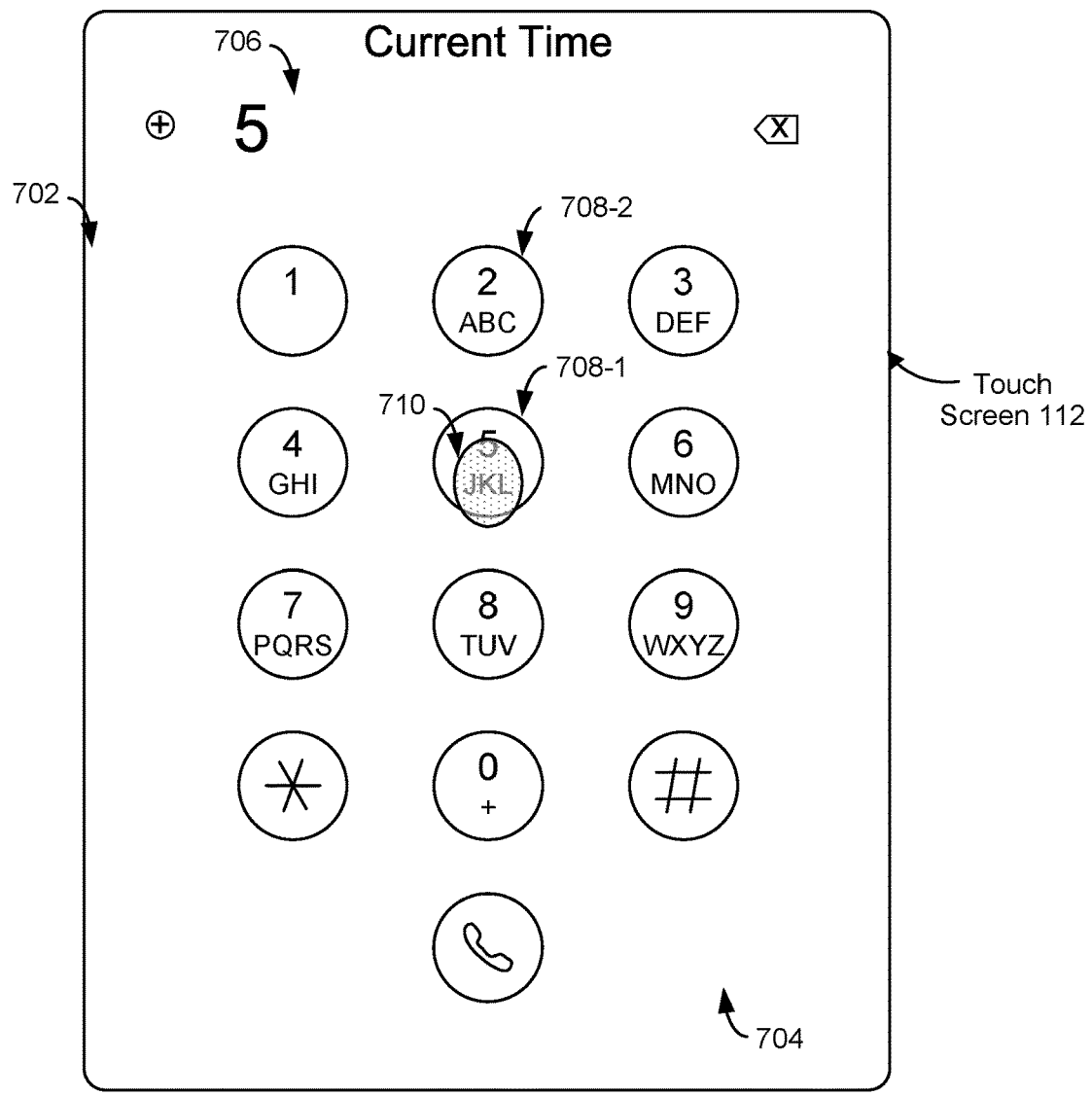
Figure 7B:
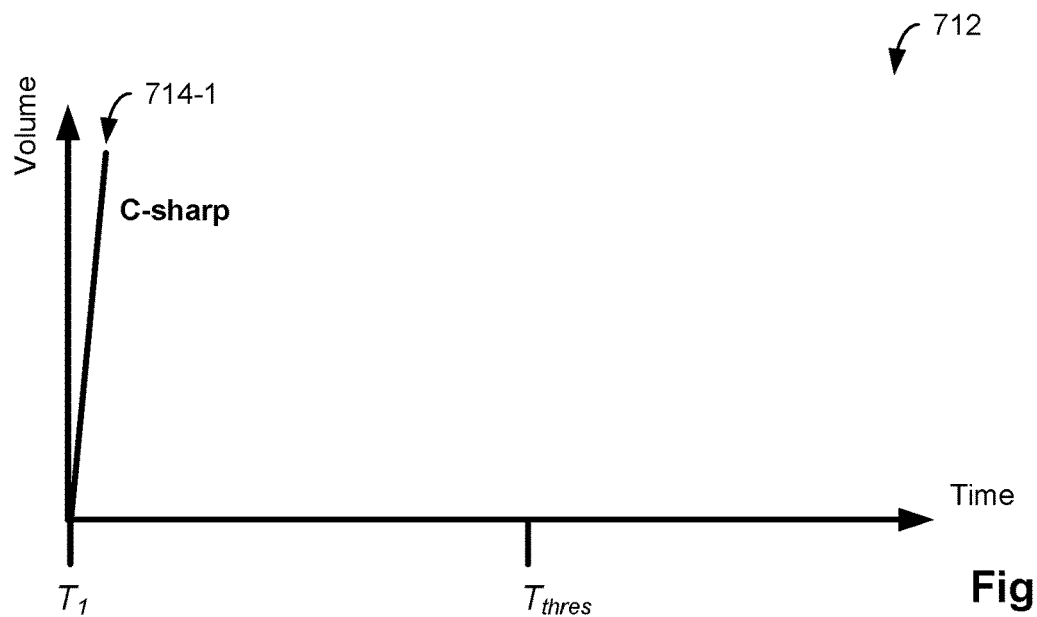

As shown in FIG. 7B, device 100 detects a first input 710 at a time $T_1$ that activates affordance 708-1 and places a "5" in dialed-number bar 706. FIG. 7B also illustrates audio graph 712, which provides representations of audio outputs over time (e.g., audio profiles). The time $T_1$ when the first input 710 is detected is labeled on the horizontal axis of audio graph 712. The vertical axis of audio graph 712 indicates the volume of the audio outputs shown on audio graph 712. First audio profile 714-1 is a representation of a first audio output that corresponds to, and is presented in response to, activation of affordance 708-1. First audio profile 714-1 for the first audio output is shown in full in audio graph 712 in FIG. 7D. The first audio output ramps up steeply after time $T_1$ then decays eventually to zero volume. In addition, audio graph 712 indicates that the first audio output is produced in a C-sharp pitch.

Figure 7C:
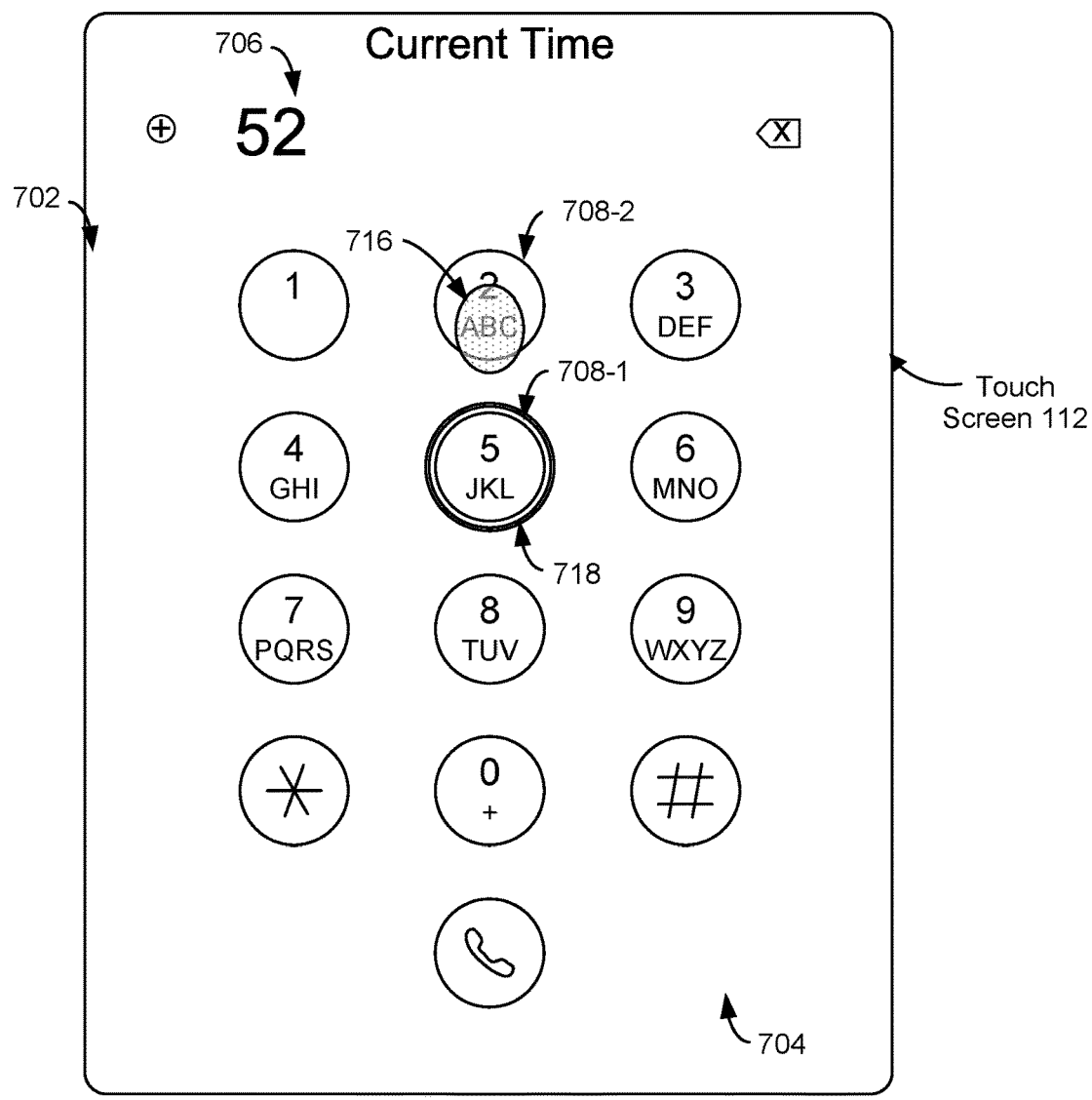
Figure 7C:
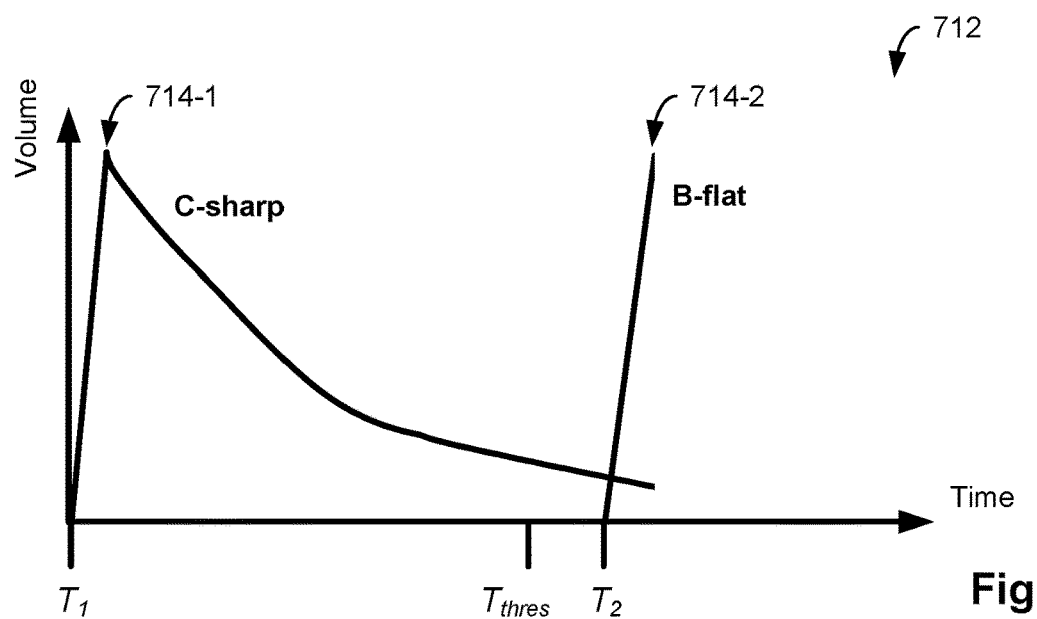

FIG. 7C illustrates device 100 detecting, at a second time $T_2$ (e.g., a time after $T_1$), a second input 716 directed to affordance 708-2 (e.g., detects activation of the "2" button on the keyboard, which places a "2" into dialed-number bar 706). In this example, when device 100 detects activation of affordance 708-2, device 100 produces a second sound output represented by second audio profile 714-2. In some embodiments, second audio profile 714-2 is the same as first audio profile 714-1 (e.g., a default audio profile for keyboard sounds).

Figure 7D:
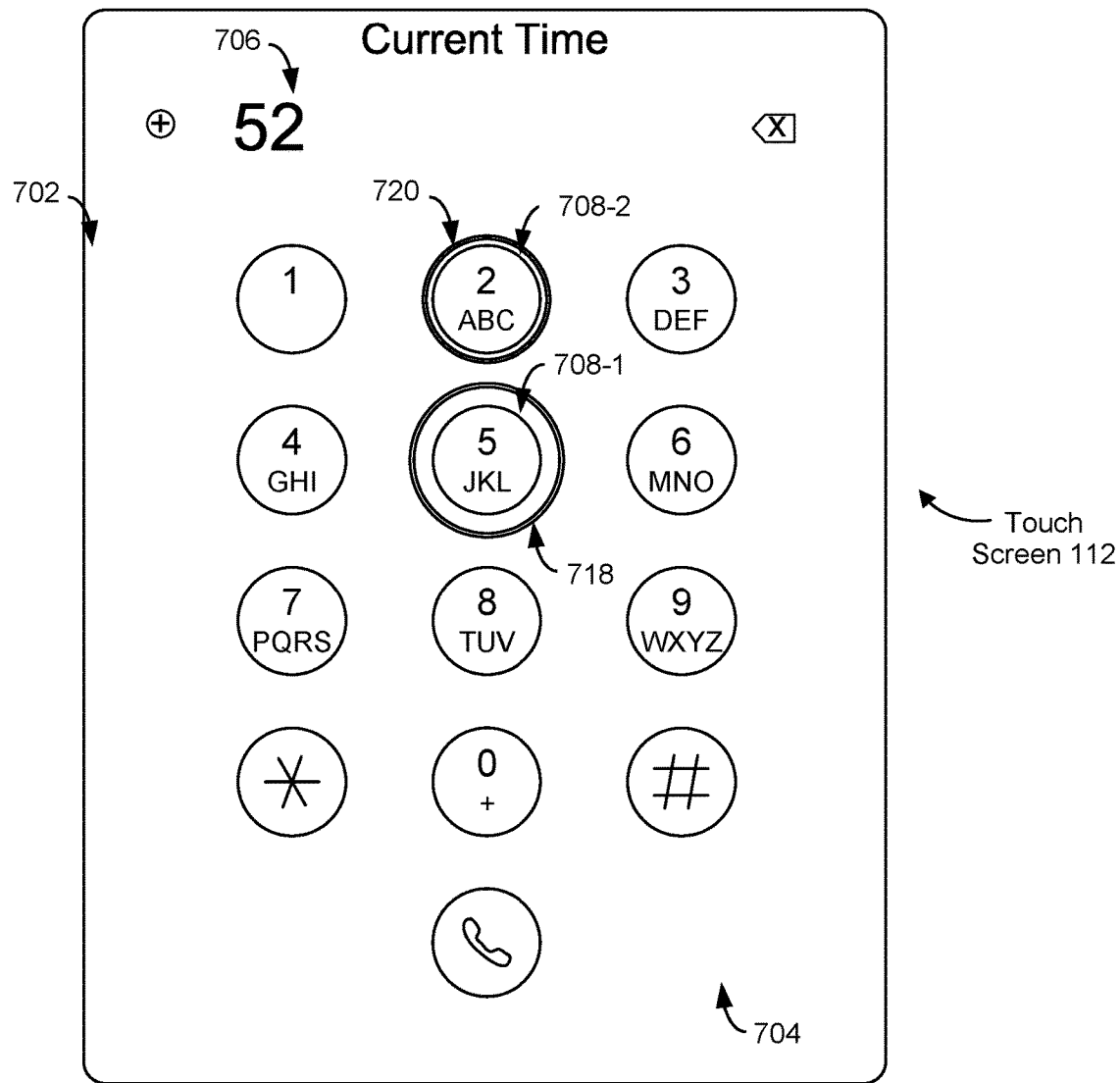
Figure 7D:
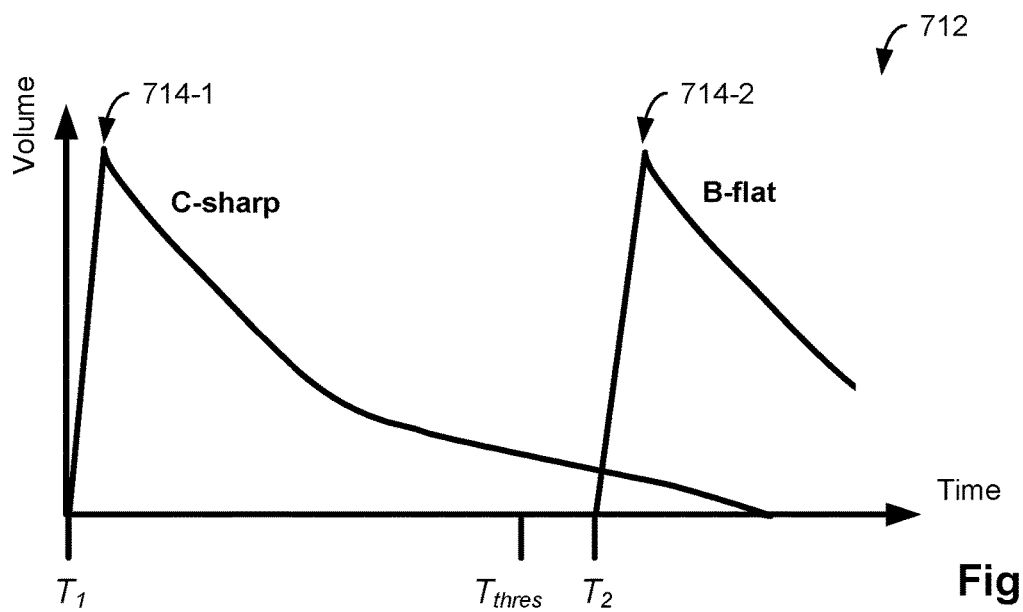
Figure 7E:
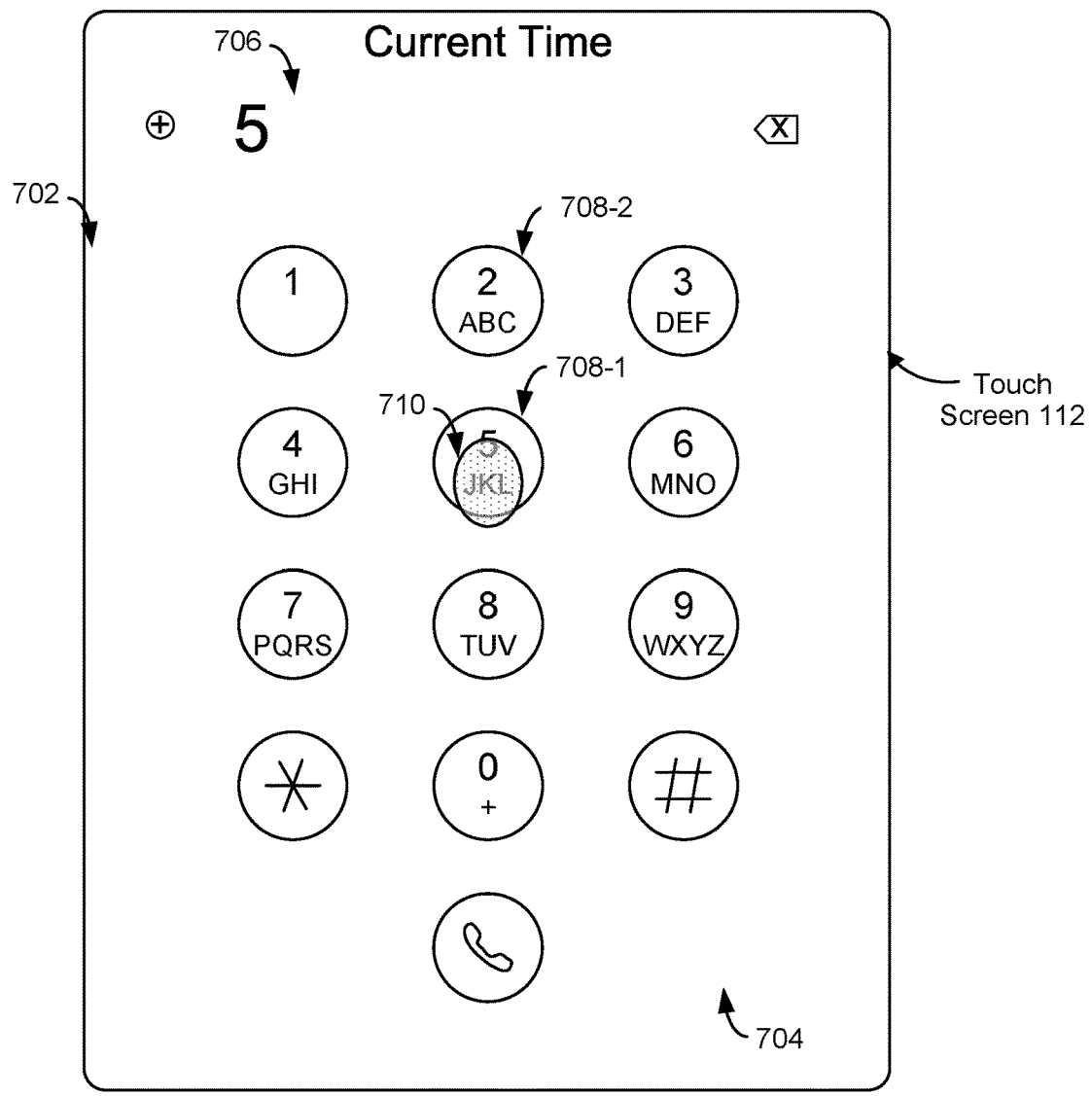
Figure 7E:
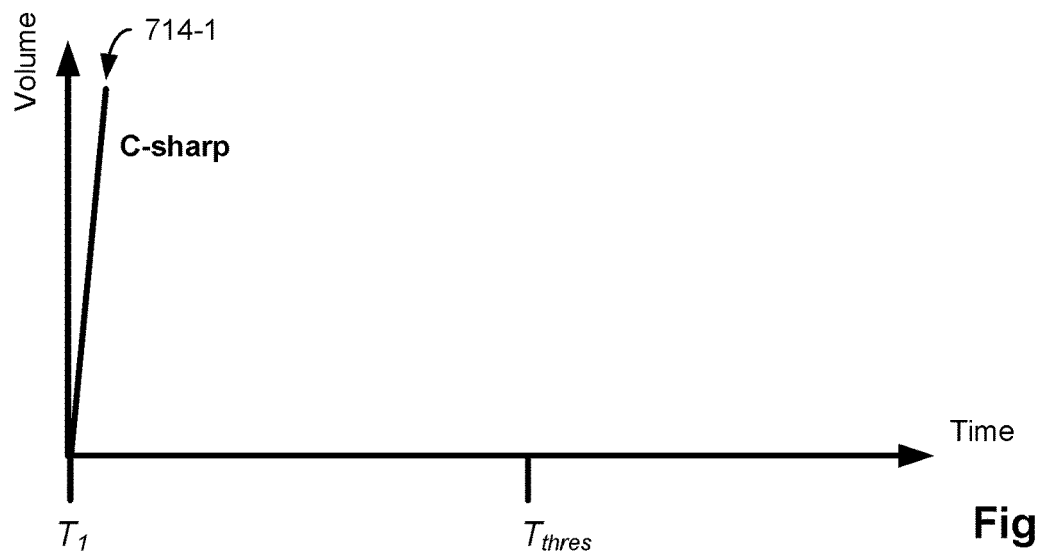
Figure 7F:
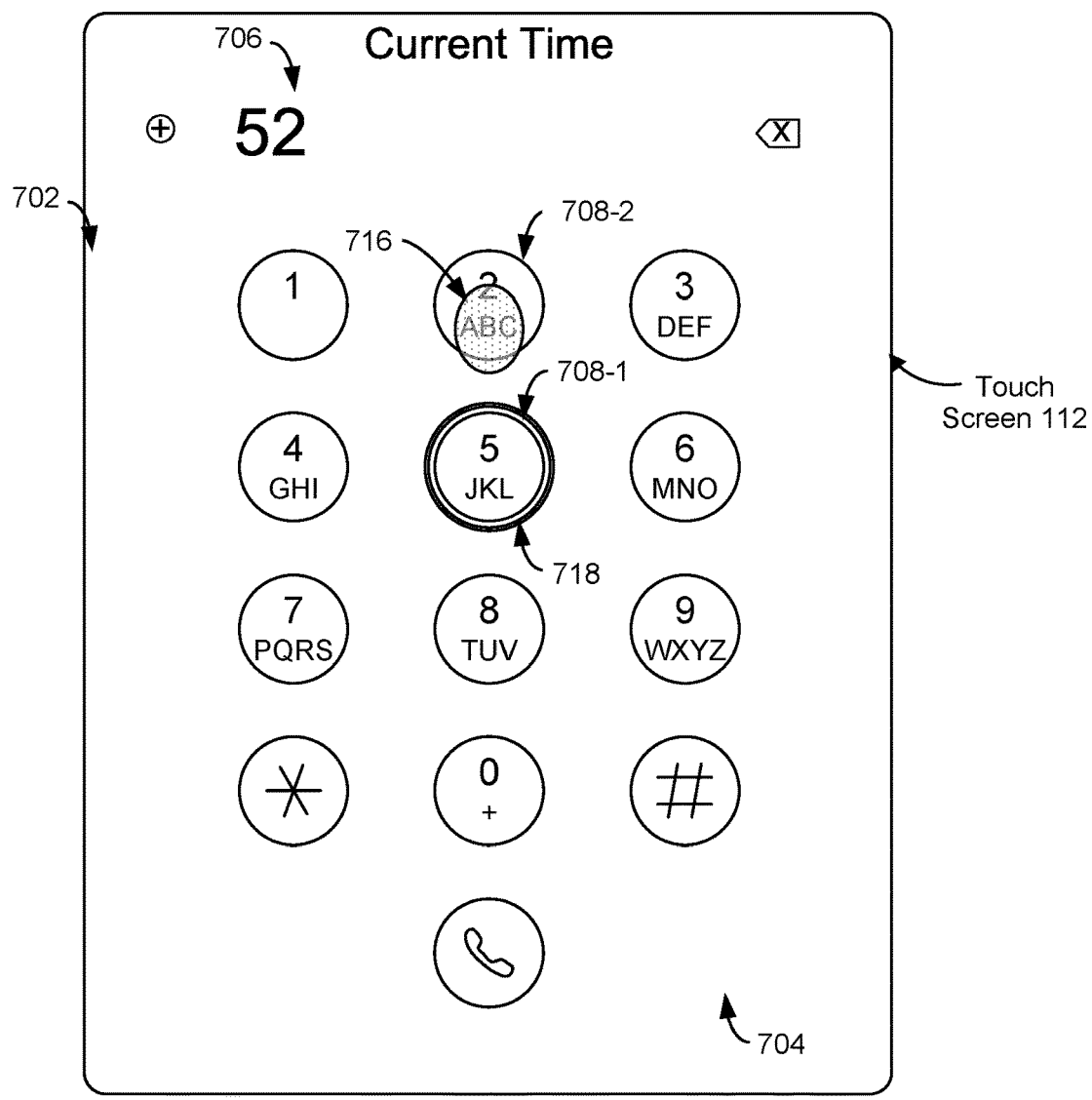
Figure 7F:
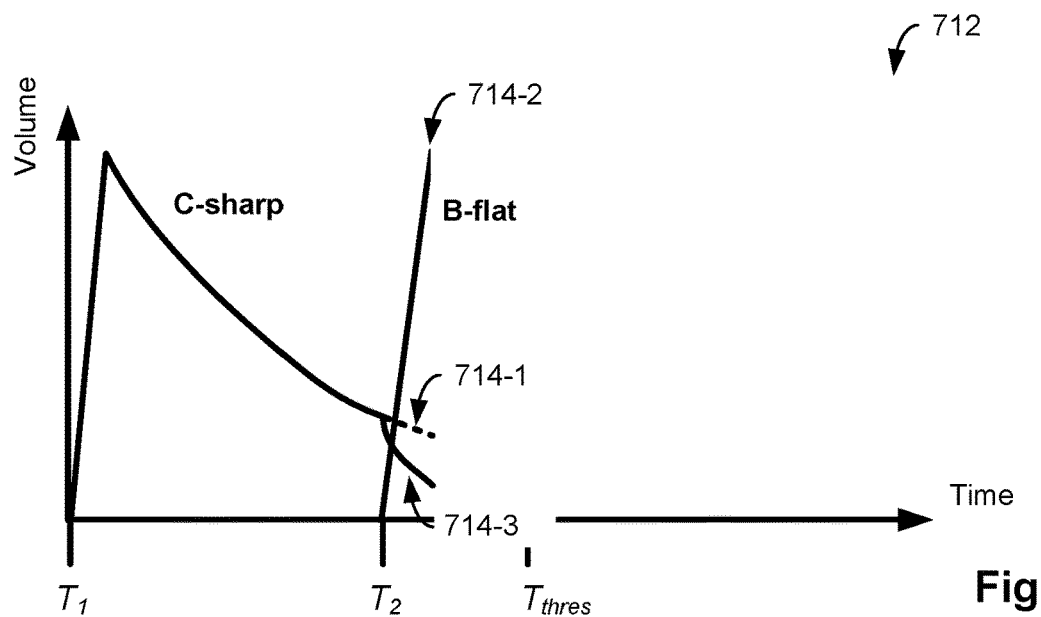
Figure 7G:
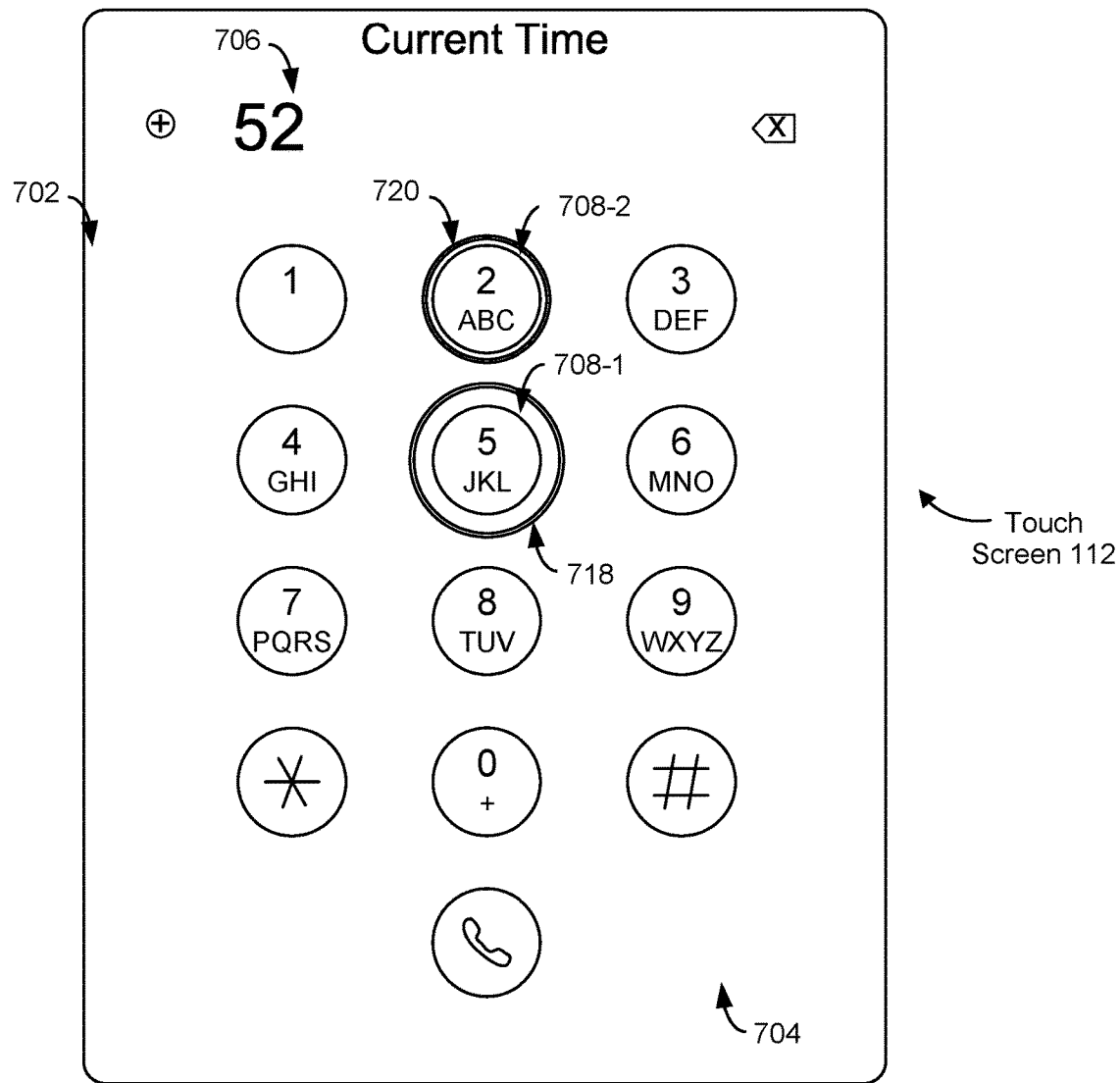
Figure 7G:
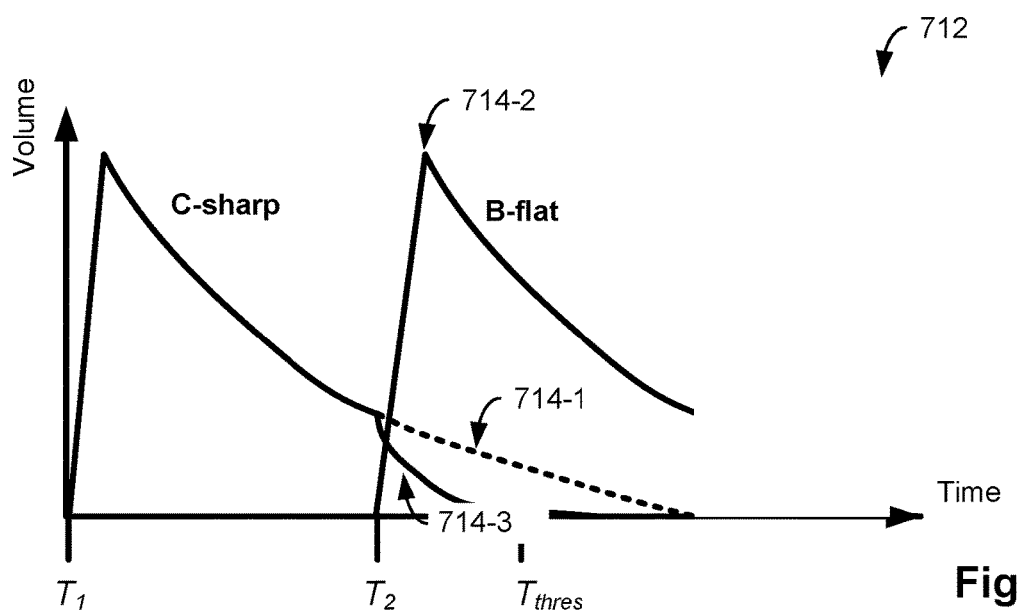

Because the second time $T_2$ at which the second input 716 is detected is after the threshold time $T_{thres}$, device 100 continues presenting the first audio output according to first audio profile 714-1. In contrast, FIGS. 7E-7G are analogous to FIGS. 7B-7D except that the second time $T_2$ at which the second input 716 is detected is before the threshold time $T_{thres}$. In that case, audio alteration criteria are satisfied, so instead of continuing to present the first audio output with first audio profile 714-1, device 100 presents an altered first audio output that has an altered audio profile 714-3 (The altered first audio output follows the solid line labeled 714-3 in FIGS. 7F-7G; the dashed line labeled 714-1 is used to show what the unaltered audio profile would have been but for the audio alteration criteria being satisfied).

In some embodiments, while device 100 is presenting the first audio output, device 100 presents a visual effect that corresponds to the first audio output. For example, as shown in FIGS. 7C-7D, the visual effect includes one or more graphics 718 (e.g., rings, ripples) that extend outward (e.g., away) from affordance 708-1. Similarly, while device 100 is presenting the second audio output, device 100 presents graphics 720 (e.g., rings, ripples) that extend outward, away from affordance 708-2.

Additional details regarding FIGS. 7A-7G (and the user interfaces shown therein) are provided below in reference to FIGS. 9A-9C.

FIGS. 8A-8B are flow diagrams depicting a method 800 of dynamically adjusting presentation of audio outputs in accordance with some embodiments. FIGS. 6A-6O are used to illustrate the methods and/or processes of FIGS. 8A-8B. Although some of the examples which follow will be given with reference to inputs on a touch-sensitive display (in which a touch-sensitive surface and a display are combined), in some embodiments, the device detects inputs on a touch-sensitive surface 451 that is separate from the display 450, as shown in FIG. 4B.

In some embodiments, method 800 is performed by an electronic device (e.g., portable multifunction device 100, FIG. 1A) and/or one or more components of the electronic device (e.g., I/O subsystem 106, operating system 126, etc.). In some embodiments, method 800 is governed by instructions that are stored in a non-transitory computer-readable storage medium and that are executed by one or more processors of a device, such as the one or more processors 122 of device 100 (FIG. 1A). For ease of explanation, the following describes method 800 as performed by device 100. In some embodiments, with reference to FIG. 1A, the operations of method 800 are performed by or use, at least in part, audio preview module 163-1, audio modification module 163-2, and a touch-sensitive display (e.g., touch screen 112). Some operations in method 800 are, optionally, combined and/or the order of some operations is, optionally, changed.

As described below, method 800 (and associated interfaces) reduces the number, extent, and/or nature of inputs from a user and produces a more efficient human-machine interface, thereby providing the user with easy-to-use and intuitive ways to interact with user interfaces. For battery-operated electronic devices, method 800 allows for efficient, seamless, and fast interactions by providing easily understandable and informative audio outputs that conserve power and increase the time between battery charges (e.g., by reducing the requirement for extensive and inefficient user interactions that drain battery power).

In some embodiments, method 800 begins when the device provides (802), to an audio system that is in communication with the device, first sound information to present a first audio output that includes a volume and an audio property other than volume (a "non-volume audio property"). For example, in FIGS. 6A-6H, the first audio output is Beethoven's Moonlight Sonata. In various circumstances, the first audio output is a song, an album, a ringtone, an audio portion of video content, or audio from an audio file object that appears in a text messaging window.

In some embodiments, the non-volume audio property is (804) a reverberation time for the first audio output, a low-pass filter cutoff (e.g., a cutoff frequency) for the first audio output, or a stereo balance (also called a left-right, "L-R," balance) for the first audio output.

While the audio system is presenting the first audio output, the device receives (806) an input that corresponds to a request to present a second audio output. In some embodiments, the input is received (808) while a focus selector is over a graphical object, on a display that is in communication with the electronic device, that corresponds to (or is otherwise associated with) the second audio output.

For example, the input is a press input on a touch-sensitive surface (e.g., a touch-sensitive display that is integrated with the electronic device or a touch-sensitive surface on a remote control that is in signal communication with the electronic device). The press input is received on the graphical user interface object that is associated with the second audio output (e.g., a video content object in a text message window, FIGS. 6I-6O).

As another example, the input corresponds to a swipe gesture on the touch-sensitive surface that begins on a graphical user interface object that is associated with the second audio output (e.g., artwork for an album cover, FIGS. 6A-6H).

In some embodiments, when the graphical user interface object represents a song, album, or video, the second audio output is a preview of the song, album, or video (e.g., a portion of the song, album, or video that has been preselected as being representative of or recognizable from the song, album or video). In some embodiments, the portion of the song, album, or video, as a preset length (e.g., 30 seconds).

For example, the input corresponds to a swipe gesture on the touch-sensitive surface, the swipe gesture initiating over (or on) a graphical user interface object that is associated with the second audio output (e.g., the graphical user interface object includes artwork for an album cover, FIGS. 6A-6H). Another example, mentioned above, is where the press input is received while a focus selector is over a graphical user interface object that is associated with the second audio output (e.g., the graphical user interface object includes a video content object in a text message window, FIGS. 6I-6O). Other examples of graphical user interface objects include a textual representation for a ringtone, an audio file object that appears in the text messaging window, or the like.

In response to receiving the input that corresponds to the request to present the second audio output, the device provides (810), to the audio system, information to dynamically adjust presentation of the first audio output in accordance with a magnitude of the input. In some embodiments, the magnitude of the input is (812) a characteristic intensity of a contact in the input, a length of time of a contact in the input, or a distance travelled by a contact in the input (e.g., a length of a swipe gesture).

The device dynamically adjusts (814) the non-volume audio property as the magnitude of the input changes. Adjusting the non-volume audio property as the magnitude of the input changes allows a user to effectively preview or listen to the second audio output without interrupting the first audio output, and gives the user added control over the audio outputs by way of a single user input. This enhances the operability of the device and makes the user-device interface more efficient (e.g., by reducing the number of user inputs the user has to make while operating/interacting with the device) which, additionally, reduces power usage and improves battery life of the device by enabling the user to use the device more quickly and efficiently.

In some embodiments, the device shifts (816) a stereo balance for the first audio output in conjunction with shifting a stereo balance for the second audio output (e.g., as described with reference to FIGS. 6A-6O). For example, the input corresponds to a swipe gesture on the touch-sensitive surface, the swipe gesture moving in a first direction (e.g., a left to right swipe) away from an initial location of the graphical user interface object that is associated with the second audio output (e.g., the swipe gesture drags artwork for an album cover toward the center of the display, FIGS. 6A-6H). In this example, shifting the stereo balance includes shifting presentation of the first audio output and the second audio output so that they track the movement of the swipe input in the first direction (e.g., the stereo balance for the first audio output shifts toward the right while the second audio output fades in from the left of the audio system). In other embodiments, the stereo balance is shifted for the first and second audio outputs based on changes to a contact intensity of the input or based on a time of contact of the input.

As another example, in some embodiments, the non-volume audio property is a low-pass filter cutoff for the first audio output. The device shifts the low-pass filter cutoff downward in accordance with increasing magnitude of the input. Thus, as the magnitude of the input grows, the first audio content is reduced to a bass background (e.g., "whomp whomp whomp") so that the second audio content can be produced concurrently with the first audio content in a manner that leaves the second audio content clearly audible (e.g., because the prominence of the background audio has been reduced by applying a low pass filter).

In some embodiments, the device adjusts (818) the volume of the first audio output as the magnitude of the input changes (e.g., both the volume and the non-audio property are changing with the magnitude of the input). In some embodiments, the volume of the first audio output is reduced as the magnitude of the input increases. Adjusting the volume of the first audio output in this way further increases the aural prominence of the second audio output without interrupting the first audio output. This makes the blurring of the two audio outputs more effective, thus enhancing the operability of the device and making the user-device interface more efficient.

In some embodiments, the device dynamically adjusts (820) the non-volume audio property as the magnitude of the input changes, prior to presentation of the second audio output, until the magnitude of the input satisfies a first predetermined threshold (e.g., a characteristic intensity of a contact in the input remains below a preview threshold but above a hint threshold whereby the device provides aural and/or visual hints that the device is about to preview the second audio output, as described with reference to FIG.

6B). Once the magnitude of the input satisfies the first predetermined threshold (e.g., more than a slight swipe movement, FIG. 6C), the second audio output begins playing and, in some embodiments, the first audio output is further adjusted as the magnitude of the input changes. Dynamically adjusting the non-volume audio property as the magnitude of the input changes, prior to presentation of the second audio output provides the user with a hint that audio blurring is about to occur, which is useful for warning the user, e.g., when the user has accidentally stumbled across the device input functionality described in method 800.

In response to receiving the input that corresponds to the request to present the second audio output, the device provides (822), to the audio system, second sound information to present the second audio output concurrently with the first audio output. In some embodiments, the device provides (824) information to dynamically adjust presentation of the second audio output in accordance with the magnitude of the input. In some embodiments, presenting the second audio output is performed in conjunction with dynamically adjusting presentation of the first audio output in accordance with the magnitude of the input. In this way, the first and second audio outputs are dynamically blurred together (e.g., the first audio output gradually fades out while the second audio output gradually fades in). Thus, dynamically adjust presentation of the second audio output in accordance with the magnitude of the input provides a seamless transition from the prominence of the first audio output to the prominence of the second audio output, which makes the blurring of audio more pleasing to users and less startling to a user who has accidentally stumbled across the device input functionality described in method 800. This, in turns, increases the likelihood that a user will keep such functionality enabled on their device, and thus saves battery power through increased efficiency of the user's interactions with the device.

In some embodiments, in response to receiving the input that corresponds to the request to present the second audio output, the device provides (826), to the display, data to display a visual effect that changes in conjunction with dynamically adjusting the non-volume audio property. For example, the device provides, to the display, data to visually blur everything in the user interface other than the graphical user interface object corresponding to the second audio output, with a blur radius that is proportional to the magnitude of the input. Displaying a visual effect that changes in conjunction with dynamically adjusting the non-volume audio property provides an intuitive visual clue that corresponds to the changing audio, which helps users interact with their devices.

In some embodiments, the device detects (828) that the magnitude of the input satisfies a second predetermined threshold, greater than the first predetermined threshold and, in response, causes the audio system to cease presenting the first audio output (and continue to present the second audio output). In some embodiments, the second predetermined threshold (a "pop" threshold) corresponds to a higher intensity of contact for the input (e.g., the pop threshold is $IT_D$ in FIGS. 6I-6O), a larger distance travelled by the input, or a longer amount of time that the input remains in contact with a touch-sensitive surface, as compared to the first predetermined threshold. Thus, causing the audio system to cease presenting the first audio output provides the user with a way to switch to "full presentation" of the second audio output, using the same input through which the user previewed the first audio output. This also reduces the number of user interactions required to achieve particular functionality.

In some embodiments, the device detects (830) an end of the input (e.g., as shown in FIGS. 6E-6H). In some alternative embodiments, instead of detecting an end of the input, the device detects that changes to the magnitude of the input have ceased (e.g., the intensity of the contact returns to its original intensity or the input returns to its original location). In some alternative embodiments, instead of detecting an end of the input, the device detects an increase in the magnitude of the input that exceeds a predetermined threshold (e.g., the pop threshold). In some alternative embodiments, instead of detecting an end of the input, the device detects a predefined change to the magnitude of the input. For example, the magnitude of the input drops below a predetermined threshold (e.g., the magnitude of the input drops below the pop threshold while the input remains in contact with the touch-sensitive surface). In some embodiments, instead of detecting an end of the input, the device detects that changes to the input have ceased for a predetermined period of time.

In any event, in response to the appropriate condition, the device causes the audio system to do one of the following:

cease (832) presenting the second audio output and present the first audio output without the dynamic adjustments to the first audio output (e.g., undo the dynamic adjustments to the first audio output). In some embodiments, playing of the first audio output is adjusted, but not paused, while playing the second audio output, and the first audio output continues to play after the second audio output stops playing with the adjustments removed. This gives the user an intuitive way to go back to listening to only the first audio output, reducing the number of user inputs. For example, in FIG. 6H, the device ceases presenting the second audio output and presents the first audio output without the dynamic adjustments.

cease (834) presenting the first audio output and continue presenting the second audio output. This gives the user an intuitive way to switch to listening to only the second audio output, reducing the number of user inputs. For example, in FIG. 6H, the device ceases presenting the first audio output and presents the second audio output without the dynamic adjustments.

continue (836) presenting the adjusted first audio output and continue presenting the second audio output. This gives the user an intuitive way to continue the blurring of the audio; or in accordance with a determination that the magnitude satisfied a predetermined threshold (e.g., a pop threshold was exceeded during the input), cease (838) presenting the first audio output and continue presenting the second audio output; and, in accordance with a determination that the magnitude didn't satisfy the threshold (e.g., the input remained below a pop threshold during the input), cease presenting the second audio output and present the first audio output without the dynamic adjustments (e.g., revert the dynamic adjustments to the first audio output). In this manner, the device automatically determines whether the user really wanted to continue listening to the first audio output or wanted to switch to the second audio output, providing the user with an intuitive way to achieve either result and reduces the number of user input. For example, in FIG. 6E-6H, the device determines whether to ceases presenting the second audio output and presents the first audio output without the dynamic adjustments, or vice-versa, in accordance with a determination that the magnitude of the user input did or didn't satisfied a threshold.

It should be understood that the particular order in which the operations in FIGS. 8A-8H have been described is merely one example and is not intended to indicate that the described order is the only order in which the operations could be performed. One of ordinary skill in the art would recognize various ways to reorder the operations described herein. In some embodiments, one or more operations of methods 800 are combined, supplemented, or replaced with one or more operations of other methods described herein (e.g., methods 840, 854, 875, and/or 900).

FIG. 8C is a flow diagram depicting a method 840 of dynamically adjusting presentation of audio outputs in accordance with some embodiments. In some embodiments, one or more operations of method 840 are combined, supplemented, or replaced with one or more operations of other methods described herein (e.g., method 800). Moreover, many of the operations descripted with reference to method 840 share the same benefits as those described above with reference to method 800 (e.g., intuitive blurring of audio, reducing the number of user inputs that the user has to make). Thus, method 840 also enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 840 is performed at an electronic device with one or more processors and memory, and the electronic device is in communication with a display and an audio system.

In some embodiments, method 840 begins when the device provides (842), to the display, data to present a user interface that includes a media object, the media object representing at least one media content item.

The device provides (844), to the audio system, first sound information to present a first audio output that does not correspond to the media object.

While providing the first sound information to the audio system, the device detects (846) a first portion of an input directed to the media object.

In response to detecting the first portion of the input directed to the media object, the device: (i) initiates (848) providing, to the audio system, second sound information to present a second audio output that corresponds to the media object; and (ii) continues providing, to the audio system, first sound information to present the first audio output that does not correspond to the media object.

While providing the first sound information and the second sound information to the audio system, the device detects (850) a second portion of the input directed to the media object, wherein detecting the second portion of the input includes detecting a change in a parameter of the input (e.g., detecting a change in the intensity of a contact with a touch-sensitive surface while a focus selector is over the media object, or detecting a change in position or movement of a focus selector).

In response to detecting the change in the parameter of the input, the device:

(i) provides (852), to the display, data to dynamically alter the presented user interface in accordance with the change in the parameter of the input (e.g., by visually blurring the user interface background and/or enlarging the media object);

(ii) provides, to the audio system, information to dynamically alter the first audio output that does not correspond to the media object in accordance with the change in the parameter of the input (e.g., by decreasing the volume, increasing the reverberation time, decreasing a low-pass filter cutoff, and/or moving an L-R balance of audio toward the right or toward the left); and (iii) provides, to the audio system, information to dynamically alter the second audio output that corresponds to the media object in accordance with the change in the parameter of the input (e.g., by decreasing the volume, increasing the reverberation time, decreasing a low-pass filter cutoff, and/or moving an L-R balance of audio toward the right or toward the left).

It should be understood that the particular order in which the operations in FIG. 8C have been described is merely one example and is not intended to indicate that the described order is the only order in which the operations could be performed. One of ordinary skill in the art would recognize various ways to reorder the operations described herein. In some embodiments, one or more operations of method 840 are combined, supplemented, or replaced with one or more operations of other methods described herein (e.g., methods 800, 854, 875, and/or 900).

FIGS. 8D-8F are flow diagrams depicting a method 854 of dynamically adjusting presentation of audio outputs in accordance with some embodiments. FIGS. 6P-6Y are used to illustrate the methods and/or processes of FIGS. 8D-8F. Although some of the examples which follow will be given with reference to inputs on a touch-sensitive display (in which a touch-sensitive surface and a display are combined), in some embodiments, the device detects inputs on a touch-sensitive surface 451 that is separate from the display 450, as shown in FIG. 4B.

In some embodiments, method 854 is performed by an electronic device (e.g., portable multifunction device 100, FIG. 1A) and/or one or more components of the electronic device (e.g., I/O subsystem 106, operating system 126, etc.). In some embodiments, method 854 is governed by instructions that are stored in a non-transitory computer-readable storage medium and that are executed by one or more processors of a device, such as the one or more processors 122 of device 100 (FIG. 1A). For ease of explanation, the following describes method 854 as performed by device 100. In some embodiments, with reference to FIG. 1A, the operations of method 854 are performed by or use, at least in part, audio preview module 163-1, audio modification module 163-2, and a touch-sensitive display (e.g., touch screen 112). Some operations in method 854 are, optionally, combined and/or the order of some operations is, optionally, changed.

As described below, method 854 (and associated interfaces) reduces the number, extent, and/or nature of inputs from a user and produces a more efficient human-machine interface, thereby providing the user with easy-to-use and intuitive ways to interact with user interfaces. For battery-operated electronic devices, method 854 allows for efficient, seamless, and fast interactions by providing easily understandable and informative audio outputs that conserve power and increase the time between battery charges (e.g., by reducing the requirement for extensive and inefficient user interactions that drain battery power).

In some embodiments, method 854 begins when the device displays (855), on a display, a user interface that includes a representation of a media item. For example, FIG. 6Q illustrates user interface 640 that includes representations of media items 658.

While displaying the user interface, the device detects (856) an input by a contact (e.g., a finger or stylus contact)

at a location on a touch-sensitive surface that corresponds to the representation of the media item (e.g., the contact is detected over the representation of the media item on a touch-sensitive display). For example, FIG. 6R illustrates the beginning of user input 660, which is a press-and-hold gesture detected over representation 658-2.

In response to detecting the input by the contact: in accordance with a determination that the input meets media hint criteria, wherein the media hint criteria include a criterion that is met when the contact has a characteristic intensity above a first intensity threshold (e.g., $IT_H$, FIG. 6R): the device starts (857) to play (e.g., plays audio and/or video from) a respective portion of the media item (e.g., a beginning portion or a representative portion selected to contain a recognizable portion of the media item). For example, in FIG. 6R, device 100 starts to play Brahms's Alto Rhapsody. And, while the media item is playing, the device dynamically changes a set of one or more audio properties of the media item as the characteristic intensity of the contact changes (e.g., the audio properties of the media item change through a plurality of values as the characteristic intensity of the contact changes through a plurality of values). In some embodiments, the volume of the media item increases as the characteristic intensity of the contact increases and decreases as the characteristic intensity of the contact decreases. For example, as the intensity of input 660 increases from FIG. 6R to FIG. 6S, the volume of Brahms's Alto Rhapsody increases.

In some embodiments, the media item that is played is determined based on a location of the contact in the input (e.g., in accordance with a determination that the contact is detected at a location that corresponds to a first media item, the steps above are performed for the first media item, and in accordance with a determination that the contact is detected at a location that corresponds to a second media item, the steps above are performed for the second media item, instead of being performed for the first media item). For example, if input 660 in FIG. 6R were detected over representation 658-1 instead of representation 658-2, device 100 would have started to play the media item corresponding to representation 658-1.

In accordance with a determination that the input does not meet the media hint criteria, the device forgoes starting to play the respective portion of the media item and forgoes dynamically changing the set of one or more audio properties of the media item as the characteristic intensity of the contact changes. In some embodiments, the device performs an alternate operation with respect to the media item. For example, in response to a tap gesture on a representation of a media item, the device performs a selection operation with respect to the media item.

In some embodiments, the audio properties of the media item include (858) volume, a cutoff frequency for a low pass filter, and/or an equalizer setting (e.g., FIGS. 6P-6Y illustrate an example where the device dynamically changes the volume of the media item as the characteristic intensity of the contact changes.

In some embodiments, the device dynamically changes (859) a visual appearance of the user interface as the set of one or more audio properties of the media item are dynamically changed. In some embodiments, dynamically changing the visual appearance of the user interface includes (860) increasing a size of a representation of the media item as the characteristic intensity of the contact increases (e.g., increasing the size of the representation of the media item as the characteristic intensity of the contact increases and reducing the size of the representation of the media item as the characteristic intensity of the contact decreases). For example, as the intensity of input 660 increases from FIG. 6R to FIG. 6S, the volume of the media item and the size of representation 658-2 both increase. In some embodiments, this is the same representation that is initially displayed in the user interface (as shown in FIGS. 6R-6T, representation 658-2 "grows" out of its original size and location, moving towards a central section of the second region of the user interface while also increasing in size). In other embodiments, this representation is not the same as the representation that is initially displayed, as the initial representation remains at a same location with the second region of the user interface and a second, different representation of the media item is increased in size and moves towards a central section of the second region of the user interface as the characteristic intensity of the contact increases (e.g., the different representation is display on top of the initial representation).

In some embodiments, dynamically changing the visual appearance of the user interface includes (861) dynamically changing an amount of obscuring of a portion of the user interface that is proximate to the representation of the media item as the characteristic intensity of the contact changes. For example, as the intensity of input 660 increases from FIG. 6R to FIG. 6S, interactive region 642-2 is blurred with a blur radius proportional to the intensity of contact 660 (increasing blur radius in these figures is represented schematically by the decreasing transparency of the pattern overlaying interactive region 642-2).

In some embodiments, after starting to play the respective portion of the media item: the device detects (862) an increase in the characteristic intensity of the contact followed by detecting a decrease in the characteristic intensity of the contact (e.g., FIG. 6T illustrates an increase in intensity of contact 660; FIG. 6U illustrates a decrease in intensity of contact 660). In some embodiments, conditional operations are described below that are conditioned upon a determination as to whether or not the characteristic intensity of the contact meets media preview criteria. These operations are performed in response to detecting the increase in the characteristic intensity of the contact followed by detecting the decrease in the characteristic intensity of the contact. In some embodiments, the conditional operations described below are performed while detecting the increase in the characteristic intensity of the contact followed by detecting the decrease in the characteristic intensity of the contact.

To that end, in accordance with a determination that the characteristic intensity of the contact meets media preview criteria, including a criterion that is met when the characteristic intensity of the contact increased above a second intensity threshold (e.g., $IT_L$, FIGS. 6T-6U) that is higher than the first intensity threshold (e.g., $IT_H$) before detecting the decrease in the characteristic intensity of the contact, while the media item is playing, the device changes the audio properties of the media item in a first manner (e.g., increasing the audio volume of the media item) as the characteristic intensity of the contact increases and maintains the audio properties at a first state (e.g., continuing to playback the media item at a set audio volume) as the characteristic intensity of the contact decreases. In some embodiments, as the audio properties of the media item change, the audio properties of background audio also change (e.g., blurring in the background audio as the intensity decreases and blurring out the background audio as the intensity increases). Maintaining the audio properties at the first state (e.g., continuing to playback the media item at a set audio volume) as the characteristic intensity of the contact decreases allows the user to enter a "peek" mode, wherein the audio properties of the media item are fixed, which is convenient for a user who wishes to listen to a portion of the media item without constant adjustments to the audio properties. Because the audio properties are fixed only after the contact intensity increased above the second intensity threshold, the user has the flexibility to choose which mode of operation he or she desires. This reduces the number of user inputs necessary to achieved desired device functionality, and therefore enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

For example, because intensity of contact 660 went above $IT_L$ in FIG. 6T, the volume of the media item is "locked-in" to a preview volume (e.g., full volume), such that the subsequent drop in intensity of contact 660 below $IT_L$ shown in FIG. 6U does not result in a change in volume. In accordance with a determination that the characteristic intensity of the contact does not meet the media preview criteria (i.e., the characteristic intensity of the contact does not increase above the second intensity threshold), while the media item is playing (and while the contact is maintained on the touch-sensitive surface), the device changes the audio properties of the media item in the first manner (e.g., increasing the audio volume of the media item) as the characteristic intensity of the contact increases and changes the audio properties of the media item in a second manner (e.g., reversing the increase in audio volume) as the characteristic intensity of the contact decreases. For example, if the sequence shown in FIGS. 6S-6R were reversed, the volume of the media item would decrease with decreasing intensity. Thus, in FIGS. 6S-6R, the user can scrub the volume of the media item up-and-down by increasing and decreasing the intensity of contact 660, as long as the intensity of contact 660 does not exceed $IT_L$. In some embodiments, the respective portion of the media item plays continuously as the characteristic intensity of the contact is changing, with the set of one or more audio parameters changing as the media item plays.

In some embodiments, in response to detecting that the input meets the media preview criteria, the device displays (863), on the display, an indication that an increase in the characteristic intensity of the contact will cause the device to perform a selection operation with respect to the media item (e.g., "press harder to select" or "3D touch to share").

In some embodiments, after starting to play the respective portion of the media item, the device detects (864) an increase in the characteristic intensity of the contact while the contact is maintained on the touch-sensitive surface. In response to detecting the increase in the characteristic intensity of the contact: in accordance with a determination that the characteristic intensity of the contact meets media selection criteria, including a criterion that is met when the characteristic intensity of the contact is greater than a selection intensity threshold that is higher than the first intensity threshold (and is also higher than the second intensity threshold, operation 862), the device ceases playing the respective portion of the media item and performs a selection operation for the media item (e.g., places the media item in a message compose area or shares the media item with another user in a messaging conversation). For example, in FIGS. 6V-6W, as a result of intensity of contact 660 exceeding $IT_D$, representation 658-2 is selected so that a corresponding audio message 644-4 is placed in shelf 650. In accordance with a determination that the characteristic intensity of the contact does not meet the media selection criteria, the device continues to play the respective portion of the media item without performing the selection operation.

In some embodiments, while the media item is playing, the device detects (865) an end of the input (e.g., detects liftoff of the contact that caused the media item to start playing). In response to detecting the end of the input, the device ceases playing the media item. In some embodiments, ceasing to play the media item in response to detecting the end of the input includes (866) reversing visual obscuring of content proximate to the representation of the media item and changing the set of one or more properties of the audio item gradually so as to gradually fade out the playing media item. For example, if input 660 had been terminated in any of FIGS. 6R-6U, device 100 would have stopped playing the media item and reversed the obscuring of interactive region 642-2.

In some embodiments, after ceasing to play the media item in response to detecting the end of the input, the device detects (867) a selection input by a second contact on the touch-sensitive surface at a location that corresponds to the representation of the media item (e.g., a tap gesture), wherein the second contact does not have a characteristic intensity that reaches the first intensity threshold. In response to detecting the selection input, the device performs a selection operation for the media item (e.g., places the media item in a message compose area, such as shelf 650 (FIG. 6P) or shares the media item with another user in a messaging conversation).

Operations 868-870 describe blurring of audio, namely the media item with background media that is already playing at the device. Methods 800 and 840 describe audio blurring in detail. Thus, operation 868-870 may share any of the features described in those methods.

In some embodiments, the input (e.g., the input detected in operation 856) is detected while background media is playing (868) at the device. In accordance with a determination that the input meets the media hint criteria: while the media item is playing, the device dynamically changes (869) a set of one or more audio properties of the background media item as the characteristic intensity of the contact changes. Thus, in some embodiments, the device "blurs in" the media item over the background media, which provides all of the attending benefits described with respect to methods 800/840.

In accordance with a determination that the input does not meet the media hint criteria, the device continues to play the background media without changing the set of one or more audio properties of the background media. In some embodiments, while the media item is playing, the device detects (870) an end of the input. In response to detecting the end of the input, the device resumes playing the background media item with the set of one or more audio properties returning back to their values before the input was detected.

It should be understood that the particular order in which the operations in FIGS. 8D-8F have been described is merely one example and is not intended to indicate that the described order is the only order in which the operations could be performed. One of ordinary skill in the art would recognize various ways to reorder the operations described herein. In some embodiments, one or more operations of method 854 are combined, supplemented, or replaced with one or more operations of other methods described herein (e.g., methods 800, 840, 875, and/or 900).

FIGS. 8G-8H are flow diagrams depicting a method 875 of obscuring portions of a graphical user interface in accordance with some embodiments. FIGS. 6P-6Y are used to illustrate the methods and/or processes of FIGS. 8G-8H. Although some of the examples which follow will be given with reference to inputs on a touch-sensitive display (in which a touch-sensitive surface and a display are combined), in some embodiments, the device detects inputs on a touch-sensitive surface 451 that is separate from the display 450, as shown in FIG. 4B.

In some embodiments, method 875 is performed by an electronic device (e.g., portable multifunction device 100, FIG. 1A) and/or one or more components of the electronic device (e.g., I/O subsystem 106, operating system 126, etc.). In some embodiments, method 875 is governed by instructions that are stored in a non-transitory computer-readable storage medium and that are executed by one or more processors of a device, such as the one or more processors 122 of device 100 (FIG. 1A). For ease of explanation, the following describes method 875 as performed by device 100.

As described below, method 875 (and associated interfaces) reduces the number, extent, and/or nature of inputs from a user and produces a more efficient human-machine interface, thereby providing the user with easy-to-use and intuitive ways to interact with user interfaces. For battery-operated electronic devices, method 875 allows for efficient, seamless, and fast interactions by providing easily understandable and informative audio outputs that conserve power and increase the time between battery charges (e.g., by reducing the requirement for extensive and inefficient user interactions that drain battery power).

In some embodiments, method 875 begins when the device displays (876), on a display, a user interface that includes a first interactive region (e.g., interactive region 642-2, FIG. 6Q) of an application and a second interactive region of the application (e.g., interactive region 642-1, FIG. 6Q). In some embodiments, an interactive region is a region of a user interface with which a user is able to interact, such as by providing any of a variety of input gestures (swipes, taps, etc.) that, when detected, cause the electronic device to modify the user interface in accordance with the gestures. In other words, an interactive region is not a status bar that is displayed in a top portion through which a user is unable to perform any interactions.

In some embodiments, the second interactive region is (877) a user interface for a primary application (e.g., a messaging application). The first interactive region is configured to display content from different mini-applications that are configured to operate within the primary application, and the mini-application that is displayed in the first interactive region is selected based on user input at the device (e.g., a user can perform swipe gestures in the first interactive region that, when detected, cause the device to display a user interface for a different mini-application in the first interactive region, as described with reference to indicator 654, FIG. 6Q). For example, a messaging application may display mini-applications that interface with the device's media (e.g., music, videos), the device's camera, emoji-art, etc.

In some embodiments, the second interactive region is a conversation region that includes (878) a plurality of messages in a conversation between conversation participants (e.g., the second interactive region is a conversation region, such as interactive region 642-1 (FIG. 6Q), within a messaging application, such as a conversation transcript with messages between a user of the electronic device and at least one other user). The first interactive region is a media selection region for selecting media to share in the conversation between the conversation participants (e.g., a music sharing region, such as interactive region 642-2 (FIG. 6Q), within the messaging application comprising a scrollable sheet that displays representations of the 30 songs most recently played on the device).

While displaying the user interface, the device detects (879) a first input by a contact (e.g., a finger or stylus contact) on a touch-sensitive surface at a location that corresponds to a first user interface element in the first interactive region on the display. For example, FIG. 6R illustrates the beginning of user input 660, which is a press-and-hold gesture detected over representation 658-2.

In response to detecting the first input by the contact: in accordance with a determination that the first input meets intensity-based activation criteria, wherein the intensity-based activation criteria require that the contact have a characteristic intensity that is above a first intensity threshold (e.g., $IT_H$, FIG. 6R) in order for the intensity-based activation criteria to be met, the device obscures (880) the first interactive region of the application with the exception of the first user interface element without obscuring the second interactive region of the application (e.g., the blurring of interactive region 642-2 without blurring representation 658-2, FIGS. 6R-6V). Obscuring the first interactive region of the application with the exception of the first user interface element without obscuring the second interactive region of the application indicates to the user that he or she is enabling intensity-based device functionality within, e.g., the mini-application. This reduces the chances that the user will cause unwanted operations to be performed by the device, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the first input meets first selection criteria, wherein the first selection criteria do not require that the contact have a characteristic intensity that is above the first intensity threshold in order for the selection criteria to be met (e.g., the first input is a tap gesture), the device performs a first selection operation that corresponds to the first user interface element without obscuring the first interactive region of the application. In some embodiments, the first selection operation for obscuring described above is determined based on a location of the contact (e.g., in accordance with a determination that the contact is detected at a location that corresponds to a first media item, the steps above are performed for the first media item, and in accordance with a determination that the contact is detected at a location that corresponds to a second media item, the steps above are performed for the second media item instead of being performed for the first media item). For example, if input 660 in FIG. 6R were detected over representation 658-1 instead of representation 658-2, device 100 would have obscured everything in interactive region 642-2 with the exception of representation 658-1, rather than everything in interactive region 642-2 with the exception of representation 658-2.

In some embodiments, the first selection criteria are (881) met when the first input is a tap gesture.

In some embodiments, obscuring the first interactive region of the application includes (882) dynamically obscuring the first interactive region of the application as the characteristic intensity of the contact changes (e.g., a blurring radius of a blur applied to the first interactive region changes through a plurality of values as the characteristic intensity of the contact changes through a plurality of values). In some embodiments, the blur radius of the blur of the first interactive region increases as the characteristic intensity of the contact increases and decreases as the characteristic intensity of the contact decreases. For example, as the intensity of input 660 increases from FIG. 6R to FIG. 6S, interactive region 642-2 is blurred with a blur radius proportional to the intensity of contact 660 (increasing blur radius in these figures is represented schematically by decreasing transparency of the pattern overlaying interactive region 642-2).

In some embodiments, while displaying the user interface, the device detects (883) a second input by a second contact on the touch-sensitive surface at a location that corresponds to a second user interface element in the second interactive region on the display. In response to detecting the second input by the second contact: in accordance with a determination that the second input meets second intensity-based activation criteria, wherein the second intensity-based activation criteria require that the second contact have a characteristic intensity that is above a second intensity threshold in order for the second intensity-based activation criteria to be met, the device obscures the first interactive region of the application and the second interactive region of the application with the exception of the second user interface element (e.g., the device blurs out content of the first interactive region and the second interactive region while previewing a media item that corresponds to the unblurred second user interface element). In some embodiments, the second intensity threshold is the same as the first intensity threshold. In some embodiments, the second intensity threshold is different from the first intensity threshold. Obscuring the first interactive region of the application and the second interactive region of the application with the exception of the second user interface element indicates to the user that he or she is enabling intensity-based device functionality with respect to the second user interface element within, e.g., the primary-application. This reduces the chances that the user will cause unwanted operations to be performed by the device, which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

For example, as shown in FIG. 6Y, contact 674 has an intensity that exceeds $IT_H$, and as a result, both interactive regions 642-1 and 642-2 are blurred. Thus, a press input above $IT_H$ on a representation of a media item in the mini-application results in blurring of only the mini-application, while an analogous press input on a representation of a media item in an interactive region corresponding to the primary application (e.g., a conversation region of a messaging application) results in blurring of the entire user interface, including both interactive regions 642.

In accordance with a determination that the second input meets second selection criteria, wherein the second selection criteria do not require that the second contact have a characteristic intensity that is above the second intensity threshold in order for the second selection criteria to be met (e.g., the second input is a tap gesture), the device performs a second selection operation that corresponds to the second user interface element without obscuring the second interactive region of the application and without obscuring the first interactive region of the application (e.g., the device plays back a media item that corresponds to the second element). For example, a tap gesture on any of the representations 658 in FIG. 6Q would place the media item in shelf 650 (or send the media item to the conversation directly, in accordance with some embodiments).

In some embodiments, the second user interface element corresponds (884) to the first user interface element after the first user interface element was added to the second interactive region based on input in the first interactive region (e.g., the second user interface element corresponds to a media item that was selected from the first interactive region and added to the conversation that is displayed in the second interactive region). For example, in FIGS. 6Q-6Y, audio message 644-4 and representation 658-2 both correspond to the same media item (e.g., Brahms's Alto Rhapsody).

In some embodiments, while obscuring the first interactive region of the application with the exception of the first user interface element (without obscuring the second interactive region of the application), the device detects an increase in the characteristic intensity of the contact. In response to detecting the increase in the characteristic intensity of the contact: in accordance with a determination that the characteristic intensity of the contact meets third selection criteria, including a criterion that is met when the characteristic intensity of the contact is greater than a selection intensity threshold (e.g., $IT_D$, FIG. 6V) that is higher than the first intensity threshold, the device performs a third selection operation on the first user interface element and ceases obscuring the first interactive region of the application. Thus, because contact 660 exceeds $IT_D$ in FIG. 6V, representation 658-2 is popped into shelf 650 (where it is relabeled audio message 644-4). Performing a selection operation on the first user interface element and ceasing obscuring the first interactive region of the application in accordance with a determination that the characteristic intensity of the contact meets the third selection criteria allows the user to select the first user interface element once the user has already initiated the intensity-based operations described above, obviating the need for additional user inputs to select the first user interface element and making the human/machine interface more efficient.

In accordance with a determination that the characteristic intensity of the input does not meet the third selection criteria, the device continues to obscure the first interactive region of the application with the exception of the first user interface element without obscuring the second interactive region of the application.

It should be understood that the particular order in which the operations in FIGS. 8G-8H have been described is merely one example and is not intended to indicate that the described order is the only order in which the operations could be performed. One of ordinary skill in the art would recognize various ways to reorder the operations described herein. In some embodiments, one or more operations of method 875 are combined, supplemented, or replaced with one or more operations of other methods described herein (e.g., methods 840, 840, 854, and/or 900).

FIGS. 9A-9C are flow diagrams depicting a method 900 of dynamically adjusting presentation of audio outputs in accordance with some embodiments. FIGS. 7A-7G are used to illustrate the methods and/or processes of FIGS. 9A-9C. Although some of the examples which follow will be given with reference to inputs on a touch-sensitive display (in which a touch-sensitive surface and a display are combined), in some embodiments, the device detects inputs on a touch-sensitive surface 451 that is separate from the display 450, as shown in FIG. 4B.

In some embodiments, method 900 is performed by an electronic device (e.g., portable multifunction device 100, FIG. 1A) and/or one or more components of the electronic device (e.g., I/O subsystem 106, operating system 126, etc.). In some embodiments, method 900 is governed by instructions that are stored in a non-transitory computer-readable storage medium and that are executed by one or more processors of a device, such as the one or more processors 122 of device 100 (FIG. 1A). For ease of explanation, the following describes method 900 as performed by device 100. In some embodiments, with reference to FIG. 1A, the operations of method 900 are performed by or use, at least in part, audio profiles 401, audio alteration module 163-3, and a touch-sensitive display (e.g., touch-sensitive display system 112). Some operations in method 900 are, optionally, combined and/or the order of some operations is, optionally, changed.

As described below, method 900 (and associated interfaces) reduces the number, extent, and/or nature of inputs from a user and produces a more efficient human-machine interface, thereby providing the user with easy-to-use and intuitive ways to interact with user interfaces. For battery-operated electronic devices, method 900 allows for efficient, seamless, and fast interactions by providing easily understandable and informative audio outputs that conserve power and increase the time between battery charges (e.g., by reducing the requirement for extensive and inefficient user interactions that drain battery power).

In some embodiments, method 900 is performed (902) at an electronic device in communication with a display and an audio system, while a user interface that includes a set of one or more affordances is displayed on the display of the electronic device (e.g., the displayed user interface includes a virtual numerical keypad and the set of one or more affordances includes the number keys displayed on the virtual numerical keypad, FIGS. 7A-7G). Method 900 begins when the device detects (904), at a first point in time, a first input directed to a first affordance in the set of the one or more affordances (e.g., detects a tap on a first key in the virtual keypad, such as the tap on the "5" key in FIG. 7B).

In response to detecting the first input directed to the first affordance, the device initiates (906) providing, to the audio system, first sound information to present a first audio output that corresponds to the first affordance. The first audio output has a first audio profile (e.g., audio profile 714-1, FIGS. 7B-7G).

In some embodiments, a respective audio profile includes information that governs one or more properties of the corresponding audio output as a function of time. For example, the respective audio profile governs a pitch, voice, timbre, reverberation and/or volume (e.g., decay) of the corresponding audio output as a function of time. In some embodiments, the respective audio profile also includes information governing one or more static properties of the corresponding audio output. For example, a respective audio profile includes information to produce an audio output having a static pitch of C-sharp with a non-static volume that increases and then decays over time.

In some embodiments, while the audio system is presenting the first audio output, the device causes (908) the display to present a visual effect that corresponds to the first audio output (e.g., one or more graphics—such as rings—that extend outward or away from the first affordance, such as a ripple effect with rings spreading outward or away from a location on the display that corresponds to the first input) (e.g., graphics 718, 720, FIGS. 7C-7D). In some embodiments, the graphics include animations of one or more graphical objects moving away from the first affordance. Presenting a visual effect that corresponds to the first audio output provides the user with an intuitive visual clue that corresponds to the audio output, which helps users interact with their devices.

The device detects (910), at a second point in time that is after the first point in time, a second input directed to a second affordance in the set of one or more affordances (e.g., detects a tap on a second key in the virtual numerical keypad, such as the tap on the "2" key in FIG. 7C). In some embodiments, the second affordance and the first affordance are (912) the same affordance (e.g., a same key on a displayed keypad within the displayed user interface). In some embodiments, the first affordance is (914) different from the second affordance (e.g., different keys on the displayed keypad within the displayed user interface).

In response to detecting the second input directed to the second affordance and in accordance with a determination that audio alteration criteria are satisfied, the device (916):

(i) causes the audio system to present altered first audio output that corresponds to the first affordance, instead of continuing to present the first audio output with the first audio profile, wherein the altered first audio output has an altered audio profile that is distinct from the first audio profile. In some embodiments, causing the audio system to present altered first audio output includes providing information such as instructions and/or sound data to the audio system to enable the audio system to present the altered first audio output; and (ii) provides, to the audio system, second sound information to present a second audio output that corresponds to the second affordance, wherein the second audio output has a second audio profile. In some embodiments, the second audio profile is the same as the first audio profile (e.g., each audio profile is a default audio profile for an audio output produced in response to activation of an affordance). In some embodiments, the second audio profile is different than the first audio profile. Presenting altered first audio output that corresponds to the first affordance, instead of continuing to present the first audio output with the first audio profile, makes the audio output less intrusive and more desirable to users. This, in turn, makes users more like to take advantage of the audio output functionality.

In some embodiments, in response to detecting the second input directed to the second affordance, the device determines (918) whether the first audio output presented via the audio system by the second point in time satisfies the audio alteration criteria.

In some embodiments, the audio alteration criteria include (920) a criterion that is satisfied when an amount of time elapsed between the first point in time and the second point in time is less than a predetermined amount of time (e.g., $T_{thres}$, FIGS. 7B-7G).

In some embodiments, the audio alteration criteria include (922) a criterion that is satisfied when a time elapsed since the first audio output was initiated is less than a predetermined amount of time.

In some embodiments, the audio alteration criteria include (924) a criterion that is satisfied when an amplitude of the first audio output has dropped below a predetermined amplitude at the second point in time. In some embodiments, determining whether the first audio output satisfies audio alteration criteria includes determining, at a predetermined time (e.g., at or near the second point in time), whether a time elapsed since the first audio output was initiated is less than a predetermined time threshold and/or determining whether an amplitude of the first audio output has dropped below a predetermined amplitude (e.g., half of the first audio output's initial or maximum amplitude).

In response to detecting the second input directed to the second affordance and in accordance with a determination that audio alteration criteria are not satisfied, the device (926):

(i) causes the audio system to continue presenting the first audio output that corresponds to the first affordance and that has the first audio profile; and (ii) provides, to the audio system, third sound information to present a third audio output that corresponds to the second affordance, wherein the third audio output has a third audio profile. In some embodiments, the third audio profile is the same as the second audio profile. In some embodiments, the second audio profile is different than the third audio profile.

In some embodiments, the altered audio profile has a reduced volume compared to the volume at which the first audio output is produced when the audio system continues presenting the first audio output using the first audio profile (e.g., altering the audio profile includes increasing the decay of the first audio output). In some embodiments, altering the audio profile includes altering a pitch of the first audio output. In some embodiments, the altered audio profile has a non-zero volume for at least a period of time after the device detects the second input.

It should be understood that the particular order in which the operations in FIGS. 9A-9C have been described is merely one example and is not intended to indicate that the described order is the only order in which the operations could be performed. One of ordinary skill in the art would recognize various ways to reorder the operations described herein. In some embodiments, one or more operations of method 900 are combined, supplemented, or replaced with one or more operations of other methods described herein (e.g., methods 800, 840, 854, and/or 875).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, performed at an electronic device with one or more processors and memory, wherein the electronic device is in communication with a display and an audio system, the method comprising:

presenting, under control of the electronic device, via the audio system, a first audio output, the first audio output having a volume and an audio property other than volume;

while the audio system presents a first audio output, receiving an input that corresponds to a request to present a second audio output; and in response to receiving the input that corresponds to the request to present the second audio output:

concurrently presenting, under control of the electronic device, via the audio system:

an automatically adjusted version of the first audio output in which the audio property other than volume of the first audio output has been adjusted, wherein the concurrently presenting includes reducing the volume of the first audio output in addition to adjusting the audio property other than volume to generate the adjusted version of the first audio output; and the second audio output;

subsequently to concurrently presenting the adjusted version of the first audio output and the second audio output:

ceasing presenting the second audio output; and in conjunction with ceasing to present the second audio output, automatically presenting the first audio output without the adjustment to the audio property other than volume of the first audio output.

2. The method of claim 1, wherein the audio property other than volume of the first audio output is a reverberation time for the first audio output.

3. The method of claim 1, wherein the audio property other than volume of the first audio output is a low-pass filter cutoff for the first audio output.

4. The method of claim 1, wherein the audio property other than volume of the first audio output is a stereo balance for the first audio output.

5. The method of claim 1, wherein the concurrently presenting includes shifting a stereo balance for the first audio output in conjunction with shifting a stereo balance for the second audio output.

6. The method of claim 1, wherein concurrently presenting the second audio output and the adjusted version of the first audio output includes dynamically adjusting the audio property other than volume of the first audio output while concurrently presenting the second audio output.

7. The method of claim 6, further including, in response to receiving the input that corresponds to the request to present the second audio output, providing, to the display, data to display a visual effect that changes in conjunction with dynamically adjusting the audio property other than volume.

8. The method of claim 1, wherein concurrently presenting the second audio output and the adjusted version of the first audio output includes providing, to the audio system, information to dynamically adjust presentation of the second audio output in accordance with a magnitude of the input.

9. The method of claim 8, wherein the magnitude of the input is a characteristic intensity of a contact in the input, a length of time of a contact in the input, or a distance travelled by a contact in the input.

10. The method of claim 1, wherein the input is received while a focus selector is over a graphical object, on the display, that corresponds to the second audio output.

11. The method of claim 1, including:

detecting an end of the input; and in response to detecting the end of the input, causing the audio system to:

cease presenting the second audio output; and present the first audio output without adjustment to the audio property other than volume of the first audio output.

12. The method of claim 1, including:

detecting an end of the input; and in response to detecting the end of the input:

in accordance with a determination that a magnitude of the input satisfied a predetermined threshold, causing the audio system to:

cease presenting the first audio output; and continue presenting the second audio output; and in accordance with a determination that the magnitude of the input did not satisfy the predetermined threshold, causing the audio system to:
cease presenting the second audio output; and
present the first audio output without adjustment to the audio property other than volume of the first audio output.

13. The method of claim 1, wherein the audio property other than volume of the first audio output is dynamically adjusted as a magnitude of the input changes, prior to presentation of the second audio output, until the magnitude of the input satisfies a first predetermined threshold.

14. The method of claim 13, including:
detecting that the magnitude of the input satisfies a second predetermined threshold, greater than the first predetermined threshold; and
in response to detecting that the magnitude of the input satisfies the second predetermined threshold, causing the audio system to cease presenting the first audio output.

15. The method of claim 1, including:
dynamically adjusting the audio property other than volume of the first audio output as a magnitude of the input changes, and adjusting the volume of the first audio output as the magnitude of the input changes.

16. An electronic device that is in communication with a display and an audio system, the electronic device comprising:
one or more processors;
memory; and
one or more programs, wherein the one or more programs are stored in the memory and configured to be executed by the one or more processors, the one or more programs including instructions for:
presenting, under control of the electronic device, via the audio system, a first audio output, the first audio output having a volume and an audio property other than volume;
while the audio system presents a first audio output, receiving an input that corresponds to a request to present a second audio output; and
in response to receiving the input that corresponds to the request to present the second audio output:
concurrently presenting, under control of the electronic device, via the audio system:
an automatically adjusted version of the first audio output in which the audio property other than volume of the first audio output has been adjusted, wherein the concurrently presenting includes reducing the volume of the first audio output in addition to adjusting the audio property other than volume to generate the adjusted version of the first audio output; and
the second audio output;
subsequently to concurrently presenting the adjusted version of the first audio output and the second audio output:
ceasing presenting the second audio output; and
in conjunction with ceasing to present the second audio output, automatically presenting the first audio output without the adjustment to the audio property other than volume of the first audio output.

17. The electronic device of claim 16, wherein the audio property other than volume of the first audio output is a reverberation time for the first audio output.

18. A non-transitory computer-readable storage medium storing one or more programs, the one or more programs comprising instructions which, when executed by an electronic device in communication with a display and an audio system, cause the electronic device to:
present, under control of the electronic device, via the audio system, a first audio output, the first audio output having a volume and an audio property other than volume;
while the audio system presents a first audio output, receive an input that corresponds to a request to present a second audio output; and
in response to receiving the input that corresponds to the request to present the second audio output:
concurrently present, under control of the electronic device, via the audio system:
an automatically adjusted version of the first audio output in which the audio property other than volume of the first audio output has been adjusted, wherein the concurrently presenting includes reducing the volume of the first audio output in addition to adjusting the audio property other than volume to generate the adjusted version of the first audio output; and
the second audio output;
subsequently to concurrently presenting the adjusted version of the first audio output and the second audio output:
ceasing presenting the second audio output; and
in conjunction with ceasing to present the second audio output, automatically presenting the first audio output without the adjustment to the audio property other than volume of the first audio output.

19. The non-transitory computer readable storage medium of claim 18, wherein the audio property other than volume of the first audio output is a reverberation time for the first audio output.

20. The electronic device of claim 16, wherein the audio property other than volume of the first audio output is a low-pass filter cutoff for the first audio output.

21. The electronic device of claim 16, wherein the audio property other than volume of the first audio output is a stereo balance for the first audio output.

22. The electronic device of claim 16, wherein the concurrently presenting includes shifting a stereo balance for the first audio output in conjunction with shifting a stereo balance for the second audio output.

23. The electronic device of claim 16, wherein concurrently presenting the second audio output and the adjusted version of the first audio output includes dynamically adjusting the audio property other than volume of the first audio output while concurrently presenting the second audio output.

24. The electronic device of claim 23, wherein the one or more programs further include instructions for, in response to receiving the input that corresponds to the request to present the second audio output, providing, to the display, data to display a visual effect that changes in conjunction with dynamically adjusting the audio property other than volume.

25. The electronic device of claim 16, wherein concurrently presenting the second audio output and the adjusted version of the first audio output includes providing, to the audio system, information to dynamically adjust presentation of the second audio output in accordance with a magnitude of the input.

26. The electronic device of claim 25, wherein the magnitude of the input is a characteristic intensity of a contact in the input, a length of time of a contact in the input, or a distance travelled by a contact in the input.

27. The electronic device of claim 16, wherein the input is received while a focus selector is over a graphical object, on the display, that corresponds to the second audio output.

28. The electronic device of claim 16, wherein the one or more programs include instructions for:
detecting an end of the input; and
in response to detecting the end of the input, causing the audio system to:
cease presenting the second audio output; and
present the first audio output without adjustment to the audio property other than volume of the first audio output.

29. The electronic device of claim 16, wherein the one or more programs include instructions for:
detecting an end of the input; and
in response to detecting the end of the input:
in accordance with a determination that a magnitude of the input satisfied a predetermined threshold, causing the audio system to:
cease presenting the first audio output; and
continue presenting the second audio output; and
in accordance with a determination that the magnitude of the input did not satisfy the predetermined threshold, causing the audio system to:
cease presenting the second audio output; and
present the first audio output without adjustment to the audio property other than volume of the first audio output.

30. The electronic device of claim 16, wherein the audio property other than volume of the first audio output is dynamically adjusted as a magnitude of the input changes, prior to presentation of the second audio output, until the magnitude of the input satisfies a first predetermined threshold.

31. The electronic device of claim 30, wherein the one or more programs include instructions for:
detecting that the magnitude of the input satisfies a second predetermined threshold, greater than the first predetermined threshold; and
in response to detecting that the magnitude of the input satisfies the second predetermined threshold, causing the audio system to cease presenting the first audio output.

32. The electronic device of claim 16, wherein the one or more programs include instructions for:
dynamically adjusting the audio property other than volume of the first audio output as a magnitude of the input changes, and adjusting the volume of the first audio output as the magnitude of the input changes.

33. The non-transitory computer-readable storage medium of claim 18, wherein the audio property other than volume of the first audio output is a low-pass filter cutoff for the first audio output.

34. The non-transitory computer-readable storage medium of claim 18, wherein the audio property other than volume of the first audio output is a stereo balance for the first audio output.

35. The non-transitory computer-readable storage medium of claim 18, wherein the concurrently presenting includes shifting a stereo balance for the first audio output in conjunction with shifting a stereo balance for the second audio output.

36. The non-transitory computer-readable storage medium of claim 18, wherein concurrently presenting the second audio output and the adjusted version of the first audio output includes dynamically adjusting the audio property other than volume of the first audio output while concurrently presenting the second audio output.

37. The non-transitory computer-readable storage medium of claim 36, wherein the one or more programs further comprise instructions that, when executed by the electronic device, cause the electronic device to, in response to receiving the input that corresponds to the request to present the second audio output, provide, to the display, data to display a visual effect that changes in conjunction with dynamically adjusting the audio property other than volume.

38. The non-transitory computer-readable storage medium of claim 18, wherein concurrently presenting the second audio output and the adjusted version of the first audio output includes providing, to the audio system, information to dynamically adjust presentation of the second audio output in accordance with a magnitude of the input.

39. The non-transitory computer-readable storage medium of claim 38, wherein the magnitude of the input is a characteristic intensity of a contact in the input, a length of time of a contact in the input, or a distance travelled by a contact in the input.

40. The non-transitory computer-readable storage medium of claim 18, wherein the input is received while a focus selector is over a graphical object, on the display, that corresponds to the second audio output.

41. The non-transitory computer-readable storage medium of claim 18, wherein the one or more programs include instructions that, when executed by the electronic device, cause the electronic device to:
detect an end of the input; and
in response to detecting the end of the input, cause the audio system to:
cease presenting the second audio output; and
present the first audio output without adjustment to the audio property other than volume of the first audio output.

42. The non-transitory computer-readable storage medium of claim 18 wherein the one or more programs comprise instructions that, when executed by the electronic device, cause the electronic device to:
detect an end of the input; and
in response to detecting the end of the input:
in accordance with a determination that a magnitude of the input satisfied a predetermined threshold, cause the audio system to:
cease presenting the first audio output; and
continue presenting the second audio output; and
in accordance with a determination that the magnitude of the input did not satisfy the predetermined threshold, cause the audio system to:
cease presenting the second audio output; and
present the first audio output without adjustment to the audio property other than volume of the first audio output.

43. The non-transitory computer-readable storage medium of claim 18, wherein the audio property other than volume of the first audio output is dynamically adjusted as a magnitude of the input changes, prior to presentation of the second audio output, until the magnitude of the input satisfies a first predetermined threshold.

44. The non-transitory computer-readable storage medium of claim 43, wherein the one or more programs comprise instructions that, when executed by the electronic device, cause the electronic device to:

detect that the magnitude of the input satisfies a second predetermined threshold, greater than the first predetermined threshold; and in response to detecting that the magnitude of the input satisfies the second predetermined threshold, cause the audio system to cease presenting the first audio output.

45. The non-transitory computer-readable storage medium of claim 18, wherein the one or more programs comprise instructions that, when executed by the electronic device, cause the electronic device to:

dynamically adjust the audio property other than volume of the first audio output as a magnitude of the input changes, and adjusting the volume of the first audio output as the magnitude of the input changes.

* * * * *